US010956013B2

(12) United States Patent
Nelson et al.

(10) Patent No.: US 10,956,013 B2
(45) Date of Patent: Mar. 23, 2021

(54) USER INTERFACE FOR AUTOMATED FLOWS WITHIN A CLOUD BASED DEVELOPMENTAL PLATFORM

(71) Applicant: ServiceNow, Inc., Cupertino, CA (US)

(72) Inventors: Harry Thomas Nelson, San Diego, CA (US); Rebecca Dias, Kirkland, WA (US); Mark Brennan, Oceanside, CA (US); Qian Zhang, San Diego, CA (US); Christen Mitchell, Vista, CA (US)

(73) Assignee: ServiceNow, Inc., Santa Clara, CA (US)

( * ) Notice: Subject to any disclaimer, the term of this patent is extended or adjusted under 35 U.S.C. 154(b) by 487 days.

(21) Appl. No.: 15/815,476

(22) Filed: Nov. 16, 2017

(65) Prior Publication Data

US 2018/0321833 A1    Nov. 8, 2018

Related U.S. Application Data

(63) Continuation-in-part of application No. 29/617,193, filed on Sep. 12, 2017.
(Continued)

(51) Int. Cl.
*G06F 3/048*    (2013.01)
*G06F 3/0484*   (2013.01)
(Continued)

(52) U.S. Cl.
CPC ........ *G06F 3/04847* (2013.01); *G06F 3/0482* (2013.01); *G06F 9/54* (2013.01);
(Continued)

(58) Field of Classification Search
CPC .... G06F 3/04847; G06F 16/27; G06F 3/0482; G06F 9/54; G06Q 10/0631; H04L 41/22; H04L 67/1097
(Continued)

(56) References Cited

U.S. PATENT DOCUMENTS 5,315,504 A    5/1994    Lemble
6,321,229 B1   11/2001   Goldman
(Continued)

FOREIGN PATENT DOCUMENTS

WO    00/58874 A1    10/2000

OTHER PUBLICATIONS

Extended European Search Report for European Patent Application No. 18193659.2 dated Oct. 12, 2018; 9 pgs.
(Continued)

*Primary Examiner* — David Phantana-angkool
(74) *Attorney, Agent, or Firm* — Fletcher Yoder PC

(57) ABSTRACT

Creating, executing, and managing flow plans by performing at least the following: presenting on a display an action instance associated with a flow plan within an action designer user interface, wherein the action designer user interface comprises: an action outline component that includes an input graphical element, one or more step instance graphical element, and an action graphical element, wherein one of the graphical elements is highlighted within the action outline component; and an action window adjacent to the action outline component, wherein the action window comprises one or more input fields that dynamically change based on a user selection of one of the graphical elements within the action outline component, and present a window to select from a list of pre-existing step instance types for a step instance.

20 Claims, 32 Drawing Sheets

Related U.S. Application Data

(60) Provisional application No. 62/557,427, filed on Sep. 12, 2017, provisional application No. 62/502,258, filed on May 5, 2017.

(51) Int. Cl.
  *G06F 9/54* (2006.01)
  *G06F 3/0482* (2013.01)
  *H04L 12/24* (2006.01)
  *H04L 29/08* (2006.01)
  *G06F 16/27* (2019.01)
  *G06Q 10/06* (2012.01)

(52) U.S. Cl.
  CPC ......... *G06F 16/27* (2019.01); *G06Q 10/0631* (2013.01); *H04L 41/22* (2013.01); *H04L 67/1097* (2013.01)

(58) Field of Classification Search
  USPC ........................................................ 715/771
  See application file for complete search history.

(56) References Cited

U.S. PATENT DOCUMENTS

| | | |
|---|---|---|
| 6,609,122 B1 | 8/2003 | Ensor |
| 6,816,898 B1 | 11/2004 | Scarpelli |
| 7,020,706 B2 | 3/2006 | Cates |
| 7,028,301 B2 | 4/2006 | Ding |
| 7,043,714 B2 * | 5/2006 | Lin .................. G06Q 10/10 717/102 |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,483,902 B2 | 1/2009 | Ghai et al. |
| 7,546,301 B1 | 6/2009 | Balachandran |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 5/2011 | Vambenepe |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,332,809 B2 * | 12/2012 | Mauceri, Jr. ............. G06F 40/14 717/106 |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,725,548 B2 | 5/2014 | Leitch et al. |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,110,681 B2 * | 8/2015 | Branson .................. G06F 8/443 |
| 9,122,552 B2 | 9/2015 | Whitney |
| 9,239,857 B2 | 1/2016 | Trinon |
| 9,317,327 B2 | 4/2016 | Apte |
| 9,535,737 B2 | 1/2017 | Joy |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 9,921,733 B2 * | 3/2018 | Filippi ................ G06F 3/04847 |
| 10,108,593 B2 * | 10/2018 | Mauceri, Jr. ........... G06Q 10/10 |
| 10,409,562 B2 * | 9/2019 | Leonelli ................ G06F 8/447 |
| 10,452,360 B1 * | 10/2019 | Burman ................ G06F 3/0482 |
| 10,642,668 B2 * | 5/2020 | Young ..................... G06F 9/546 |
| 2002/0091586 A1 | 7/2002 | Wakai et al. |
| 2003/0191769 A1 * | 10/2003 | Crisan ............... G06F 16/24553 |
| 2006/0225032 A1 | 10/2006 | Klerk et al. |
| 2007/0255715 A1 | 11/2007 | Li et al. |
| 2008/0215552 A1 * | 9/2008 | Safoutin ............. G06F 3/04847 |
| 2013/0104065 A1 * | 4/2013 | Stecher ................ G06F 3/0481 715/767 |
| 2013/0132928 A1 * | 5/2013 | Mauceri, Jr. ............. G06F 8/30 717/106 |
| 2013/0273976 A1 | 10/2013 | Rao et al. |
| 2014/0006992 A1 * | 1/2014 | Broussard. III .... G06F 3/04847 715/771 |
| 2014/0040815 A1 * | 2/2014 | Goossens ............ G06F 3/04815 715/782 |
| 2014/0270109 A1 | 9/2014 | Riahi et al. |
| 2014/0297268 A1 | 10/2014 | Govrin et al. |
| 2015/0277708 A1 * | 10/2015 | Rodrig .................. G06F 3/0485 715/777 |
| 2015/0339107 A1 | 11/2015 | Krishnamurthy et al. |
| 2016/0062804 A1 | 3/2016 | Stanfill et al. |
| 2018/0321833 A1 * | 11/2018 | Nelson .................... G06F 16/27 |
| 2020/0348662 A1 * | 11/2020 | Cella .................... H04B 17/345 |

OTHER PUBLICATIONS

Extended European Search Report for European Application No. 18170553.4 dated Sep. 11, 2018; 8 pgs.

Examination Report for Australian Application No. 2017236021 dated Sep. 7, 2018; 5 pgs.

Examination report for Australian Patent Application No. 2019201100 dated Mar. 18, 2020; 3 pgs.

* cited by examiner

USER INTERFACE FOR AUTOMATED FLOWS WITHIN A CLOUD BASED DEVELOPMENTAL PLATFORM

CROSS-REFERENCE TO RELATED APPLICATIONS

This application claims the benefit of U.S. Provisional Patent Application No. 62/557,427, filed Sep. 12, 2017 by Harry Thomas Nelson et al. and entitled "Automated Flows within a Cloud Based Developmental Platform," and U.S. Provisional Patent Application No. 62/502,258, filed May 5, 2017 by Sarup Paul et al. and entitled "Service Platform and Use Thereof," and is related to U.S. Design patent application Ser. No. 29/617,193 filed Sep. 12, 2017 by Qian Zhang et al. and entitled "Graphical User Interface for a Display Screen of a Communications Terminal," all of which are hereby incorporated by reference as if reproduced in their entirety.

TECHNICAL FIELD

Embodiments described herein generally relate to cloud computing and in particular to creating, executing, and managing flow plans within a cloud based developmental platform.

BACKGROUND ART

Cloud computing involves sharing of computing resources that are generally accessed via the Internet. In particular, the cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations in order to perform a variety computing functions that include storing and/or processing computing data. For enterprise and other organization users, cloud computing provides flexibility in accessing cloud computing resources without accruing up-front costs, such as purchasing network equipment, and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing a local network or individual software installations, software is typically licensed on a subscription basis, hosted on a remote machine, and accessed as needed. For example, users are generally able to access a variety of enterprise and/or information technology (IT) related software via a web browser. PaaS acts an extension of SaaS that goes beyond providing software services by offering customizability and expandability features to meet a user's needs. For example, PaaS can provide a cloud based developmental platform for users to develop, modify, manage and/or customize applications and/or automate enterprise operations without maintaining network infrastructure and/or allocating computing resources normally associated with these functions.

Within the context of automating enterprise, IT, and/or other organization-related functions (e.g., human resources (HR)), PaaS often provides users an array of tools to implement complex behaviors, such as enterprise rules, scheduled jobs, events, and scripts, to build automated processes and to integrate with third party systems. Although the tools for PaaS generally offer users a rich set of facilities for building automated processes for various enterprise, IT, and/or other organization-related functions, users typically implement custom scripts to perform the automated process. Requiring customized script to build automated processes may pose a challenge when attempting to address abstraction (e.g., providing domain-appropriate building blocks), code reuse (e.g., having defined application program interface (API) semantics), and/or codeless development. As such, continually improving the technology of developmental platforms that simplify the process for a user to design, run, and manage automated processes remains valuable in enhancing clouding computing services.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, an automation system to create and manage flow plans within a cloud computing environment. To create and manage flow plans, a developmental platform includes an automation system that minimizes the use of customized scripting and coding. The automation user interface system comprises a flow designer user interface that allows a user to arrange one or more action and trigger instances in a sequence to form a design-time flow plan, an action designer user interface that configures action instances by creating one or more step instances, and a construction API that builds a data model within a database. The flow designer user interface, the action designer user interface, and the construction API drive the data model so that the design-time flow plan can be continuously updated and/or saved independent of any run-time operations.

In another embodiment, an automation system configured to present on a display an action instance associated with a flow plan within an action designer user interface. The action designer user interface includes an action outline component that includes an input graphical element, one or more step instance graphical element, and an action graphical element, wherein one of the graphical elements is highlighted within the action outline component. The action designer user interface also includes an action window adjacent to the action outline component, wherein the action window comprises one or more input fields that dynamically change based on a user selection of one of the graphical elements within the action outline component. The action designer user interface is also configured to present a window to select from a list of pre-existing step instance types for a step instance.

In another embodiment, an automation system configured to present on a display an approval step instance graphical element within an action designer user interface. The approval step instance graphical element is located within an action outline component within the action designer user interface and is associated with an action instance of a flow plan. The approval step instance graphical element is also configured to receive a user input that selects the approval step instance graphical element and update an action window adjacent to the action outline component. The action window includes an approval rule builder graphical element configured to set one or more rules for creating an approval condition, and the approval rule builder graphical element includes one or more fields that define when a flow plan satisfies the approval condition.

In another embodiment, an automation system configured to present on a display an operational view of an executing flow plan within an operational view user interface. The operational view user interface includes a flow plan graphical outline associated with the executing flow plan, where the flow plan graphical outline contains a trigger instance graphical element for a trigger instance, at least one action instance graphical element for at least one action instance, and at least one step instance graphical element for at least one step instance. The operational view user interface can also include one or more state indicators adjacent to the flow plan graphical outline that provide an overall state of the trigger instance, the at least one action instance, and the at least one step instance. The operational view user interface can include one or more metrics relating to executing the trigger instance, the at least one action instance, and the at least one step instance.

In another embodiment, an automation system configured to present on a display an operational view of a first version of a flow plan within an operational view user interface that includes a flow plan graphical outline associated with the first version of the flow plan. The flow plan graphical outline comprises a trigger instance graphical element for a trigger instance, at least one action instance graphical element for at least one action instance, and at least one step instance graphical element for at least one step instance. The operational view user interface also includes one or more state indicators adjacent to the flow plan graphical outline that provide an overall state of the trigger instance, the at least one action instance, and the at least one step instance. The automation system is able to present on the display a current version of the flow plan within a second user interface while the first version of the flow plan executes.

In another embodiment, an automation system that creates a trigger for a design-time flow plan that activates when one or more computing conditions are met. The automation system defines multiple action instances for the design-time flow plan that execute after the trigger activates. The one or more of the action instances comprise a respective sequence of step instances associated with respective inputs and outputs. The automation system is able to save the design-time flow plan within a data model and convert the saved design-time flow plan into a run-time flow plan. The automation system executes the operations within the run-time flow plan such that the execution of the one or more operations within run-time flow plan occurs simultaneously when the data model saves an updated design-time flow plan. The operations within the run-time flow plan also include at least one dynamic mutable operation.

In another embodiment, a method that that creates a trigger for a design-time flow plan that activates when one or more computing conditions are met. The method defines multiple action instances for the design-time flow plan that execute after the trigger activates. The one or more of the action instances comprise a respective sequence of step instances associated with respective inputs and outputs. The method saves the design-time flow plan within a data model and convert the saved design-time flow plan into a run-time flow plan. The method calls a flow engine to execute the operations within the run-time flow plan such that the execution of the one or more operations within run-time flow plan occurs as the data model saves an updated design-time flow plan. The operations within the run-time flow plan also include at least one dynamic mutable operation.

In yet another embodiment, an automation system that obtains a run-time flow plan associated with a design-time flow plan saved in a data model. The run-time flow plan includes a trigger, a first operation, and a second operation, where the first operation precedes the second operation within the run-time flow plan and one or more input values of the second operation are linked to the first operation. The automation system executes the first operation based at least on the determination that the one or more conditions of the trigger are met. The automation system is able to receive information that satisfies a condition of the second operation when the second operation is a dynamic mutable operation. The automation system monitors whether the second operation is ready for execution based at least on a determination that the one or more input values of a second operation are ready and receiving the message. The one or more input values are ready after the completing the execution of the first operation. Afterwards, the automation system executes the second operation when the second operation has been identified as ready for execution, wherein execution of the second action occurs in parallel with operations to update the design-time flow plan.

In yet another embodiment, a flow engine that executes flow plans within a cloud computing environment. The flow engines obtain a run-time flow plan that comprises a trigger, a first operation, and a second operation, where the first operation precedes the second operation within the run-time flow plan and one or more input values of the second operation are linked to the first operation. The flow engine receives a message that one or more conditions of the trigger are met and subsequently executes the first operation. The flow engine receive a message to satisfy a condition of the second operation since the second operation is a dynamic mutable operation. The flow engine monitors whether the second operation is ready for execution based at least on a determination that the one or more input values of a second action operation are ready and receiving the message. The one or more input values are ready after the completing the execution of the first operation. The flow engine is able to insert one or more sub-plan operations within the run-time flow plan when the second operation is ready for operation and execute the second action operation when the second action operation has been identified as ready for execution.

In yet another embodiment, an automation backend system separate from a flow engine. The automation backend system creates a trigger for a design-time flow plan that activates when one or more computing conditions are met and defines a plurality of action instances for the design-time flow plan that would execute after the trigger activates. Each of the plurality of action instance includes a respective sequence of step instances associated with respective inputs and outputs. The automation backend system is able to save the design-time flow plan within a data model that includes an action type table that is linked to an action instance table, but not to a flow plan table.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
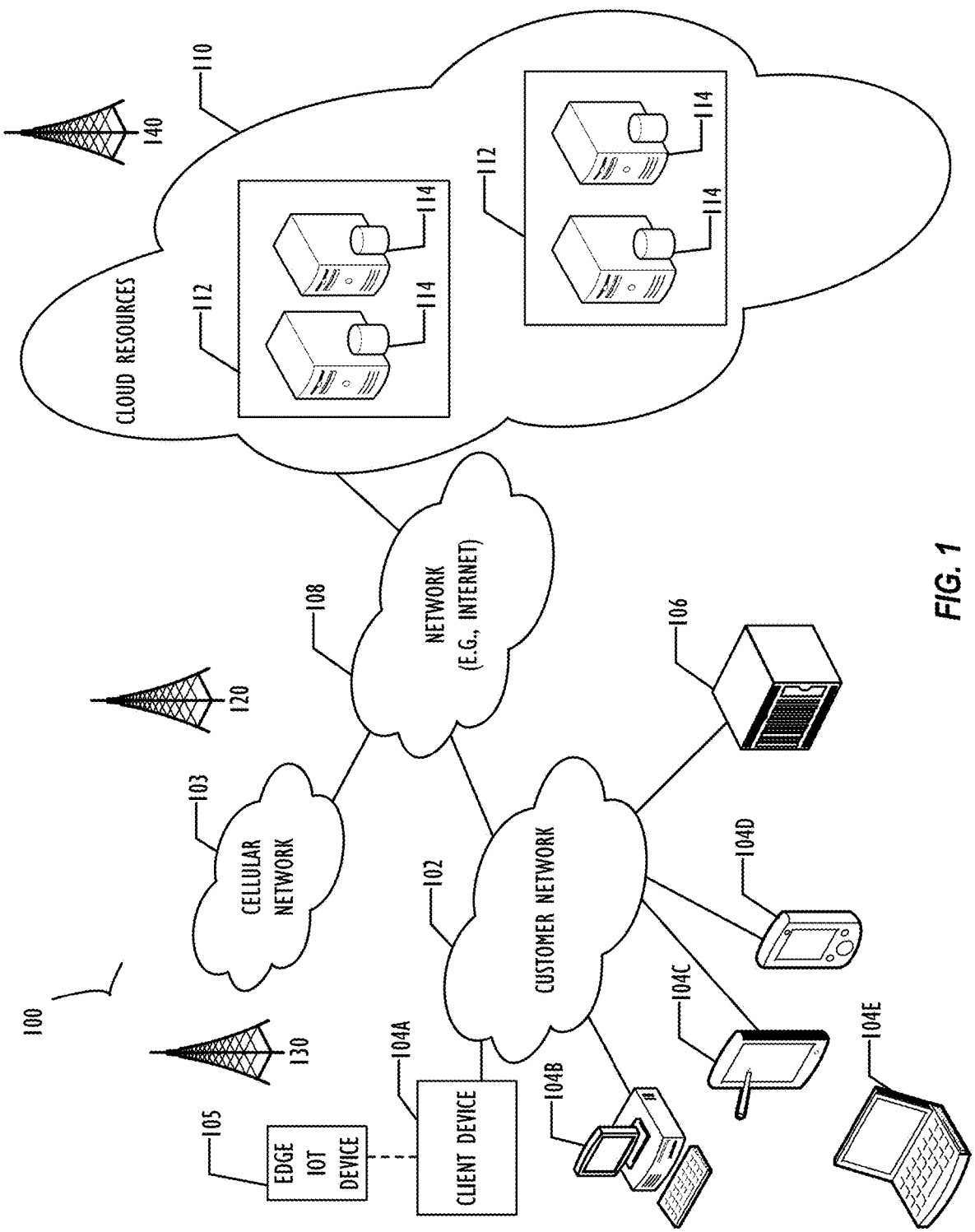
FIG. 1 illustrates a block diagram of an embodiment of a cloud computing system where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing system" refers to a single electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "flow plan" refers to a configured, automated process for addressing one or more work functions. In one or more embodiments, the work functions for the flow plan correspond to a variety of enterprise and/or other organization-relation functions. Categories of tasks that relate to enterprise and/or other organization functions include, but are not limited to HR operations, customer service, security protection, enterprise applications, IT management and/or operation, third party system integration, and Internet of Things (IoT) devices. In one embodiment, flow plans are created from a developmental platform, such as a Web 2.0 developmental platform written in Java® (JAVA is a registered trademark owned by Oracle America, Inc.) (e.g., Glide).

As used herein, the term "global state" refers to one or more global parameters or global variables that are accessible for an entire application. Examples of parameters or variables for a global state include, but are not limited to process and task execution statuses and resource conditions. In one embodiment, a centralized decision-making component, such as a centralized controller, is able to track the global state and determine execution orders for operations within a workflow.

The disclosure includes various example embodiments of an automation user interface system that simplifies and improves a user's ability to create and manage flow plans within a cloud computing environment. To create and manage flow plans, a developmental platform includes an automation system that minimizes the use of customized scripting and coding. To reduce the reliance on customized scripting and coding, the automation system provides an automation user interface system that includes a flow designer user interface that allows a user to arrange one or more action and trigger instances in a sequence to form a design-time flow plan, an action designer user interface that configures action instances by creating one or more step instances, and a construction API (e.g., Representational State Transfer (REST) API) that builds a data model within a database. The flow designer user interface, the action designer user interface, and the construction API drive the data model so that the design-time flow plan can be continuously updated and/or saved independent of any run-time operations (e.g., flow engine execution). In one embodiment, the action designer user interface may include an approval rule builder that creates approval action instances for a design-time flow plan. With the approval rule builder, a user is able to create one or more approval rules that a flow plan would need to satisfy before execution of the approval action instance and any other action instances linked to it. The automation user interface system may also include an operational view user interface that presents run-time exploration and analytics of executing and completed flow plans. For instance, during and/or after execution of a flow plan, the operational view user interface allows a user to follow the flow plan in platform and for integration use cases.

The disclosure also includes various example embodiments that save and update flow plans within a cloud computing environment. In one embodiment, the automation system saves and updates a flow plan as a data model within a database. The data model stores a design-time flow plan created from the flow designer user interface and action designer user interface as a set of relational tables that indicate a hierarchy of units of work. When a user publishes a design-time flow plan, the publishing operation creates a snapshot of a single master draft of the design-time flow plan. Creating a snapshot allows the automation system to preserve historical versions of the design-time flow plan while maintaining the single master draft. For example, the historical versions may be referenced when displaying an operational view of running flow plans even when a master draft being simultaneously edited or updated (e.g., being iterated on). A data model may also store a snapshot of an action instance when a user publishes an action instance using the action designer user interface. The automation system may also separate out the save and update operations of the data model from the flow engine execution. By separating out the data model from flow execution engine allows a user to save and update data model independently of any run-time operations (e.g., flow engine operations).

The disclosure also includes various example embodiments that execute flow plans within a cloud computing environment. Once the automation system receives instructions to publish the data model (e.g., via the automation user interface system) the automation system calls a flow builder API to generate a run-time version of the design-time flow plan based on the data model. A flow engine may execute the run-time flow plan without utilizing a global state to manage flow execution order and independent of any operations performed on the design-time flow plan. The flow engine may execute each operation within the run-time flow plan when it is ready to run and repopulates a queue as operations are executed until there are no remaining ready operations. An operation within the run-time flow plan may be ready to run when the operation's input values are ready and the flow engine has completed any predecessor operations. Additionally, a flow engine may include a messaging framework that create dynamic mutation operations that are tied to a specific message and/or instruction to support the execution of flow-based branching, looping, iterations, conditional logic, and execution on an secondary execution environment, such as a local compute resource or a management, instrumentation, and discovery (MID) server.

FIG. 1 illustrates a block diagram of an embodiment of a cloud computing system 100 where embodiments of the present disclosure may operate. Cloud computing system 100 comprises a customer network 102, network 108, and a cloud developmental platform network 110. In one embodiment, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi® networks (WI-FI is a registered trademark of the Wi-Fi Alliance), Bluetooth® (BLUETOOTH is a registered trademark of Bluetooth Special Interest Group)). In another embodiment, customer network 102 represents an enterprise network that could include or be communicatively coupled to one or more local area networks (LANs), virtual networks, data centers and/or other remote networks (e.g., 108, 110).

As shown in FIG. 1, customer network 102 may be connected to one or more client devices 104A-E and allow the client devices 104A-E to communicate with each other and/or with cloud developmental platform network 110. Client devices 104A-E may be computing systems such as desktop computer 104B, tablet computer 104C, mobile phone 104D, laptop computer (shown as wireless) 104E, and/or other types of computing systems generically shown as client device 104A. Cloud computing system 100 may also include other types of devices generally referred to as IoT (e.g., edge IoT device 105) that may be configured to send and receive information via a network to access cloud computing services or interact with a remote web browser application (e.g., to receive configuration information). FIG. 1 also illustrates that customer network 102 includes a local compute resource 106 that may include a server, access point, router, or other device configured to provide for local computational resources and/or facilitate communication amongst networks and devices. For example, local compute resource 106 may be one or more physical local hardware devices, such as a MID server that facilitates communication of data between customer network 102 and other networks such as network 108 and cloud developmental platform network 110. Local compute resource 106 may also facilitate communication between other external applications, data sources, and services, and customer network 102. Another example of a local compute resource 106 is a MID server Cloud computing system 100 also includes cellular network 103 for use with mobile communication devices. Mobile cellular networks support mobile phones and many other types of mobile devices such as laptops etc. Mobile devices in Cloud computing system 100 are illustrated as mobile phone 104D, laptop computer 104E, and tablet computer 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact other mobile devices or with non-mobile devices such as desktop computer 104B and various types of client device 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WAN), the Internet, and/or other remote networks, in order to transfer data between client devices 104A-D and cloud developmental platform network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio based network as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud developmental platform network 110 is illustrated as a remote network (e.g., a cloud network) that is able to communicate with client devices 104A-E via customer network 102 and network 108. The cloud developmental platform network 110 acts as a platform that provides additional computing resources to the client devices 104A-E and/or customer network 102. For example, by utilizing the cloud developmental platform network 110, users of client devices 104A-E may be able to build and execute applications, such as automated processes for various enterprise, IT, and/or other organization-related functions. In one embodiment, the cloud developmental platform network 110 includes one or more data centers 112, where each data center 112 could correspond to a different geographic location. Within a particular data center 112, a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java® Virtual Machine), and/or a database server instance (e.g., a unitary MySQL® catalog (MySQL® is a registered trademark owned by MySQL AB A COMPANY)).

To utilize computing resources within cloud developmental platform network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances (not shown in FIG. 1) are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multi-tenant environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causes outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the cloud developmental platform network 110, and customer-driven upgrade schedules. An example of implementing a customer instance within a multi-instance cloud architecture will be discussed in more detail below when describing FIG. 2.

Figure 3:
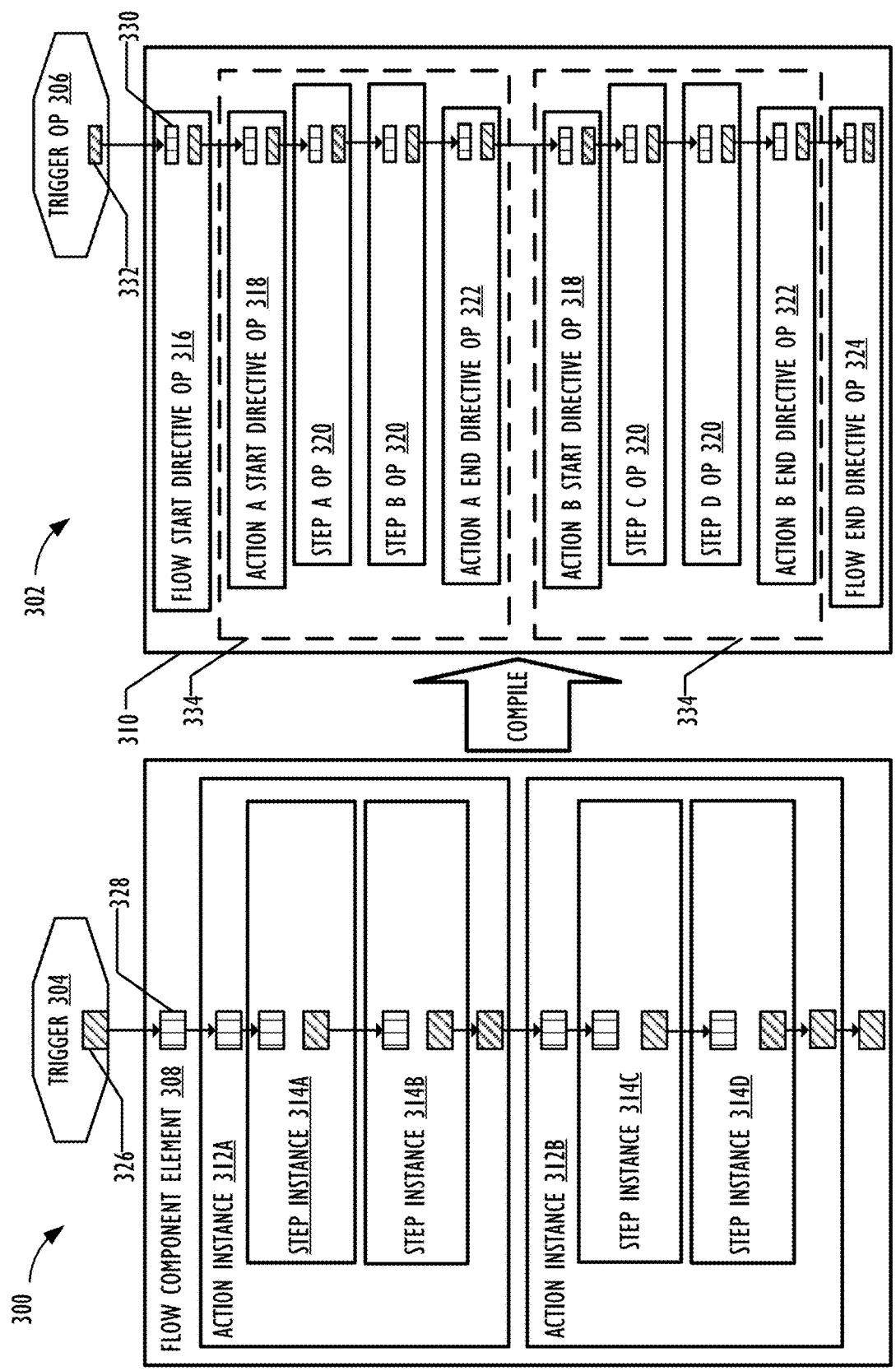
FIG. 3 is an illustration that maps the relationship between a design-time flow plan and a run-time flow plan.

In one embodiment, utilizing a multi-instance cloud architecture, a customer instance may be configured to utilize an automation system (not shown in FIG. 1) that creates, saves, updates, manages and/or executes flow plans. In particular, the automation system can create and update design-time flow plans and subsequently convert the design-time flow plan into a run-time flow plan for execution. As used herein, the term "design-time flow plan" refers to a flow plan built during the creation phase and prior to being converted (e.g. compiled) by a flow plan builder API. In one embodiment, the design-time flow plan contains one or more trigger instances, action instances, and step instances. A trigger instance refers to a process that initiates when a certain condition or event is met (e.g., a record matching a filter is changed, a timer expires, and an inbound REST call arrives). An action instance refers to one or more step instances (e.g., a sequence of step instances) that processes some defined set of input values to generate a defined set of output values. The action instances can be linked together and along with the trigger instance to form the design-time flow plan. During the flow plan execution phase, the automation system may execute a run-time version of the design-time flow plan using one or more flow engines. As used herein, the term "run-time flow plan" refers to a run-time engine implementation of a flow plan operating during execution phase and after being converted (e.g., compiled) by a flow plan builder API. In one embodiment, the run-time flow plan can be implemented as Java® Script Object Notation (JSON) document that includes a plurality of definitions. FIG. 3, which is discussed in detail below, illustrates an example of a design-time flow plan and a run-time flow plan.

In reference to the flow plan creation phase, in one embodiment, the automation system includes an automation user interface system for creating a design-time flow plan. The automation user interface system may utilize a flow designer user interface, an action designer user interface, and construction API to drive a data model that represents the design-time flow plan. A user may use the automation user interface system to create new design-time flow plans and/or update an already existing design-time flow plan. The new design-time flow plans and/or changes made to existing design-time flow plans are stored as data models within in a database located in the cloud developmental platform network 110. When a user is satisfied with the created and/or updated design-time flow plan, the user can subsequently publish the design-time flow plan. During publication of the design-time flow plan, a flow builder API coverts (e.g., compiles) the stored data model into a run-time flow plan that a flow engine within the cloud developmental platform network 110 and/or local compute resource 106 executes.

The flow designer user interface is configured for a user to create and modify a human-readable version of the design-time flow plan. The flow designer user interface can include trigger indicators, action indicators, and step indicators representative of the design-time flow plan's trigger, action, and step instances, respectively. In one embodiment, each of the indicators may be a graphical representations, such as graphics icons, where different graphic icons could represent the different types of trigger, action, and/or step instances. The flow designer user interface may connect and arrange the indicators based on how data routes amongst the trigger, action, and step instances. As an example, a flow designer user interface may link a trigger indicator to a given action indicator when the output values of the corresponding trigger instance are linked to input values for the given corresponding action instance. The flow designer user interface may also include labels (e.g., characters, numbers, and other text) that represent whether each indicator corresponds to a trigger instance, action instance, or step instance. Additionally or alternatively, the flow designer user interface may include annotations that summarize the functional operations for each of the indicators and/or provide user added commentary for the design-time flow plan. In one or more embodiments, the flow designer user interface may also include a test indicator that allows a user to test and simulate a flow plan based on user supplied inputs. Additionally or alternatively, the flow designer user interface may also allow a user to select and reuse pre-existing or copied action instances (e.g., action instances associated with a third party system) when adding action instances within a design-time flow plan. Example embodiments of the flow designer user interface are discussed in more detail in FIGS. 7-9.

A user is able to access the action designer user interface to create, reuse, and modify action and step instances of the design-time flow plan. In one embodiment, a user may be able to access the action designer user interface from the flow designer user interface. When designing an action instance, a user creates a specific action type by including one or more step instances within a sequence. A user is able to add or modify step instances by selecting from a list of pre-existing step types that include, but are not limited to creating tasks, creating records, updating records, looking up records, creating approvals, deleting records, sending emails, performing a REST web service request, creating custom script, and triggering a notification. A user may also be able to set the action instance's inputs and outputs with the action designer user interface. Example embodiments of the action designer user interface are discussed in more detail in FIGS. 10-17.

As an example, the action designer user interface may be able to create an approval step instance within an action instance without the use of customized script or code. To avoid customized script or code, the action designer user interface may include an approval rule builder that sets one or more rules that create an approval condition for the approval step instance. Subsequent step instances linked to the approval step instance may not execute until the flow plan receives an expected instruction (e.g., approval or rejection instruction) to evaluate the approval condition. For example, the action designer user interface may set an approval condition where a flow plan needs to manually receive an approval or rejection instruction from a specified user. Until the specified user sends out the approval or rejection instruction, the flow plan is in a wait state and does not execute any subsequent action and/or step instances. The approval rule builder may be configured to setup rules that allows a list of users, a list of groups, or a dynamic group to provide instructions (e.g., approval or rejection instructions) to an approval step instance. In one embodiment, the action designer user interface may be able to create an auto approve function that approves the approval step instance if no instructions are sent to handle the approval condition. Example embodiments of the approval rule builder and approval step process are discussed in more detail in FIGS. 14-17.

The automation system stores the design-time flow plan that a user builds with the flow designer user interface and action designer user interface as a data model. The data model represents the design-time flow plan and instances using flow plan entities, trigger entities, action entities, and step entities. The action entities and step entities within the data model may include action types and step types that define each of the action instances and step instances. For example, an action instance may be associated with an action type that the data model defines by its inputs, outputs, and associated step instances, where each step instance is of a certain step type. The data model may also describe how data routes between the step instances within an action type and between trigger and action instances within a flow. In one embodiment, the data model represents the flow plan entities, trigger entities, action entities, and step entities as a set of relational tables organized within multiple hierarchal layers. Example embodiments of the data model is discussed in more detail with reference to FIGS. 18 and 19.

To enter the flow plan execution phase, the automation system compiles the data model representation of the design-time flow plan after receiving a publish instruction via the automation user interface system. During the flow plan execution phase, the flow engine within the cloud developmental platform network 110 executes run-time flow plans that are directed to acyclic graphs of operations that move data between operation nodes in a declarative manner as each operation completes. Each operation node in the run-time flow plan may have data signatures defining input and output values. Input values may be fixed values (e.g., hard coded to specific values), registered as an observer of a previous operation node, left unassigned, or a combination thereof. Operation nodes may also be registered as a descendent of a previous node. A flow engine executes an operation node once the operation node's input values have been supplied and once, if any, of the operation node's ancestor operation nodes have completed successfully. In one embodiment, operations can be written in Java® by extending a base operation class, where the contract is to implement a run method and declare data signatures. The flow engine can opaquely execute the operations within the flow plan and propagate data values based on the execution of the operations. Operations can also be synchronous by design and can be configured to execute in a single and/or multiple threads.

In one or more embodiments, the flow engine may support conditional logic (e.g., looping and branching) and iterations by implementing a messaging framework that creates dynamic mutation operations that are tied to a specific message and/or instruction. The flow engine may include a messaging API that allows messages and/or instructions to be sent to one or more dynamic mutation operations in a run-time flow plan. If at least one of the dynamic mutation operations has a listening operation that matches a specific received message and/or instruction, the dynamic mutation operation can be marked as ready to execute. Stated another way, dynamic mutation operation within a run-time flow plan can be configured to allow and/or create additional specific action instance or step instance to execute when the dynamic mutation operations receives the message and/or instruction. For example, the flow engine may implement a callback type of functionality such that every time the dynamic mutation operation receives a message, a new callback operation is generated and added to the run-time flow plan. In particular, the flow engine may add operations into the run-time flow plan each time one or more message handlers within the flow engine receives the message. The flow engine is discussed in more detail with reference to FIGS. 5 and 20.

Additionally, the messaging framework may also support executing at least a portion of the run-time flow plan on separate computing device. Using FIG. 1 as an example, a computing device associated with customer network 102, such as local compute resource 106, can execute at least a portion of the run-time flow plan. In this embodiment, the automation system includes a second flow engine located on the local compute resource 106. Other embodiments of the automation system may use other secondary execution environments besides a local compute resource 106. The automation system may be able to offload the execution of the run-time flow plan to the local compute resource 106 in situations where the customer instance is unable to perform certain operations within the flow plan and/or would require too much computational resources. For example, the automation system may offload portions of the flow plan to the local compute resource 106 in order to obtain data and/or transfer data to other server instances 114 that the customer instance does not have permission to access. Utilizing a flow engine on a local compute resource 106 is described in more detail with reference to FIG. 6.

The automation user interface system may also include an operational view user interface that provides configuration and run-time information for an executing and/or completed flow plan. In one or more embodiments, the operational view user interface may provide configuration and run-time information of executing and/or completed flow plans while a user simultaneously modifies the corresponding flow plans within the one or more other user interfaces. The operational view user interface includes one or more state indicators that provide the overall state of a flow plan and the state of a trigger instance and/or one or more action instances. Examples of state indicators include a "wait" state, "not run" state, a "completed" state, and a "failed" state. For example, the state indicators may reveal that a flow plan is overall currently in a "wait" state, where one or more action and/or step instances could have finished execution, has yet to run, failed, or currently in a "wait" state.

The operational view user interface may also provide other metrics relating to the execution of the trigger instances, action instances, and/or step instances, such as the start time for each of the instances and the amount of time to complete the execution of the different instances. Additionally, the operational user interface is able to expand selected action and/or step instances to provide more detail without switching to another user interface or window outside the operational view user interface. The operational view user interface can display each input and/or output values and runtime values for an action instance. The operational view user interface may also provide consolidated logs associated with each action instance to allow for in-line debugging. As an example, if the step instances is to create a task within a virtual task board (VTB), then expanding the create VTB task step instance could provide run-time values and the ability to link back to the VTB record. In some cases, the operational view user interface may provide a preview window to view the VTB record prior to opening the link to the VTB record.

The automation system within the cloud developmental platform network 110 can create and execute flow plans that support a broad-range of uses cases pertaining to automating enterprise, IT, and/or other organization-related functions. The automation system may also be able to accommodate different user personas, such as IT workers and programmers to process-orientated non-IT line of enterprise customers. For example, one use case involves creating and executing a flow plan pertaining to security incident notification. In this use case, a user can design the flow plan's trigger to initiate when a recorded incident is created in a specific security category. In response to this trigger, the flow plan creates a task for the Security Response Team to immediately investigate the incident, and send potential security breach notifications. Additionally, the flow plan may as provide that when the Security Response Team closes out the created task, the recorded incident is updated with the finding of the Security Response Team. In another use case example, an HR department of an organization wants to create and execute a flow plan for a pre-on boarding process that creates employee records, sends out reminder notifications, and creates user accounts of various systems. HR personnel may want to configure created employee records via a client device using an HR application as well as what notifications need to be sent and when. Using the automation system, the HR application can construct pieces of the flow plan from the HR application's internal data model, create triggers that execute the various tasks when required, and have the flow plan start actions to create to appropriate records when a person is hired.

Figure 2:
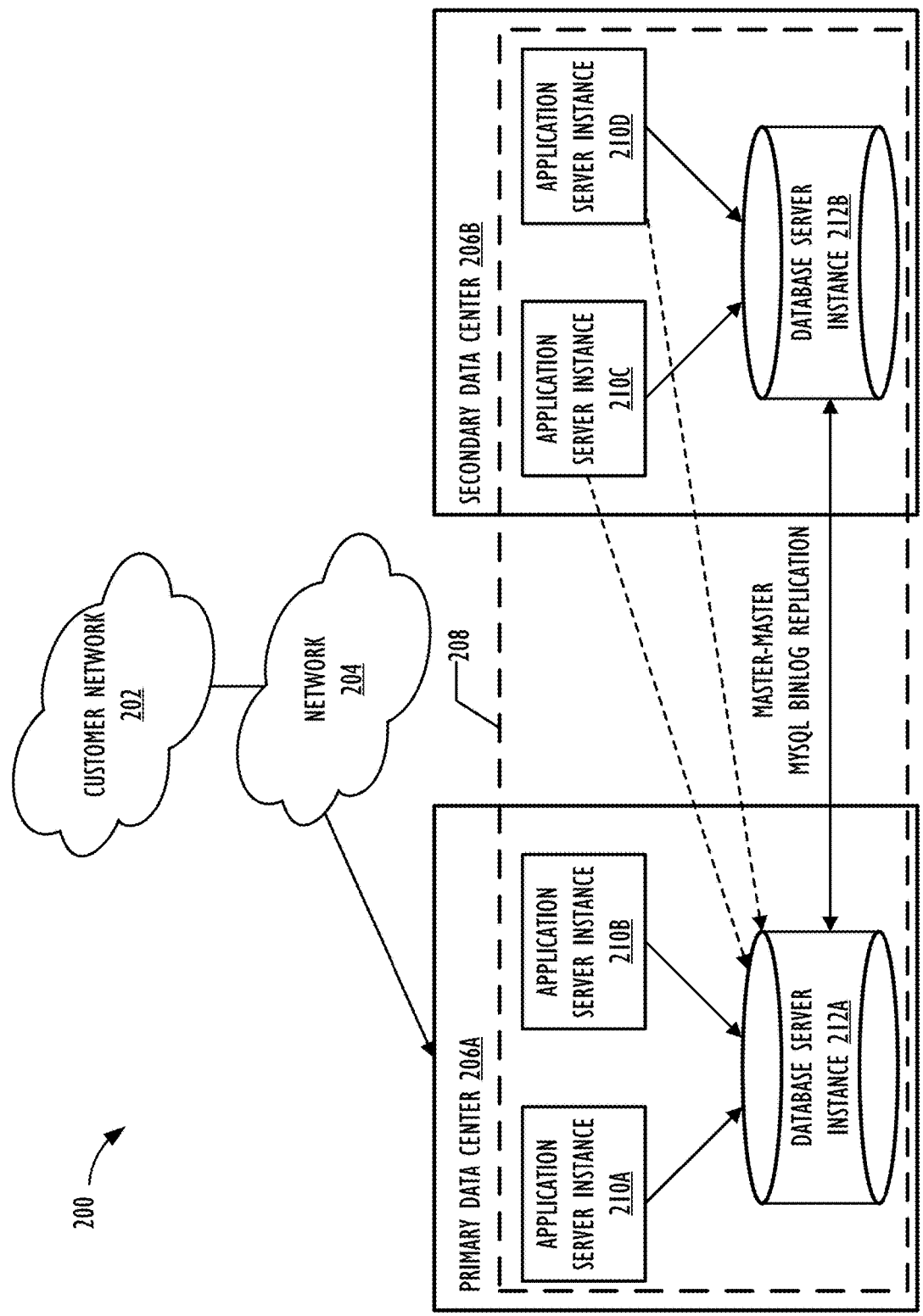
FIG. 2 is a block diagram of an embodiment of a multi-instance cloud architecture where embodiments of the present disclosure may operate herein.

FIG. 2 is a schematic diagram of an embodiment of a multi-instance cloud architecture 200 where embodiments of the present disclosure may operate herein. FIG. 2 illustrates that the multi-instance cloud architecture 200 includes a customer network 202 that connects to two data centers 206a and 206b via network 204. Customer network 202 and network 204 may be substantially similar to customer network 102 and network 108 as described in FIG. 1, respectively. Data centers 206a and 206b can correspond to FIG. 1's data centers 112 located within cloud developmental platform network 110. Using FIG. 2 as an example, a customer instance 208 is composed of four dedicated application server instances 210a-210d and two dedicated database server instances 212a and 212b. Stated another way, the application server instances 210a-210d and database server instances 212a and 212b are not shared with other customer instances 208. Other embodiments of the multi-instance cloud architecture 200 could include other types of dedicated server instances, such as a web server instance. For example, the customer instance 208 could include the four dedicated application server instances 210a-210d, two dedicated database server instances 212a and 212b, and four dedicated web server instances (not shown in FIG. 2).

To facilitate higher availability of the customer instance 208, the application server instances 210a-210d and database server instances 212a and 212b are allocated to two different data centers 206a and 206b, where one of the data centers 206 acts as a backup data center. In reference to FIG. 2, data center 206a acts as a primary data center 206a that includes a primary pair of application server instances 210a and 210b and the primary database server instance 212a for the customer instance 208, and data center 206b acts as a secondary data center 206b to back up the primary data center 206a for a customer instance 208. To back up the primary data center 206a for the customer instance 208, the secondary data center 206 includes a secondary pair of application server instances 210c and 210d and a secondary database server instance 212b. The primary database server instance 212a is able to replicate data to the secondary database server instance 212b. As shown in FIG. 2, the primary database server instance 212a replicates data to the secondary database server instance 212b using a Master-Master MySQL Binlog replication operation. The replication of data between data could be implemented by performing full backups weekly and daily incremental backups in both data centers 206a and 206b. Having both a primary data center 206a and secondary data center 206b allows data traffic that typically travels to the primary data center 206a for the customer instance 208 to be diverted to the second data center 206b during a failure and/or maintenance scenario. Using FIG. 2 as an example, if the application server instances 210a and 210b and/or primary data server instance 212a fails and/or is under maintenance, data traffic for customer instances 208 can be diverted to the secondary application server instances 210c and 210d and the secondary database server instance 212b for processing.

Although FIGS. 1 and 2 illustrate specific embodiments of a computing system 100 and a multi-instance cloud architecture 200, respectively, the disclosure is not limited to the specific embodiments illustrated in FIGS. 1 and 2. For instance, although FIG. 1 illustrates that the cloud developmental platform network 110 is implemented using data centers, other embodiments of the of the cloud developmental platform network 110 are not limited to data centers and can utilize other types of remote network infrastructures. Moreover, other embodiments of the present disclosure may combine one or more different server instance into a single server instance. Using FIG. 2 as an example, the application server instances 210 and database server instances 212 can be combined into a single server instance. The use and discussion of FIGS. 1 and 2 are only examples to facilitate ease of description and explanation and are not intended to limit the disclosure to the specific examples.

Design-Time Flow Plan and Run-Time Flow Plan

FIG. 3 is an illustration that maps the relationship between a design-time flow plan 300 and a run-time flow plan 302. As shown in FIG. 3, the design-time flow plan 300 may include a trigger instance 304 and a flow component element 308. The flow component element 308 includes a plurality of action instances 312, where each action instance 312 includes step instances 314. The action instance 312 may be considered an abstraction boundary that is generally defined in domain terms and the step instances is typically defined in application platform based specific terms, such as a script and/or create, read, update and delete (CRUD) operations on a specific data structure, approvals, messaging operations (e.g., send notification or email), VTB operations (e.g., create VTB board), and/or third party operations (e.g., Security Operations (SecOps)). The trigger instance 304, action instances 312 and step instances 314 can be customized, modified, and updated using the automation system. For example, a user may set when the design-time flow plan 300 should execute by configuring the trigger instance 304.

Based on configurations implemented within an automation user interface system, the automation system is able to link input values within an input signature 328 of a given instance (e.g., trigger instance 304, action instances 312, and step instances 314) with output values within an output signatures 326 of other instances and/or input values of instances located within the given instance. The linking between the input values and output values create an observer and observable type of relationship between the different component instances. For example, input values for one or more step instances 314 located within a given action instance 312 can observe a given action instance's 312 input values. By linking the input values of a given instance to output values of other instances, a user is able to create a serializable run-time flow plan 302 during execution. In addition to having input values of a given component instance register as an observer of input values and/or output values of previous component instances, the input signature of the given component instance register could include input values that have fixed values (e.g., hard coded), are left unset, or combinations thereof.

FIG. 3 depicts that the trigger instance 304 includes an output signature 326, and the flow component element 308, action instances 312, and step instances 314 include both input signatures 328 and output signatures 326. The trigger instance's 304 output signature 326 links to the flow component element's 308 input signature 328. The flow component element's 308 input signature 328 then becomes action instance's 312a input signature 328, which then is linked to step instance's 314a input signature 328. Step instance's 314b input signature 328 then observes step instance's 314a output signature 326. Step instance's 314b output signature 326 subsequently links to action instance's 312a output signature 326. Action instance's 312b input signature 328 then observes action instance's 312a output signature 326. In FIG. 3, the input signatures 328 and output signatures 326 for step instances' 314c and 314d located within action instance 312b follow a similar observer/observable relationship as described for step instances 314a and 314b. Action instance's 312b output signature 326 is then linked to the flow component element's 308 output signature 326.

Once a user is done creating and/or modifying the design-time flow plan 300, a user may provide instructions to publish the design-time flow plan 300 via the automation system. In response to receiving the publish instructions, the automation system's flow builder API converts (e.g., compiles) the design-time flow plan 300 to generate a run-time flow plan 302. The flow builder API provides a structure to add step instances 314 to action instance 312 and action instance 312 to flow component element 308. In one embodiment, as the flow builder API adds a step instance 314 into an action instance 312, the flow builder API coverts the step instance 314 into an OpDatum record in the run-time flow plan's 302 action 334. As the flower builder API adds an action instance 312 to the flow component element 308, action instance's 312 operation plans are added to the flow operation 310.

FIG. 3 illustrates the resulting run-time flow plan 302 after compiling the design-time flow plan 300. In FIG. 3, the run-time flow plan 302 includes a trigger operation 306 and flow plan operation 310. The trigger operation 306 can include a responder that executes flow plan operation 310 stored with the trigger operation 306. Examples of types of trigger operations 306 include a record watcher trigger created to execute flow plan operation 310 for a record that meets specific conditions, scheduled triggers created to flow plan operation 310 periodically or once at a specific time, and REST triggers created to execute the flow plan operation 310 in response to inbound REST requests. Other embodiments of the design-time flow plan 300 and corresponding run-time flow plan 302 can include other types of triggers.

The flow plan operation 310 includes a serializable set of operations 316, 318, 320, 322, and 324, where each operation includes input signatures 330 and output signatures 332. As shown in FIG. 3, the flow plan operation 310 includes a flow start directive operation 316 that contains the input signature 330 of the flow plan operation 310, which observes the trigger operation's output signature 332. Similarly, the flow plan operation 310 includes a flow end directive operation 324 that hosts the output signature 332 for the flow plan operation 310. A flow engine that executes the flow plan operation 310 may minimize database operations within a configuration management database (CMDB) to a read operation corresponding to flow start directive operation 316 and a write operation corresponding to the flow end directive operation 324. When executing the flow plan operation 310, the flow engine can avoid other database operations within the CMDB, such as managing a global state.

Each action 334 likewise gets an action start directive operation 318 and action end directive operation 322. Recall that when creating the design-time flow plan 300, a user may map the input signatures 330 of the action instances 312 from the flow component element 308 or from other action instances 312. The flow start directive operation 316, action start directive operation 318, and/or end directive operations 322 provide a structure in the flow plan operation 310 for the mapping of input signatures 330. Within an action 334, each step operation 320 may become a single operation. The step operation 320 may have its inputs values mapped from the action's 334 input signature, which is hosted on the action start directive operation 318, or from a predecessor step operation 320. As shown in FIG. 3, input values within input signatures 330 may reference output values found within output signatures 332.

Although FIG. 3 illustrates specific embodiments of a design-time flow plan 300 and a run-time flow plan 302 that arranges actions (e.g., action instance 312a and action 334) in a linear sequence, the disclosure is not limited to the specific embodiments illustrated in FIG. 3. For instance, other embodiments of the design-time flow plan 300 and a run-time flow plan 302 could include branching, looping, and/or parallel execution semantics. Stated another way, the design-time flow plan 300 and a run-time flow plan 302 may be configured to include dynamic mutation operations that dynamically create actions and/or operations that execute repeatable operations over sets of data and/or while a condition state exists. Moreover, the design-time flow plan 300 and a run-time flow plan 302 may be configured to include conditional logic that optionally executes actions and/or operations based upon a condition state. The use and discussion of FIG. 3 is only an example to facilitate ease of description and explanation and are not intended to limit the disclosure to the specific examples.

Figure 4:
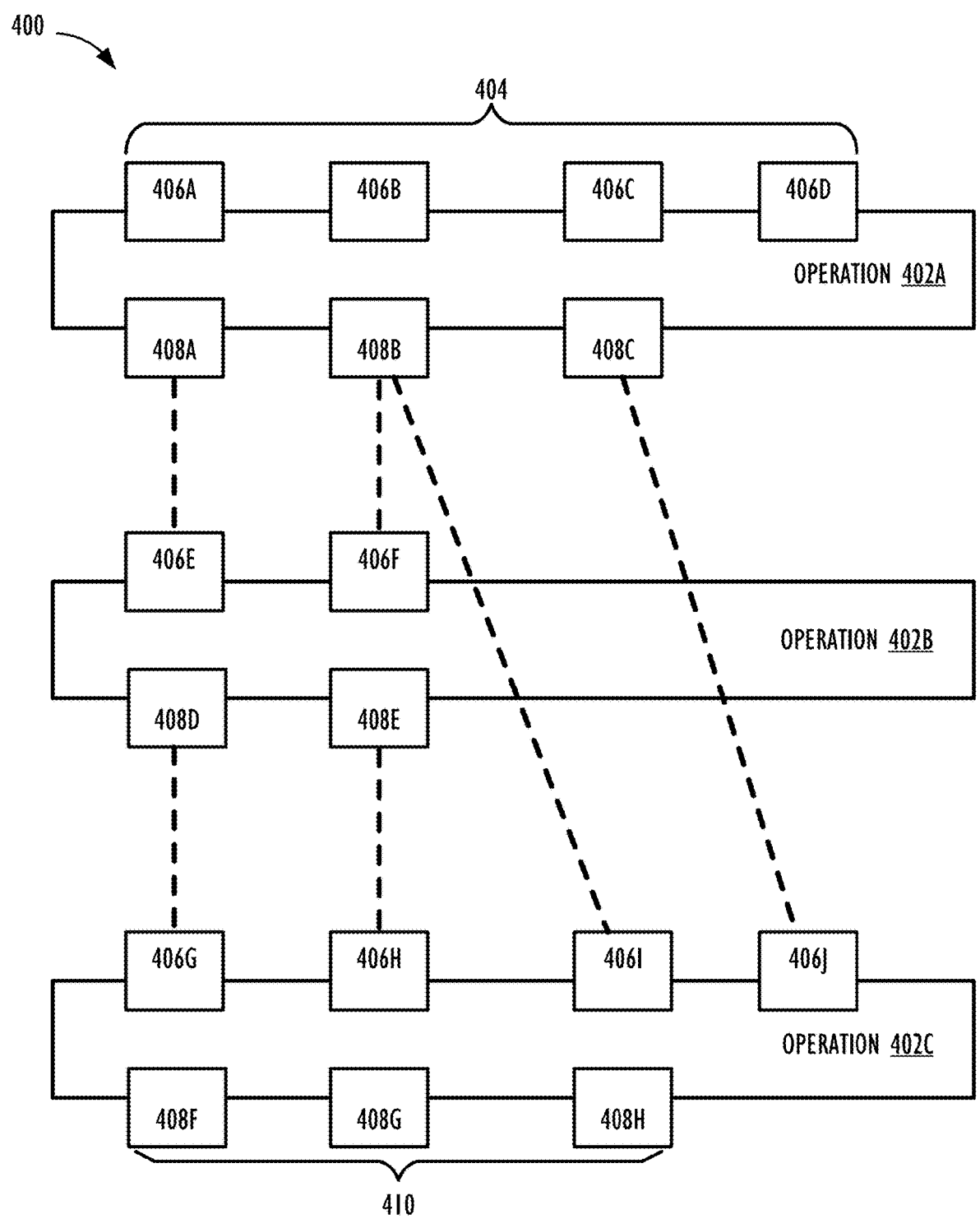
FIG. 4 illustrates a serializable set of operations that corresponds to a portion of a run-time flow plan.

FIG. 4 illustrates a serializable set of operations 402a-402c that corresponds to a portion of a run-time flow plan 400. For example and in reference to FIG. 3, operations 402a can correspond to an action start directive operation 318 and operations 402b and 402c correspond to step operations 320. In another example in reference to FIG. 3, operations 402a-402c could correspond to step operations 320. FIG. 4 depicts that the each operation 402a-402c in the run-time flow plan 400 has an input signature 404 and output signature 410. The input signature 404 includes input values 406a-406j and the output signatures 410 include output values 408a-408h. The input values 406a-406j and output values 408a-408h are linked together to implement a serializable, observer/observable relationship between the operations 402a-402c. As operations 402a-402c complete and populate their output values 408a-408h with data, the output values 408a-408h will notify all of its registered observer input values 406a-406j. When a flow engine queries the input values 406a-406j as to their status, the input values 406a-406j will report that they are not ready if the input values 406a-406j have not been notified of their value by their registered observable output values 408a-408h. If the input values 406a-406j have been notified, or are not observing anything, the input values 406a-406j report as ready.

As a serializable set of operations, operations 402a-402c are unable to execute until their observer input values 406 have been notified of their value and/or any predecessor operations 402 have been completed. As shown in FIG. 4, operation 402a may include an input signature 404a that includes four input values 406a-406d and an output signature 410a with three output values 408a-408c; operation 402*b* may include an input signature 404*b* that includes two input values 406*e* and 406*f* and an output signature 410*b* with two output values 408*d* and 408*e*; and operation 402*c* may include an input signature 404*c* that includes four input values 406*g*-406*j* and an output signature 410*c* with three output values 408*f*-408*h*. In response to operation 402*a* receiving and/or being notified of input values 406*a*-406*d* are ready, operation 402*a* executes to produce output values 408*a*-408*c*. Input values 406*e* and 406*f* of operation 402*b* observes the output values 408*a* and 408*b*, respectively, and input values 406*i* and 406*j* of operation 402*c* observes the output values 408*b* and 408*c*, respectively. Once operation 402*a* finishes execution, operation 402*b*'s input values 406*e* and 406*f* are ready and operation 402*b* is then able to execute to produce the two output values 408*d* and 408*e*. The input values 406*g* and 406*h* from operation 402*c* observe the two output values 408*d* and 408*e*. After operation 402*b* executes and notifies operation 402*c* that input values 406*g* and 406*h* are ready and operation 402*a* executes and notifies operation 402*c* input values 406*i* and 406*j* are ready, operation 402*c* executes to produce output values 408*f*-408*h*.

General Architecture of the Automation System

Figure 5:
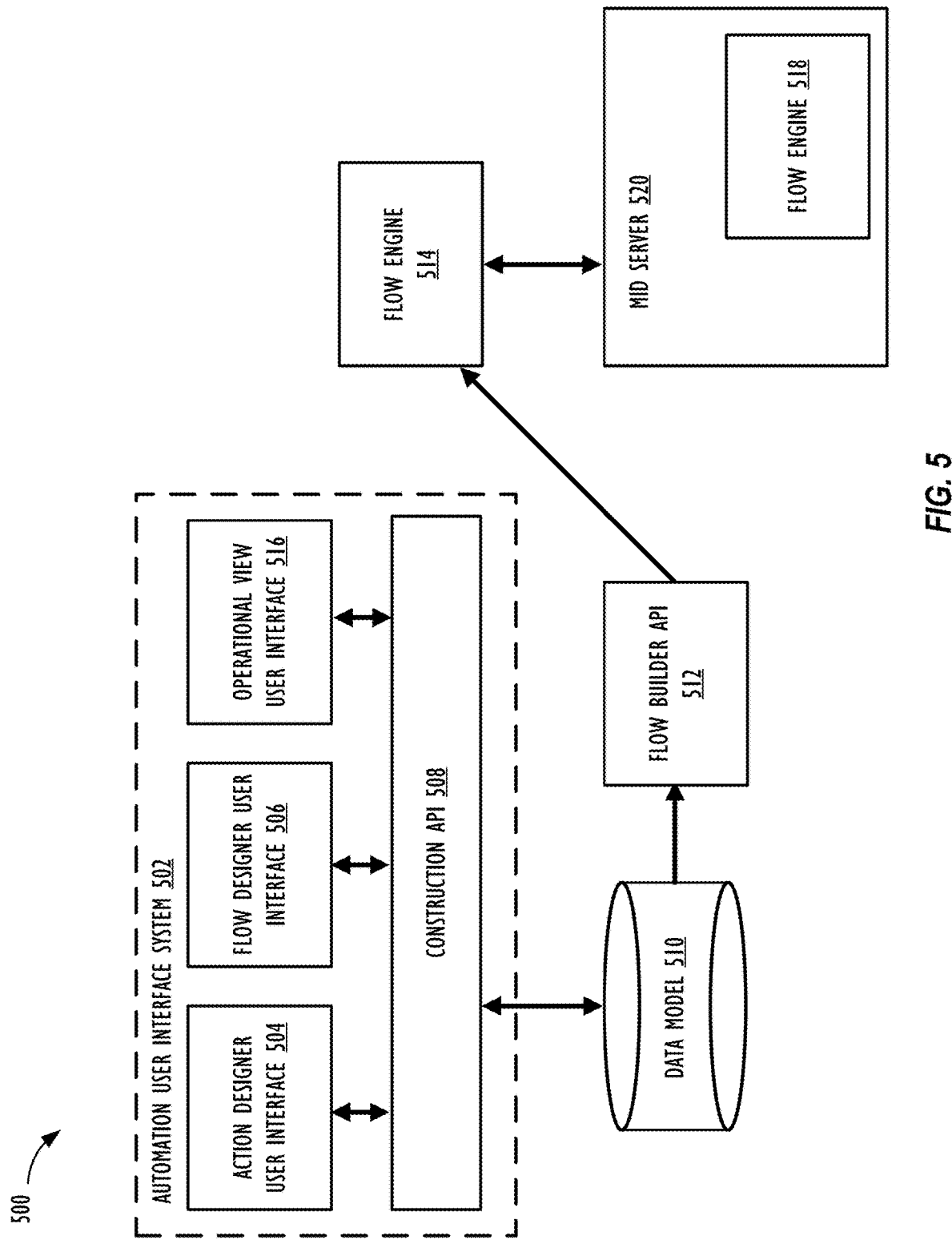
FIG. 5 is block diagram of an embodiment of an automation system within a development platform for creating, modifying, managing, and executing a flow plan.

FIG. 5 is a schematic diagram of an embodiment of an automation system 500 within a development platform for creating, modifying, managing, and executing a flow plan. The automation system 500 may separate out the user experience in creating the design-time flow plan from run-time considerations of storing and executing the run-time flow plan. In particular, the automation system 500 uses an automation system user interface 502 to create the design-time flow plan and store the design-time flow plan using a data model 510 that is independent from flow engine operations. Stated another way, the flow engines 514 and 518 are configured to have no knowledge of the data model 510 that includes database structures that represent a design-time flow plan.

The flow engines 514 and 518 may execute a run-time version of the design-time flow plan, which in one embodiment is a compiled JSON documents built via a flow plan builder API 512. Client devices, such as client devices 104A-C shown in FIG. 1, are able to call the flow plan builder API 512 to construct the JSON documents and may not need to adhere to any specific rules about how, where, or even whether, to store the definitions within the JSON documents. Additionally, by having the data model 510, which is a database representation of the design-time flow plan, separate from the run-time flow plan, a flow engine 518 can be implemented on a MID server 520 or some other alternative execution environment using the same engine code base as being executed on a server instance. The run-time flow is constructed from operations with data dependencies between each of the operations. The flow engines 514 and 518 may be able to execute the operation such that the data dependencies are met along with any explicitly execution order dependencies. The details of how any given operation performs or executes its functions are abstracted away from the flow engines 514 and 518.

In one embodiment, the automation user interface system 502 may be implemented using a Java®-based client device to construct the flow plan and request the flow engines 514 and/or 518 to run the flow plan. Creating a flow plan may involve defining what and how a flow plan performs an automated function. The user via the automation user interface system 502 could build a trigger instance, a series of action instances, and variable bindings and chain them together into a flow plan. How the user constructs the design-time flow plan can be entirely up to the user. For example, a design-time flow plan can be metadata driven or it can be hard-coded. Once automation system 500 constructs and generates the design-time flow plan, the user can choose to save the design-time flow plan for future execution, or simply provide instructions (e.g., publish) to pass the design-time flow plan to the flow engines 514 and/or 518 for immediate execution.

To create a flow plan, the automation user interface system 502 may include a flow designer user interface 506, which in one or more embodiments, may be displayed on a client device that receives user inputs (e.g., mouse and keyboard inputs). The flow designer user interface 506 allows a user to arrange and connect trigger and action instances together to form a design-time flow plan. A user may be able to create the design-time flow plan based on employing a general pattern of when one or more specified conditions or events occur, perform one or more of the following actions. In other words, a user can create a design-time flow plan via the flow designer user interface 506 by specifying one or more trigger instances for a design-time flow plan and one or more action instances that follow in response to the triggers. For example, a user may create a design-time flow plan for a financial enterprise operation that triggers when a specific incident report is created (e.g., a created report that customer lost credit card). The creation of the specific incident report results in the creation of a financial action (e.g., lookup credit card account information). The creation of the financial action can use some of the data from the triggering event, which in this example would be the creation of the specific incident report, as an input signature (e.g., name of credit card holder and credit card number) for the created action. The design-time flow plan could also include other financial actions (e.g., cancelling credit card) with other input signatures. Example embodiments of flow designer user interfaces 506 that improve and simplify the creation of a design-time flow plan are discussed and shown in FIGS. 7-9.

The action designer user interface 504 allows the user to construct customizable action instances within the design-time flow plan. Each action within the design-time flow plan can include one or more step instances. In one embodiment, each step instances includes a configured step instance template that specifies the operation to perform, defines the input and output data signatures for the step instance, and what data values to pass to other step instances in the design-time flow plan. The input signatures for the step instance can be a fixed value, registered as an observer of one of a previous step instance's output, left unset, or combinations thereof. The step instances may also provide the input signature to a step operation to produce an output data signature. The step instance can then be configured to pass the output data signature to one or more other step instances within the same action instance and/or other action instances within the design-time flow plan. Example embodiments of an action designer user interface 504 that improve and simplify the design process are discussed and shown in FIGS. 10-14.

The automation user interface system 502 may also include an operational view user interface 516 that provides configuration and run-time information for an executing and/or completed flow plan. In one or more embodiments, the operational view user interface 516 may provide configuration and run-time information of executing and/or completed flow plans while a user simultaneously modifies the corresponding flow plans within the one or more other user interfaces. To provide configuration and run-time information, the operational view user interface 516 includes one or more state indicators that provide the overall state of a flow plan and the state of a trigger instance and/or one or more action instances. Examples of state indicators include a "wait" state, "not run" state, a "completed" state, and a "failed" state.

The operational view user interface 516 may also provide other metrics relating to the execution of the trigger instances, action instances, and/or step instances, such as the start time for each of the instances and the amount of time to complete the execution of the different instances. Additionally, the operational view user interface 516 is able to expand selected action and/or step instances to provide more detail without switching to another user interface or window outside the operational view user interface. The operational view user interface can also display each input and/or output values and runtime values for an action instance. The operational view user interface may also provide consolidated logs associated with each action instance to allow for in-line debugging. As an example, if the step instances is to run a script, the operational user interface allows a user to drill down view the script step configuration and the runtime details. The operational view user interface 516 may be able open additional windows when a user selects, for example, the run-time details. Example embodiments of an operational view user interface 516 that allows a user to follow a flow plan during execution and/or after execution are discussed and shown in FIGS. 26-31.

FIG. 5 also depicts that the automation user interface system 502 includes a construction API 508, such as a web service API (e.g., REST API), to interface with a CMDB that creates a data model 510 representative of the design-time flow plan. As the flow designer user interface 506 and the action designer user interface 504 receive user inputs relating to the creation of the design-time flow plan, the flow designer user interface 506 and/or action designer user interface 504 may call a construction API 508 to update the data model 510. The data model 510 acts as a database structure that defines the design-time flow plan as a user continuously modifies the design-time flow plan. In one embodiment, once a user is done modifying the design-time flow plan, the user via the flow designer user interface 506 and/or the action designer user interface 504 can save the design-time flow plan for later execution or provide instructions to publish the design-time flow plan.

The data model 510 for representing the design-time flow plan may include flow plan entities, trigger entities, action entities, and step entities. When a user creates a design-time flow plan using the automation user interface system 502, the data model 510 represents the design-time flow plan and instances using flow plan entities, trigger entities, action entities, and step entities. Recall that a design-time flow may include trigger instances and action instances, while action instances include step instances. The action entities and step entities within the data model 510 may include action types and step types that define each of the action instances and step instances. For example, an action instance may be associated with an action type that the data model 510 defines by its inputs, outputs and associated step instances, where each step instance is of a certain step type. The data model 510 may also describe how data routes between the step instances within an action type and between trigger and action instances within a flow.

In one embodiment, the flow plan entities, trigger entities, action entities, and step entities may realize the design-time flow plan as a set of relational tables as a hierarchy of units of work, via reference fields, with increasing granularity at each level. The top of the hierarchy layer includes flow-based tables with information relating to a flow plan (e.g., name information, description of the flow, and system identifier) and snapshot information for historical versions of the flow plan. At least one of the flow-based table (e.g., flow instance record table) connects to one or more tables in the middle hierarchical level. Tables in the middle hierarchical layer may include one or more trigger-based tables (e.g., trigger instance record table) and action-based tables (e.g., action instance record table). In one or more embodiments, one of the action-based table is a specific action type table linked to a given action instance record table. By doing so, actions instances may be able to reuse and copy action types. The bottom hierarchical level may include one or more step-based tables, such as step instance record tables. Additionally, the data model may include input and output signatures at each of the hierarchical levels. The input and output signatures may be specified by records in tables that extend to a var_dictionary defined by the automation user interface system. Example embodiments of a data model 510 are discussed and shown in FIGS. 18 and 19.

When the user provides instructions to publish the design-time flow plan, the data model 510 goes through a compilation process by a calling the flow plan builder API 512. For purposes of this disclosure, flow plan builder API 512 can also be generally referred to as "flow plan builder" or "execution API." In one embodiment, the automation system 500 utilizes the flow plan builder API 512 to convert the design-time flow plan represented by data model 510 into a run-time flow plan, for example, a JSON document. In particular, the flow plan builder API 512 provides a structure to add step instances to action instances and action instance to the flow plan. Each instance (e.g., step or action) within the created flow plan has an input and output signature. Inputs can be fixed values (e.g., hard coded) or set to observe a previous instance output. An example layout of a design-time flow plan and a run-time flow plan are shown and discussed in more detail in FIG. 3.

Run-time flow plans may not be executed by flow engines 514 and 518 until a user instructs a client device to publish a design-time flow plan. In one embodiment, publishing the design-time flow plan causes the automation system 500 to activate the design-time flow plan by reading the data model 510 using a glide-flow-service, call the flow plan builder API 512 to convert (e.g., compile) the data model 510, and store the generated run-time flow plan. In one embodiment, the run-time flow plan is stored as a JSON string in a trigger table. The specified type of trigger for the design-time flow plan may also determine what other records the compilation process creates to instantiate and execute an instance of the run-time flow plan. The flow engines 514 and 518 execute the run-time flow plan (e.g., JSON document) once one or more conditions or events occur that satisfy the trigger. During the execution of the run-time flow plan, the flow engine 514 and 518 annotates run-time state information to determine whether operations within the run-time flow plan are ready to run. An operation within a run-time flow plan is ready to run when its input values are ready and the flow engine has completed any predecessor operations.

In one embodiment, when de-serialized from JSON, the run-time flow plan is composed of OpDatum objects that hold input values and output values, operation class references, execution state, application scope, and ancestor and predecessor operation references. The flow engines 514 and 518 execute the operations as they are ready. An operation within the run-time flow may be ready when all its input values report ready and the operations predecessors have completed. To execute the operation, the flow engines 514 and 518 call the execute method of the operation class. This sets the specified application scope and then calls the abstract run method. As the various run methods update the output values, registered input values observers are automatically notified. If there are no exceptions thrown, the operation is marked as having been completed. This process continues while there are ready operations. Once the flow engine 514 completes execution of the run-time flow plan, whether because the flow engine 514 has completed all operations, or because the flow engine 514 is waiting for external events, the run-time flow plan serializes into a context record.

In one or more embodiments, the flow engines 514 and 518 may support dynamic mutation operations that dynamically create actions and/or operations, for example, iteration logic that execute repeatable operations over sets of data while a condition state exists, and/or conditional logic that optionally executes actions and/or operations based upon a condition state. To support dynamic mutation operations, the flow engines 514 and 518 may include a messaging framework that creates operations that are tied to a specific message. The dynamic mutation operations may be similar to the operations 402A-402C as shown in discussed in FIG. 2 except that the dynamic mutation operations include listening operations that wait to receive a specific message or instruction. The flow engines 514 and 518 may include a messaging API that allows messages to be sent to one or more dynamic mutation operations in the run-time flow plan. If the dynamic mutation operation has a listening operation that matches the specific message, the dynamic mutation operation can be marked as ready to execute. Stated another way, the dynamic mutation operation can be configured to allow and/or dynamically create a specific action instance or step instance to execute when the dynamic mutation operation receives the message and/or instruction. For example, the flow engines 514 and 518 may implement a callback type of functionality such that every time a dynamic mutation operation receives an associated message or instruction, a new callback operation is generated and added to the run-time flow plan. In one embodiment, the dynamic mutation operations may include message handlers, where each time the message handlers receive an associated message or instruction, the flow engine adds one or more operations into the run-time flow plan.

Figure 6:
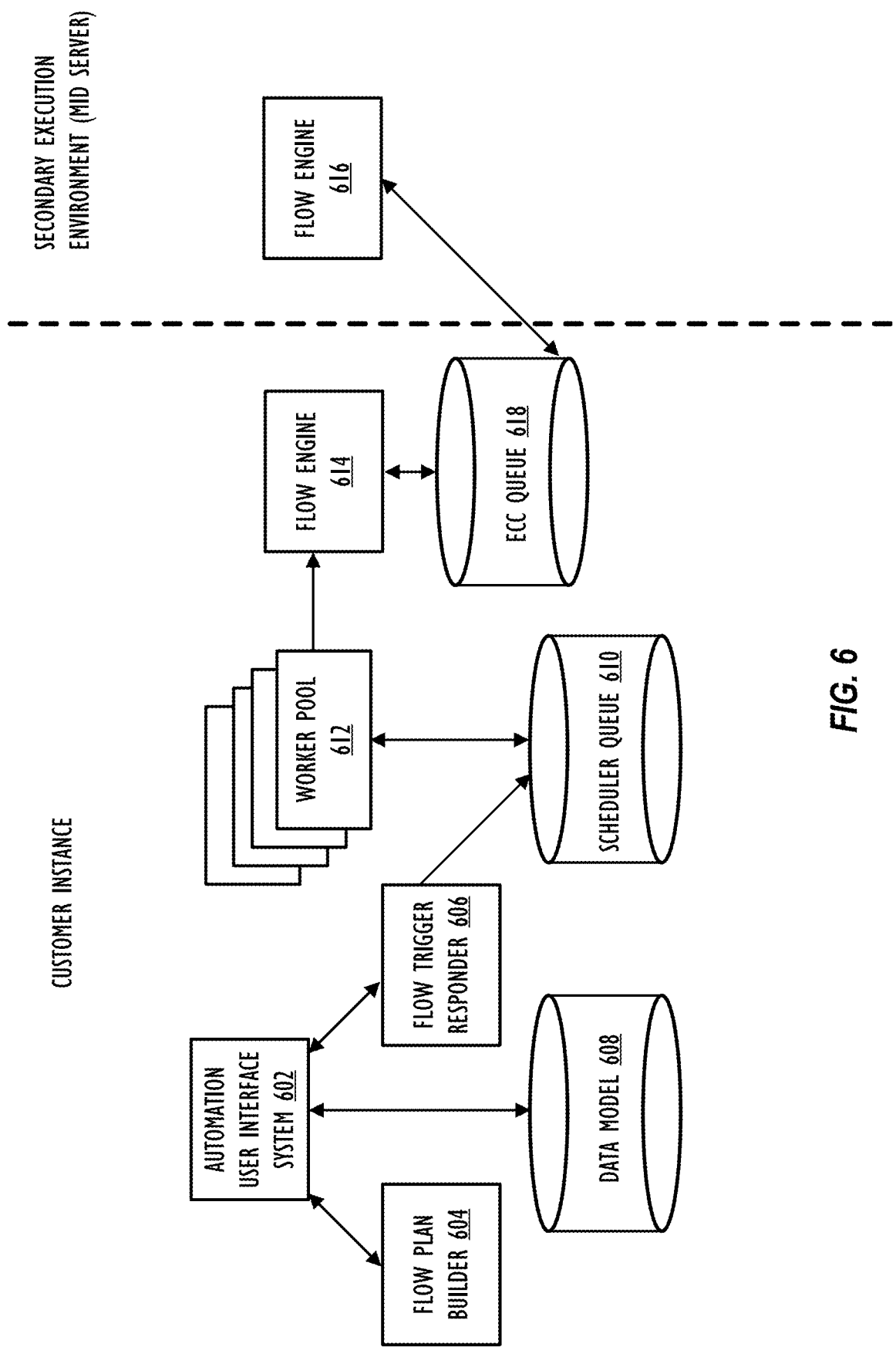
FIG. 6 is a block diagram of another embodiment of an automation system for creating, modifying, managing, and executing a flow plan.

FIG. 6 is a schematic diagram of another embodiment of an automation system 600 for creating, modifying, managing, and executing a flow plan. The automation user interface system 602, flow plan builder 604, and automation data model 608 are similar to FIG. 5's automation user interface system 502, flow plan builder API 512, and data model 510, respectively. As discussed above in FIG. 5, the automation user interface system 602 can include one or more user interfaces for a user to customize, modify, and update a design-time flow plan. The automation user interface system 602 drives the automation data model 608, which defines the design-time flow plan. Once a user instructs the automation user interface system 602 to publish and activate the design-time flow plan, the flow designer reads (e.g., using a glide-flow-service) the automation data model 608 and calls the flow plan builder 604 to convert the design-time flow plan to a run-time flow plan. Recall that as discussed in FIG. 4, the run-time flow plan may include a trigger operation and a flow plan operation.

Once the flow plan builder 604 generates the run-time flow plan, the automation user interface system 602 may send the trigger operation information associated with the run-time flow plan to a trigger responder 606. The trigger responder 606 monitors whether a computing operation satisfies one or more conditions or events specified by the trigger operation information. When the trigger responder 606 fires, the trigger responder 606 inserts a scheduled job for the run-time flow plan into a scheduler queue 610. Once the schedule job make its way through the scheduler queue 610, the worker pool 612 may assign one or more existing worker threads for the flow engine 614 to execute the run-time flow plan. In one embodiment, the flow engine 614 may use multiple worker threads to support execution of actions within the run-time flow plan. Having the trigger responder 606 insert a scheduled job within the scheduler queue 610 and subsequently assigning worker threads from worker pool 612 can minimize performance impact and disruption when executing the run-time flow plan. For example, the different actions for the run-time flow plan may run asynchronously from a main thread, and thus not block the main thread when running long operations for the run-time flow plan.

FIG. 6 illustrates that a flow engine 614 can be implemented on a customer instance and flow engine 616 can be implemented on a secondary execution environment, such as a MID server. For flow engine 616 to execute an action of a run-time flow plan on the MID server, the flow plan builder 604 generates a run-time flow plan that includes two action start directive operations and two action end directive operations. Using FIG. 3 as an example, instead of having the action 334 include a single set of an action start directive operation 318 and action end directive operation 322, the action 334 can instead include two pairs of action start directive operation 418 and action end directive operation 322. In one embodiment, the second pair of action start directive operation 318 and action end directive operation 322 may be located between the first pair of action start directive operation 318 and action end directive operation 322. When the flow engine 614 executes the first action start directive operation 318 within a run-time flow plan, the flow engine 614 propagates inputs for the second action start directive operation's 418 input signature. Once flow engine 614 propagates the input, the flow engine 614 can package all of the operations (e.g., step operations) between the second action start directive operation 418 and action end directive operation 322 and forward the packaged operations to the External Communication Channel (ECC) queue 618. The ECC queue 618 then forwards the package operations as an ECC queue message to the MID server.

In one embodiment, the ECC queue 618 is a database table that is normally queried, updated, and inserted into by other computing system operating outside the customer instance. Each record in the ECC queue 618 may be a message, either from the customer instance (e.g., flow engine 614) to some other system or from the other system to the customer instance. The ECC queue 618 can act as a connection point (though not the only possible one) between the customer instance and other systems that integrate with it. As shown in FIG. 6, the ECC queue also acts as the connection between the customer instance and the MID server. As such, although FIG. 6 illustrates that the flow engine 616 is located on the MID server, other embodiments could have the flow engine 616 located on another remote computing system.

After the secondary execution environment receives the ECC queue message, the flow engine 616 executes the received portion of the run-time flow plan. By doing so, the automation system 600 is able to offload the execution of the run-time flow plan to the local compute resource 106 in situations where the customer instance is unable to perform certain operations within the flow plan and/or would require too much computational resources. Once the flow engine 616 completes the execution of the received portion of the run-time flow plan, the flow engine 616 bundles and transmits its context records (e.g., run-time state information and/or other flow plan records) back to the ECC queue 618, which then forwards the received context records to the flow engine 616. Flow engine 616 may use the received context records to updates the flow engine's 616 run-time state information and resume executing operations based on the received context records. When flow engine 616 is done executing the run-time flow plan, either because the flow engine 616 has completed all operations or because it is waiting for external events, the run-time flow plan serializes to a context record.

Flow Designer User Interface

Figure 7:
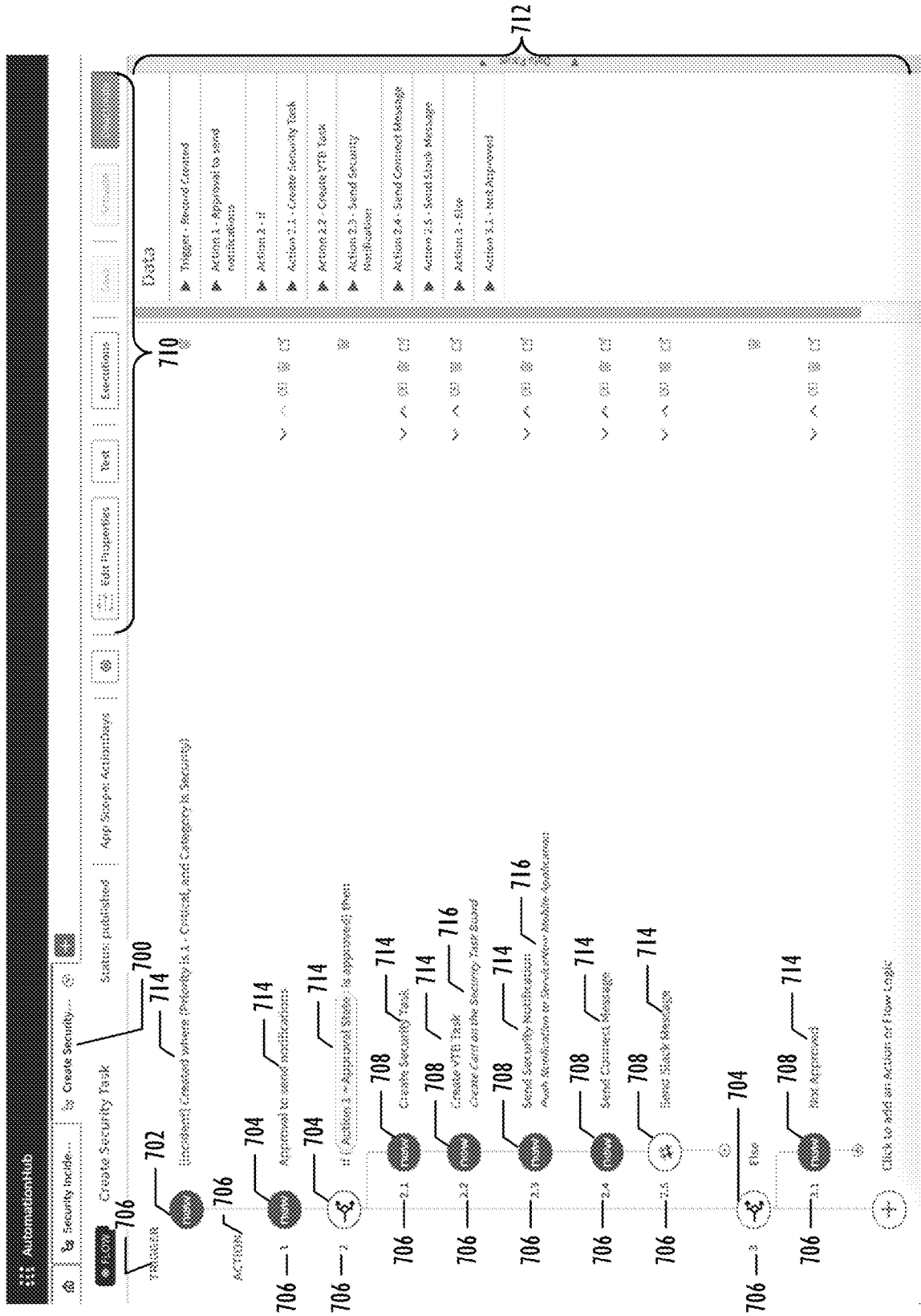
FIG. 7 illustrates an embodiment of a design-time flow plan a user is able to create with the flow designer user interface.
Figure 8:
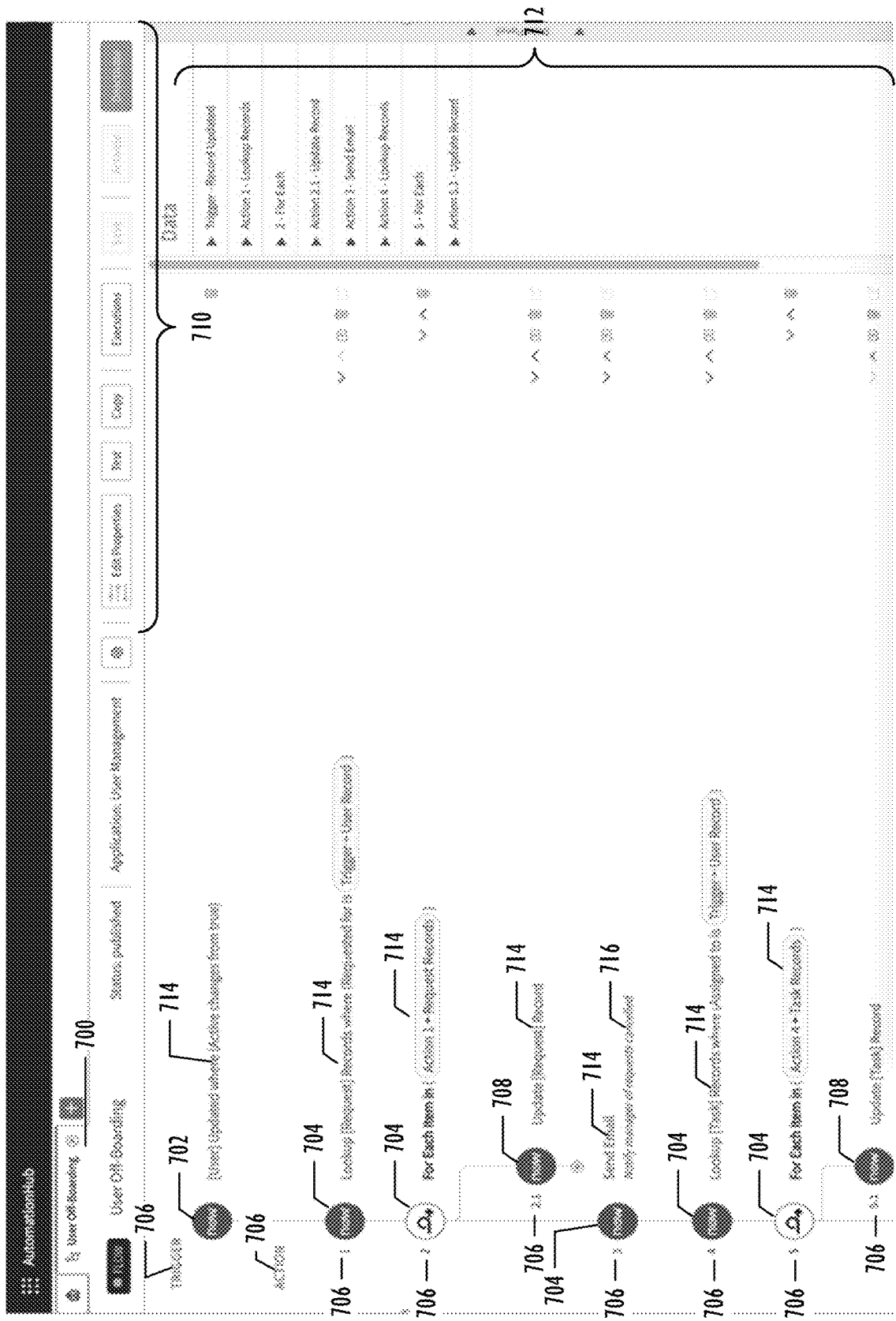
FIG. 8 illustrates another embodiment of a design-time flow plan a user is able to create with the flow designer user interface.
Figure 9:
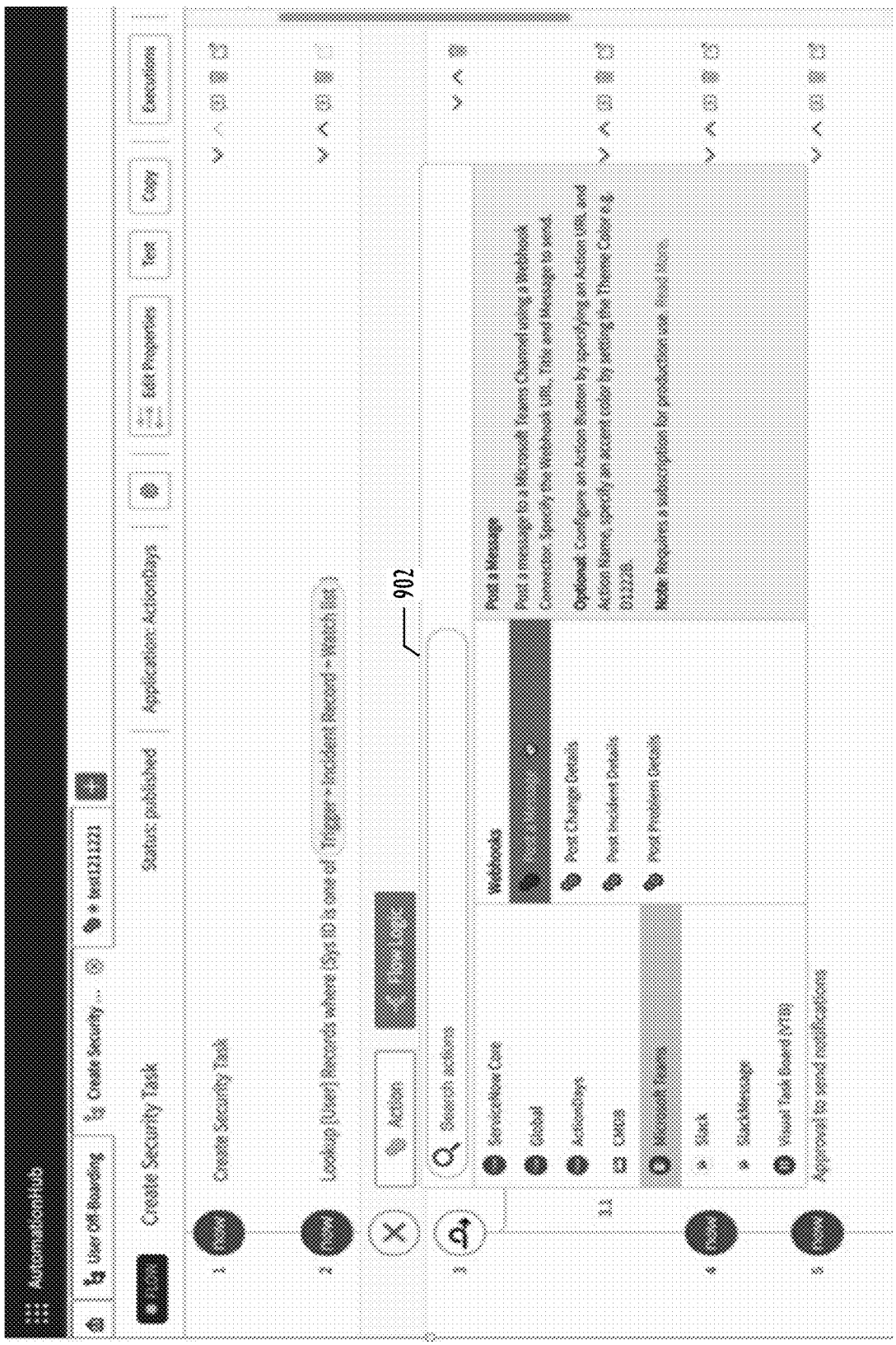
FIG. 9 illustrates another embodiment of a design-time flow plan a user is able to create with the flow designer user interface.

FIGS. 7-9 illustrate embodiments of design-time flow plans a user is able to create with the flow designer user interface 700. As shown in FIGS. 7-9, the flow designer user interface 700 permits a user to create and modify a human-readable version of the design-time flow plan. In particular, the flow designer user interface 700 presents trigger indicator 702, action indicators 704, and step indicators 708 to represent the design-time flow plan's trigger, action, and step instances, respectively. In FIGS. 7-9, each of the indicators 702, 704, and 708 may be graphical representations, such as graphics icons, where the graphic icons could differ dependent on the type of trigger, action, and/or step instances. Using FIGS. 7-9 as an example, different graphic icons can be used as the action indicators 704 when the action instance corresponds to a branching function (e.g., in FIG. 7) and an iteration function (e.g., in FIG. 8). FIG. 7 also illustrates that certain step indicators 708 have a different graphic icon when the action step is to "send a Slack message" at step instance 2.5. In this instance, the flow designer user interface 700 may present a different graphic icon since the step instance 2.5 corresponds to an operation that involves communicating with a third party application and/or system outside the customer instance or developmental platform. FIGS. 7-9 also illustrate that text label 706 can be located in close proximity to the different indicators 702, 704, and 708 in order to improve readability of the design-time flow plan. As an example, in FIG. 7, text label 706 above the trigger indicator 702 presents text that specifies the trigger indicator 702 is for a trigger instances and text label 706 above the first action indicator 704 specifies that the action indicators 704 are for action instances.

FIGS. 7-9 also illustrate that the text label 706 can present a numerical representation of an action instance's and/or a step instance's order within the design-time flow plan. A flow designer user interface 700 may connect and arrange the indicators 702, 704, and 708 based on how data routes amongst the trigger, action, and step instances. Recall, that the linking between trigger, action, and step instances are based on what inputs an instance receives from other instances and what outputs the instance sends to other instances. Using FIGS. 7-9 as an example, a flow designer user interface 700 may link the trigger indicator 702 to the action indicator 704 with text label 706 that has the value of "1." The action indicator 704 may then connect to a second action indicator 704 that has text label 706 with a value of "2." Text label 706 for step indicators 708 may follow a similar pattern except that the text label 706 may include the action instance the step indicators 708 are associated with. As shown in FIG. 7, text label "2.1" adjacent to the step indicator 708 would represent that the step instance is the first step within the action instance labeled with the value of "2." FIGS. 7 and 8 also illustrates that the flow designer user interface 700 includes a data panel component 712 that summarizes the arrangement and order of the design-time flow plan.

FIGS. 7-9 also illustrates that the flow designer user interface 700 may include function annotations 714 that summarize the functional operations for each of the indicators 702, 704, and 708 and commentary annotations 716 that presents user added commentary for the design-time flow plan. The function annotations 714 may vary depending on the type of trigger, action, and step instances a user creates. For example, the function annotations 714 for the second action instance (i.e., action instance labeled "2") indicates that the branching function executes when first action instance outputs an approval-based output signature. Otherwise, the second action instance does not execute and instead flow plan executes the third action instance (i.e., action instance labeled "3"). The commentary annotations 716 present entered commentary a user may use to clarify or improve the readability of the design-time flow plan.

The flow designer user interface 700 may also include a menu component 710 that includes a list of functions that a user may perform on the design-time flow plan and the ability to add pre-existing or previously saved action and/or step instances within a design-time flow plan. In FIGS. 7 and 8, the menu component 710 includes menu options, such as for "edit properties," "test," "executions," "save," "activate," and "deactivate" option. Other embodiments of the menu component 710 may include other operations, such as the "publish" option and/or a portion of the menu options shown in FIGS. 7 and 8. Additionally or alternatively, the flow designer user interface 700 may also allow a user to select and reuse pre-existing or copied action instances (e.g., action instances associated with a third party system) and/or step instances when creating the design-time flow plan. As shown in FIG. 9, the flow designer user interface 700 may be configured to generate guide window 902 for a user to add a pre-existing action instance. In one or more embodiments, the pre-existing action instance may correspond to third party action instances that the automation system may call to complete certain functions (e.g., posting a message on Microsoft® Teams).

Action Designer User Interface

Figure 10:
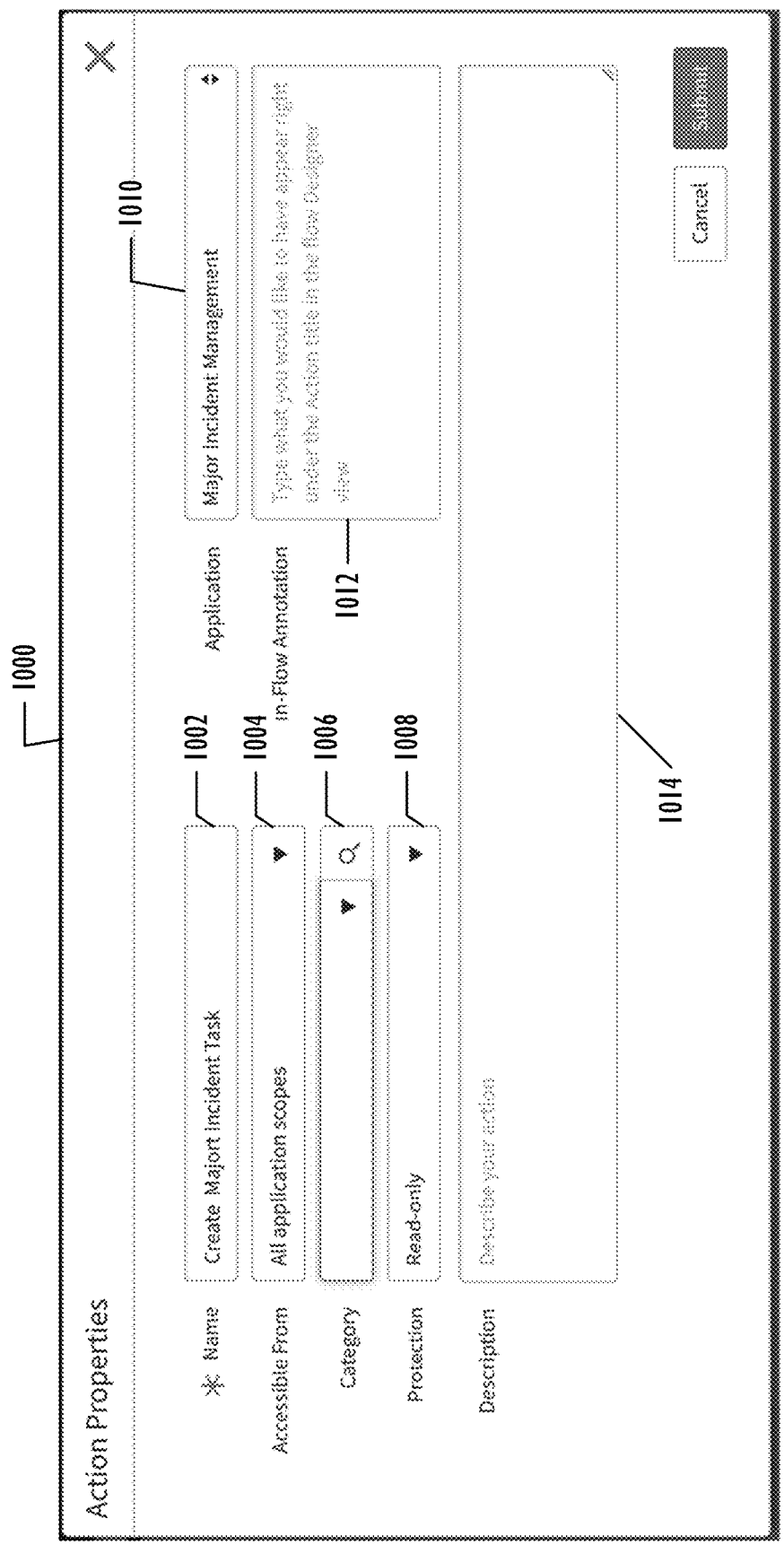
FIG. 10 illustrates an embodiment of an action designer user interface for creating action instances.

FIGS. 10-17 illustrate embodiments of an action designer user interface 1100 for creating action instances. Specifically, FIG. 10 illustrates an action property window 1000 within the action designer user interface 1100 allows a user to setup properties or policies for an action instance that include, but are not limited to application scope, category, and protection policies. The action property window 1000 includes an application field 1010 that provides one or more applications that a user may select from when creating an action instance. A user may also use the category field 1006 to provide an application category for the action instance and protection field 1008 to select an application protection policy for the action instance. The application scope field 1004 defines what application scopes are able to access the action instance. Other fields shown in the action property window 1000, such as the name field 1002, in-flow annotation field 1012, and the description field 1014, allow a user to enter text information to describe the action instance.

Figure 11:
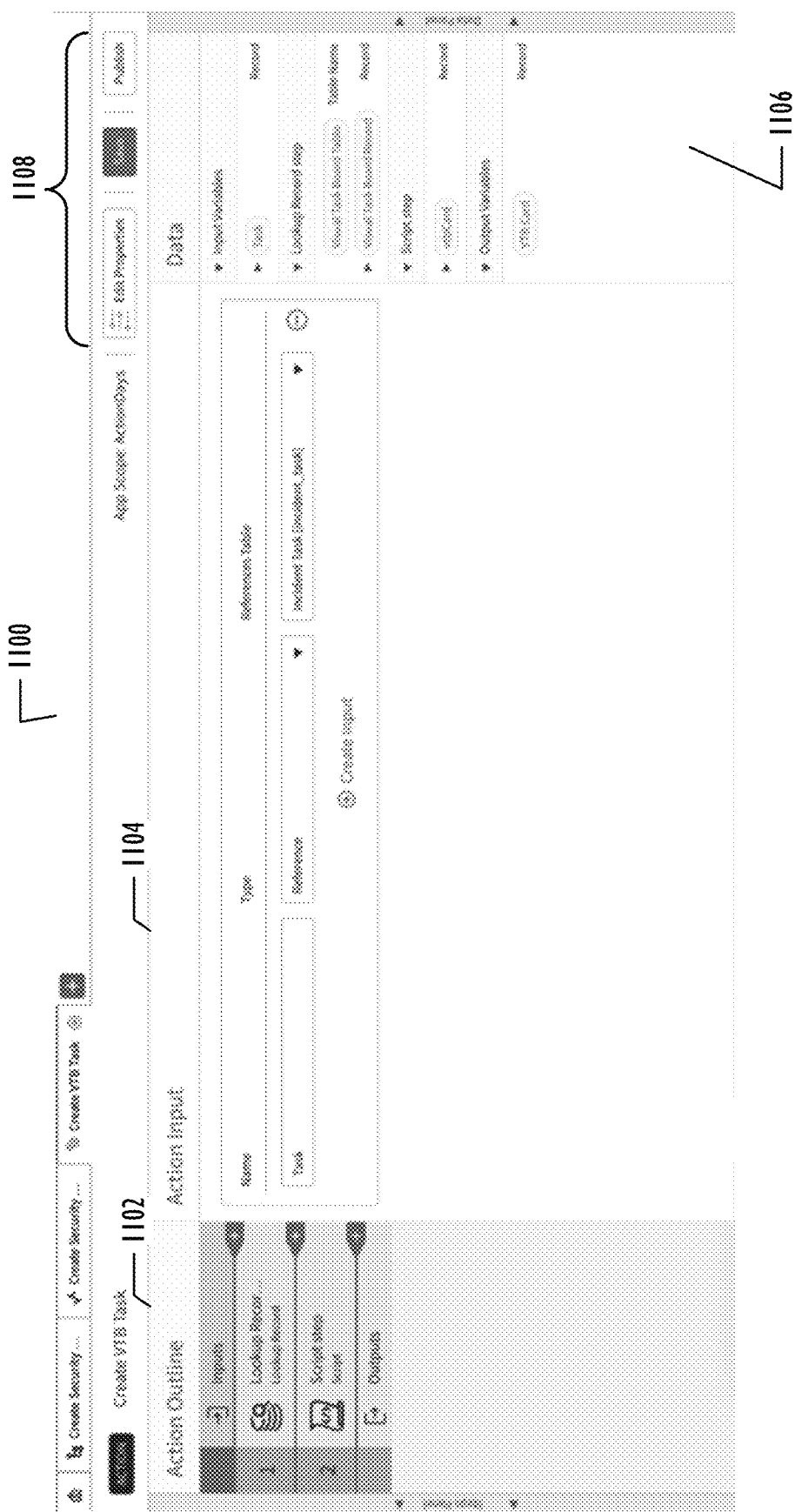
FIG. 11 illustrates another embodiment of an action designer user interface for creating action instances.
Figure 12:
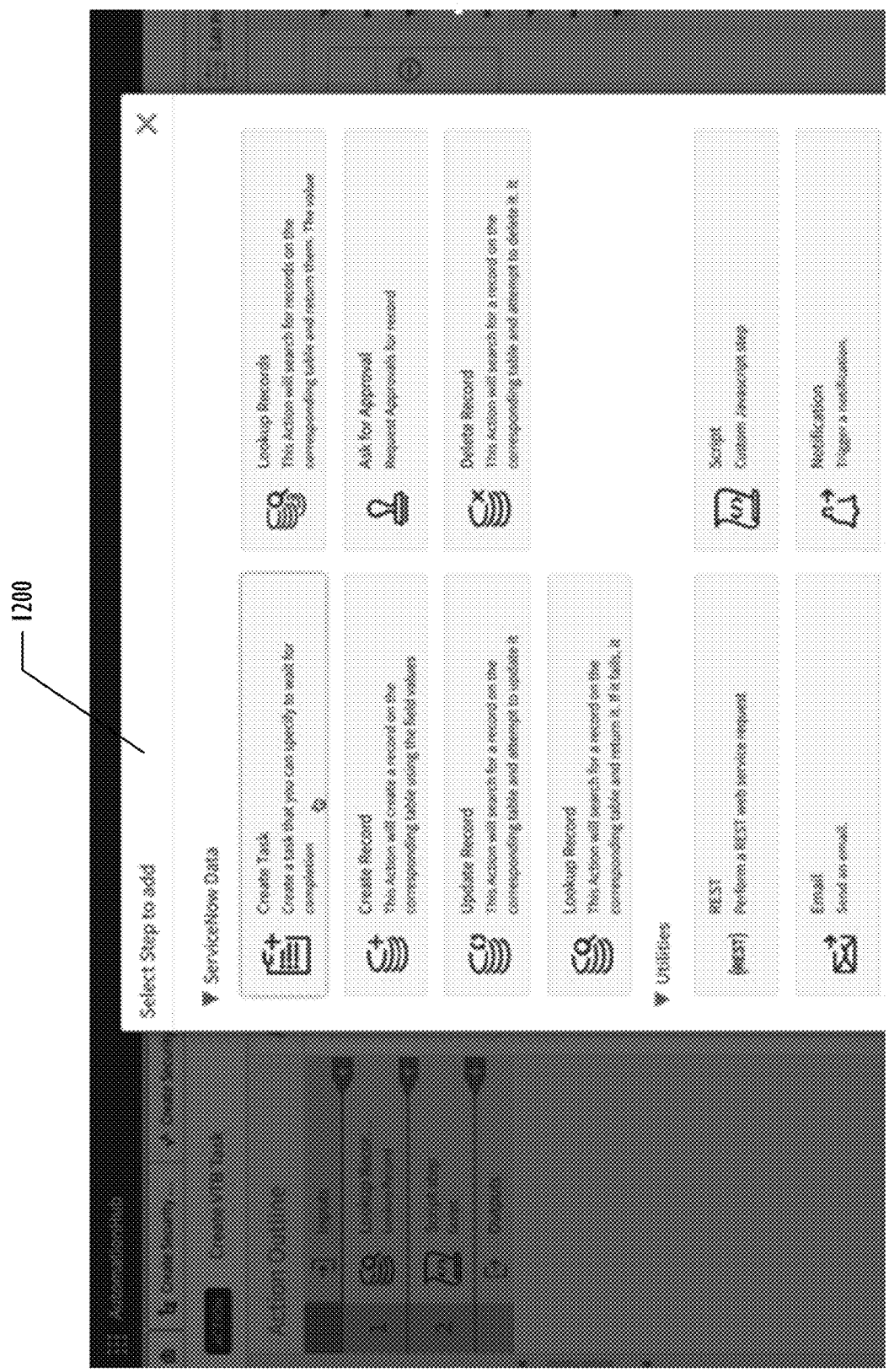
FIG. 12 illustrates another embodiment of an action designer user interface for creating action instances.
Figure 13:
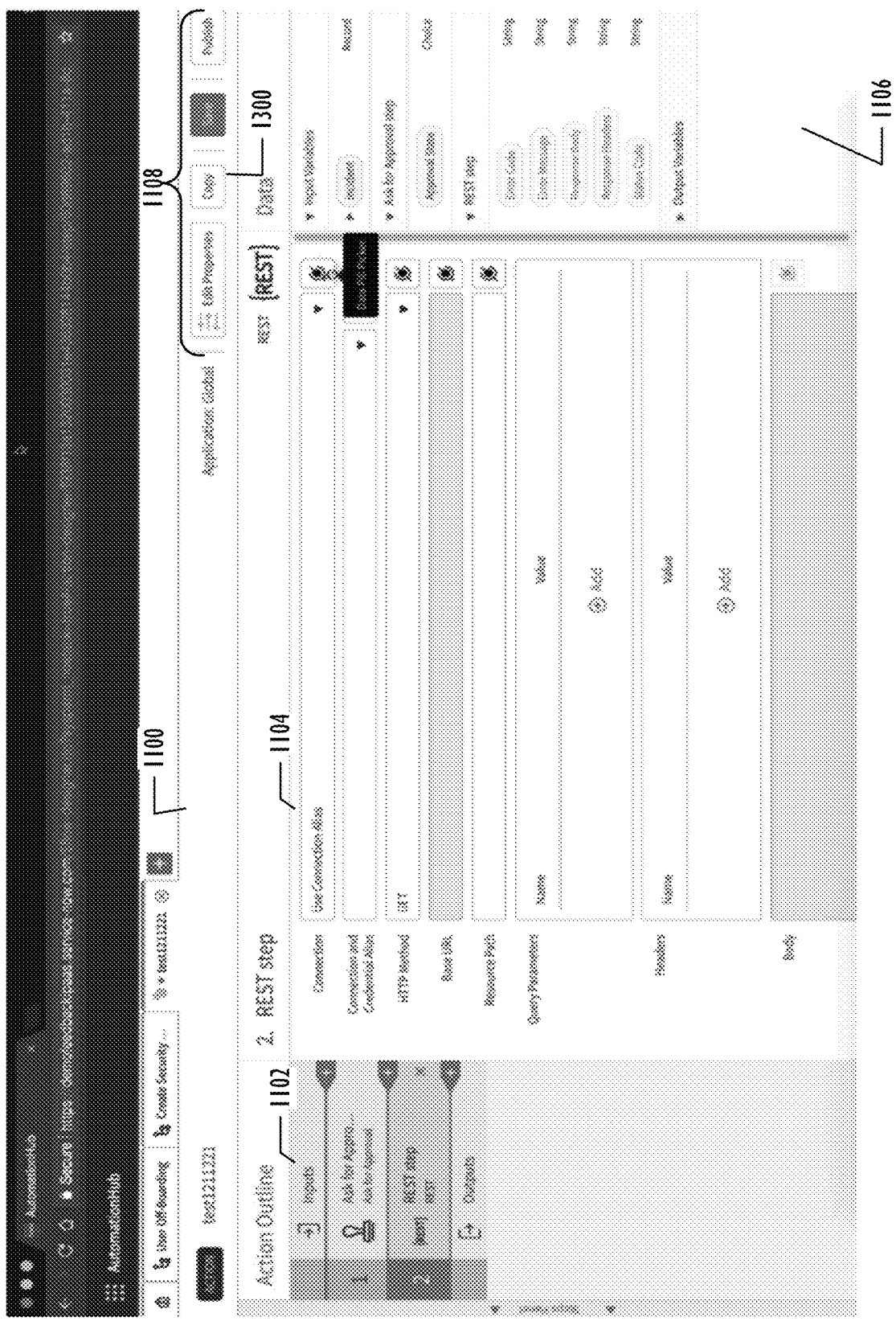
FIG. 13 illustrates another embodiment of an action designer user interface for creating action instances.
Figure 14:
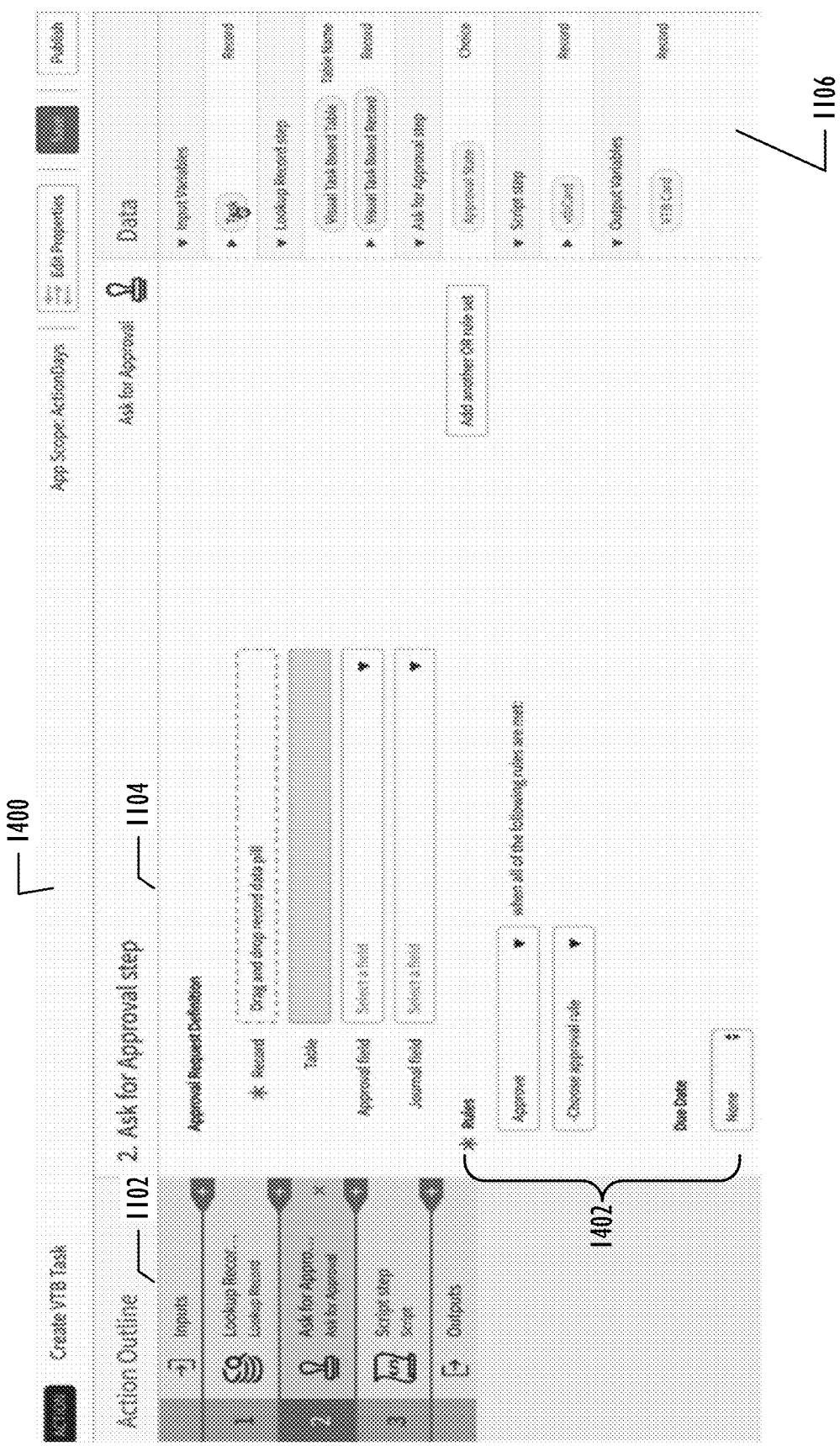
FIG. 14 illustrates another embodiment of an action designer user interface for creating action instances.
Figure 15:
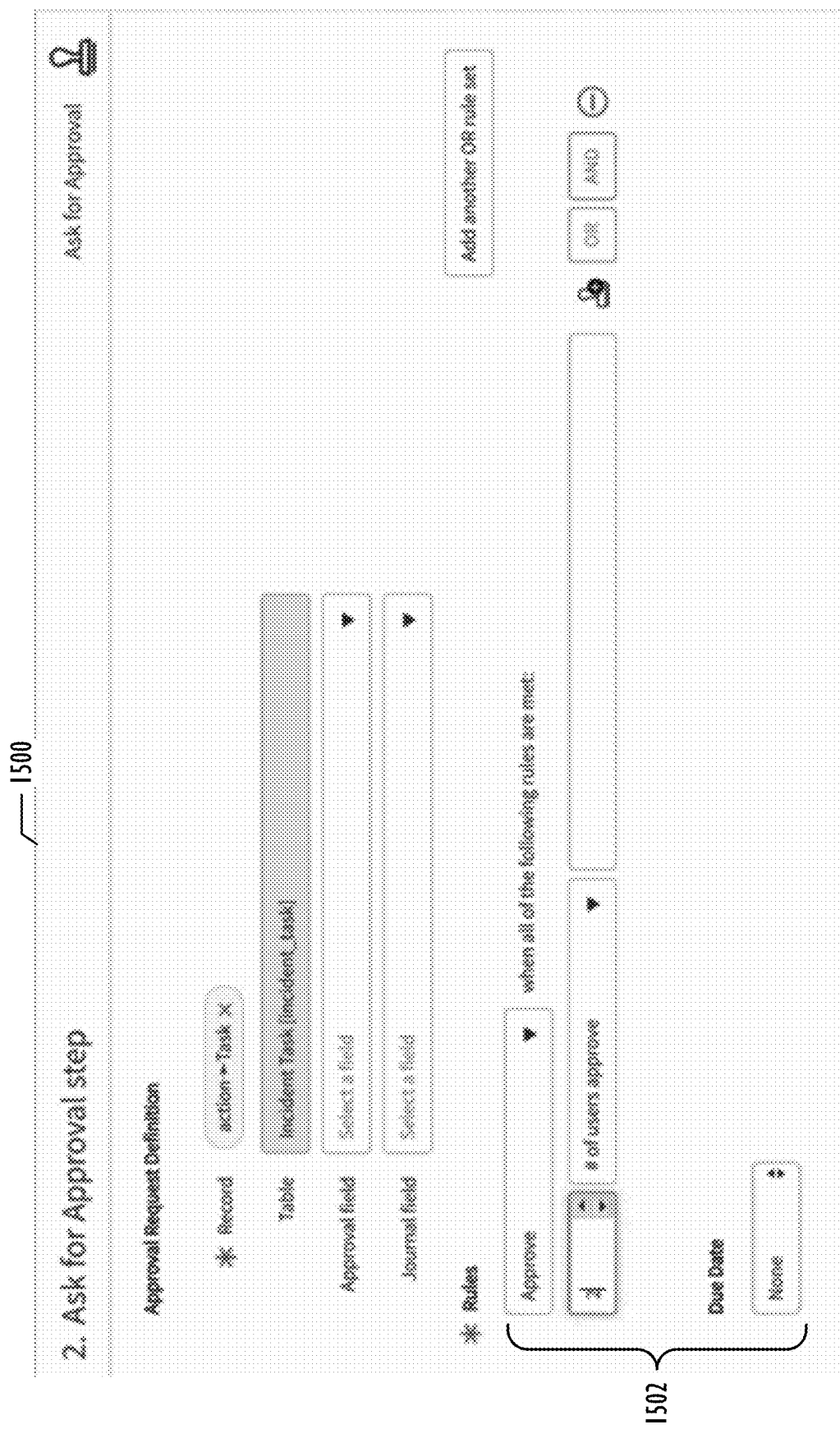
FIG. 15 illustrates another embodiment of an action designer user interface for creating action instances.

FIGS. 11-13 illustrate embodiments of an action instance a user is able to create with an action designer user interface 1100. The action designer user interface 1100 contains an action outline component 1102, an action window 1104, a data panel component 1106, and a menu component 1108. In FIG. 1, the action outline component 1102 is adjacent to the action window 1104, which is adjacent the to the data panel component 1106. The menu component 1108 is located near the top of the action designer user interface 1100, for example on top of the action window 1104 and/or data panel component 1106. The action designer user interface 1100 allows a user to create, reuse, and modify action and step instances of the design-time flow plan. Recall that when designing an action instance, a user creates an action instance by including one or more step instances within a sequence. The action designer user interface 1100 is able to create, reuse, and modify action and step instances of the design-time flow plan without implementing custom scripts.

As shown in FIG. 11, the action outline component 1102 contains graphical elements that correspond to an action instance's inputs, step instances associated with the action instance, and the action instance's outputs. FIG. 11 illustrates that a user is able to select and highlight one of the graphical elements within the action outline component 1102. In FIG. 11, the action designer user interface 1100 show that the input graphical element is highlighted within the action outline component 1102. A user may select the input graphical element to update and/or configure the action instance's input. Once a user selects and highlights the action instance's input, the action designer user interface 1100 dynamically generates and presents data fields within the action window 1104 for a user to enter input information. The action window 1104 may dynamically vary its data fields based on the graphical element selected within the action outline component 1102. In FIG. 11, the action window 1104 display s data fields for an action instance's inputs. If a user selects one of the step instances in FIG. 11, the action window 1104 will dynamically update the data fields to allow a user to enter information relating to one or more step instances (e.g., FIG. 13) or outputs for an action instance. Similar to a flow designer user interface, the action designer user interface 1100 can include a menu component 1108 that has a variety of menu options. Examples of menu options within the menu component 1108 include, but are not limited to "edit properties," "save," "copy," and "publish" options. Using FIG. 13 as an example, the action designer user interface 1100 provides a copy option 1300 configured to copy and reuse actions instances. The data panel component 1106 summarizes the arrangement and order of the action instance.

By using the action designer user interface 1100, a user is able to add or modify step instances by selecting from a list of pre-existing step types that include, but are not limited to creating tasks, creating records, updating records, looking up records, creating approvals, deleting records, sending emails, performing a REST web service request, creating custom script, and triggering a notification. As shown in FIG. 12, a window 1200 may appear when a user provides an input into the action designer user interface 1100 indicative of adding a step instance for an action instance. In particular, FIG. 12 illustrates that the window 1200 appears over or is overlaid on top of the action outline component 1102, action window 1104, and the data panel component 1106. The window 1200 includes a list of pre-existing step instances that a user may select to add to the action instance. Other step instances not shown in FIG. 12 that an action designer user interface may also present to a user could also include, creating, deleting, and/or updating virtual task boards, one or more operations related to IT tasks (e.g., creating a request, incident or problems), and one or more security operations (e.g., security incidents, malware management, and loss equipment).

FIGS. 14-17 illustrate embodiments of action designer user interfaces 1400, 1500, 1600, and 1700 for creating approval step instances. The action designer user interfaces 1400, 1500, 1600, and 1700 may be able to create an approval step instance within an action instance that minimizes the amount of customized script or code. Subsequent step instances linked to the approval step instance may not execute until the flow plan receives an expected instruction (e.g., approval or rejection instruction) to evaluate the approval condition. For example, the action designer user interfaces 1400, 1500, 1600, and 1700 may set an approval condition where a flow plan needs to manually receive an approval or rejection instruction from a specified user. Until the specified user sends out the approval or rejection instruction, the flow plan is in a wait state and does not execute any subsequent action and/or step instances relating to the approval step instance.

In FIGS. 14-17, to avoid customized script or code, the action designer user interfaces 1400, 1500, 1600, and 1700 may include an approval rule builder 1402, 1502, 1602, and 1702 that sets one or more rules for creating an approval condition. The approval rule builders 1402, 1502, 1602, and 1702 can include one or more fields that define when the flow plan satisfies the approval condition. For example, in FIGS. 14 and 15, the approval rule builders 1402 and 1502 set the approval condition to provide an approve instruction when a flow plan satisfies the rules within the approval rule builders 1402 and 1502. In other words, the approve condition is set to provide a certain instruction based on the satisfaction of one or more of the rules setup with the action designer user interfaces 1400 and 1500. For FIG. 15, the approval rule builder 1502 may include fields that setup and establish the number of users that need to approve the field prior to satisfying the approval condition. The approval rule builder 1502 may set a list of users, a list of groups, or a dynamic group to can provide the instructions to approve the approval step instance.

Figure 16:
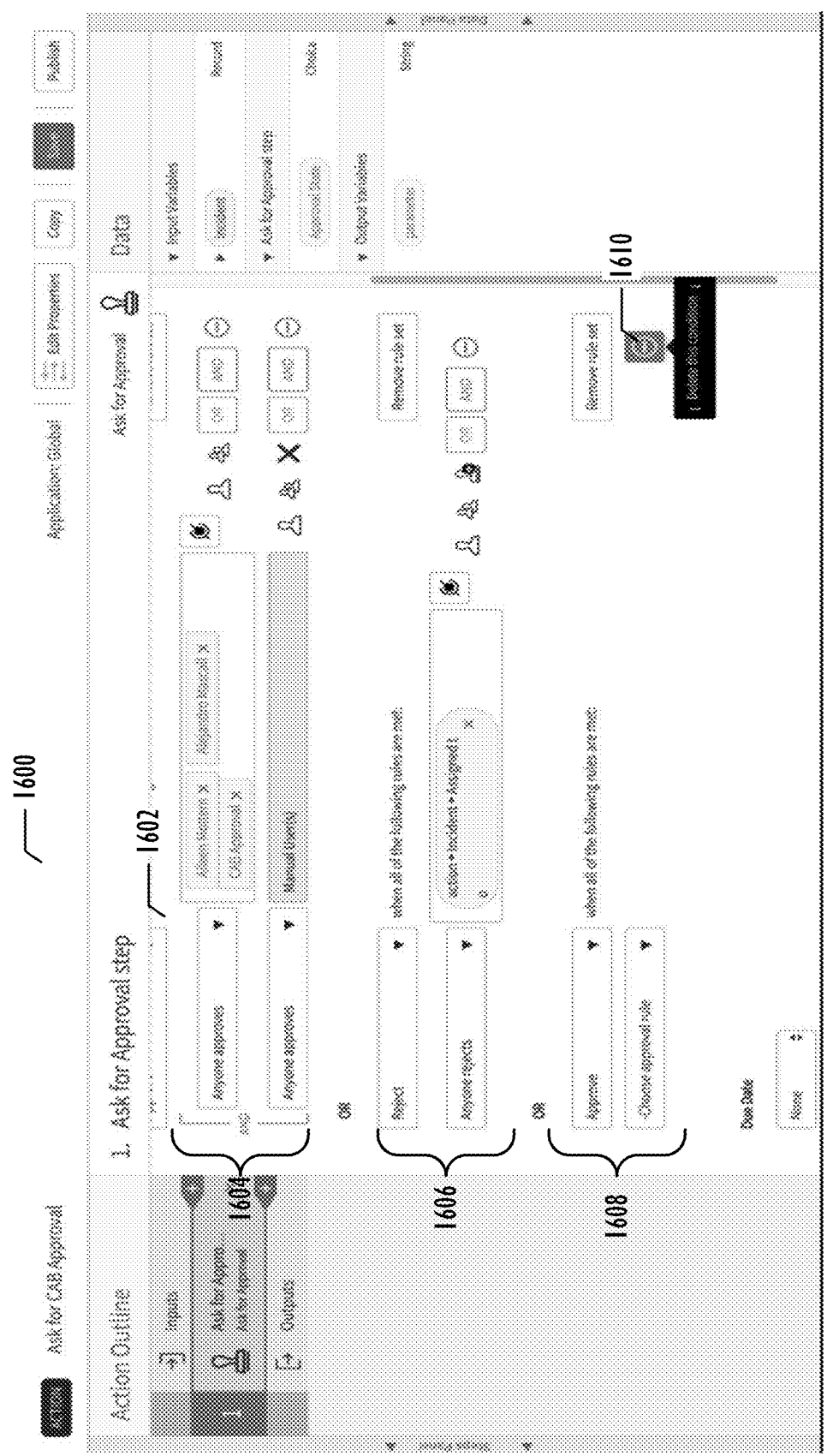
FIG. 16 illustrates another embodiment of an action designer user interface for creating action instances.
Figure 17:
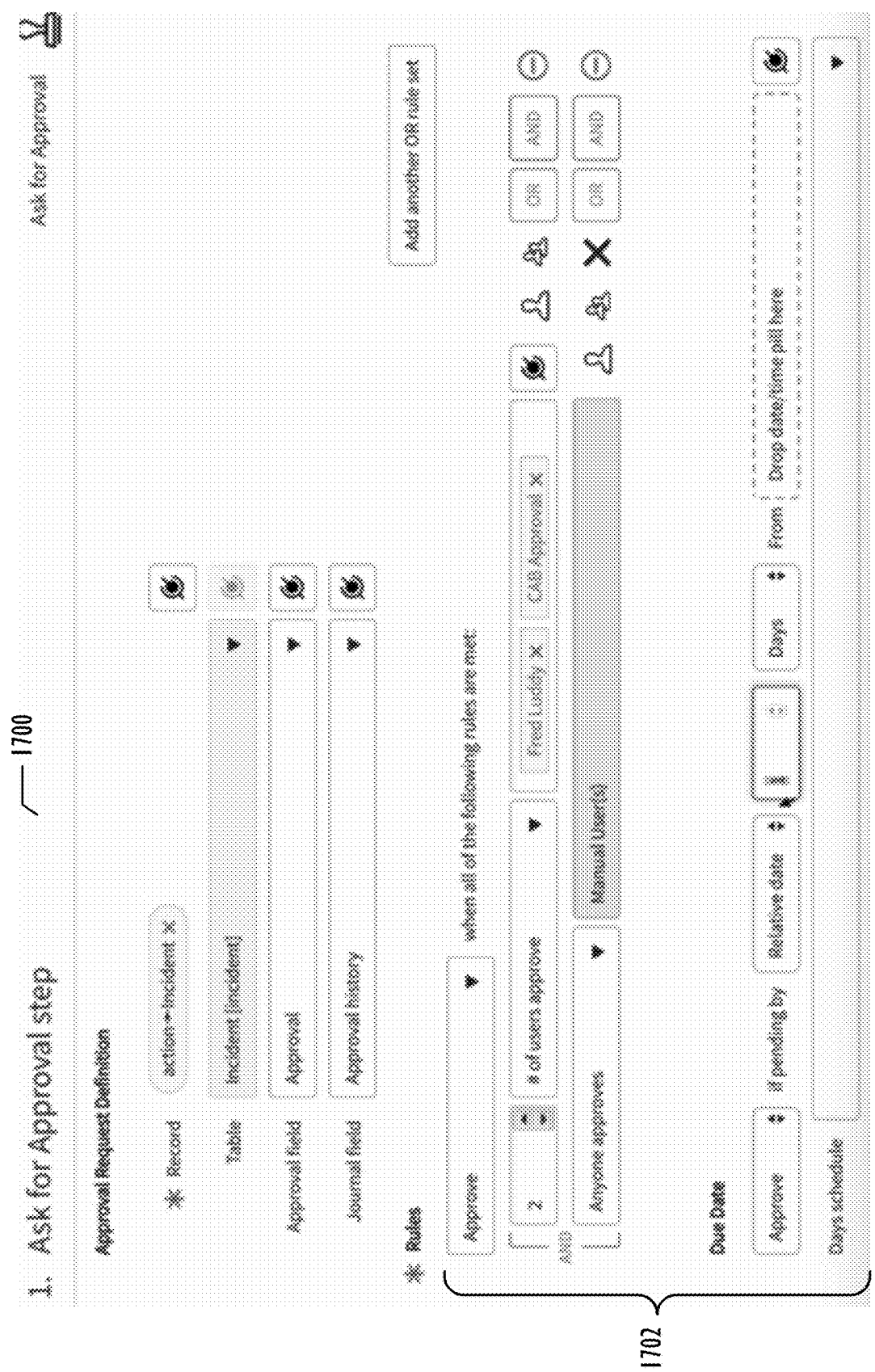
FIG. 17 illustrates another embodiment of an action designer user interface for creating action instances.

FIG. 16 illustrates that the approval rule builder 1602 can be configured to build multiple rules within a rule set and multiple rule sets. As shown in FIG. 16, the approval rule builder 1602 can have a rule set 1604 the logically combines two rules with a logic AND function. Other rule sets 1606 and 1608 can be logically evaluated with OR functions. The action designer user interface 1600 may also include a remove rule set option 1610 to delete rule sets. FIG. 17 illustrates that the action designer user interfaces 1700 may include a rule within the rule builder 1702 that creates an auto approve function that approves the approval step instance if no instructions are sent to handle the approval condition. Using FIG. 17 as an example, the rule builder 1702 may set an auto approve function to provide an approve instruction after a period of one day has elapsed.

Data Model

Figure 18:
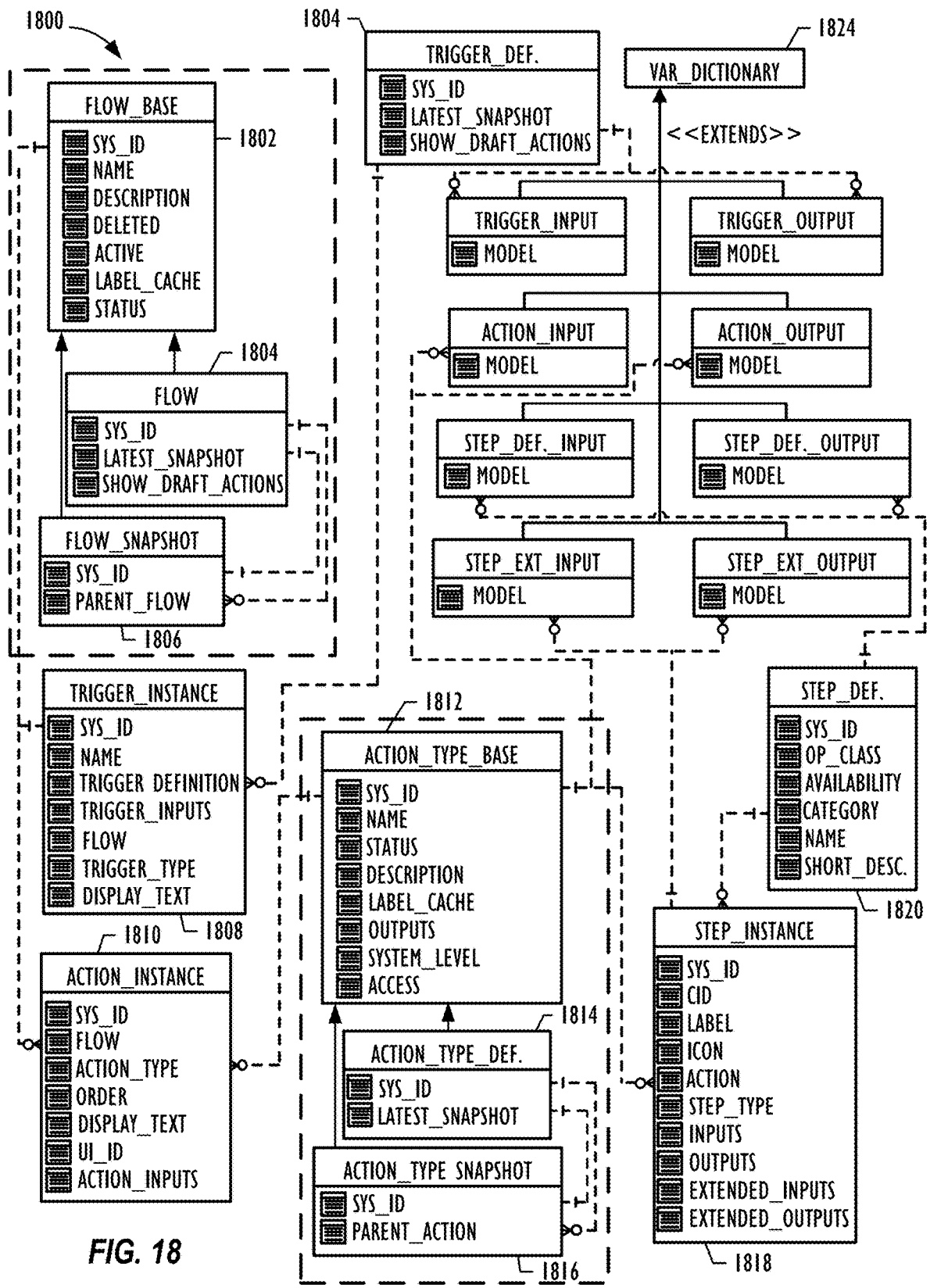
FIG. 18 is a block diagram of an embodiment of a data model associated with a design-time flow plan

FIG. 18 is a block diagram of an embodiment of a data model 1800 associated with a design-time flow plan. In FIG. 18, the data model 1800 for representing the design-time flow plan may contain tables that represent the flow plan entities, trigger entities, action entities, and step entities. For example, flow_base table 1802, flow table 1804, and flow_snapshot table 1806 may represent flow plan entities; trigger_instance 1806 and trigger_instance 1822 may represent trigger entities; action instance table 1810, action_type_base 1812, action_type_definition 1814, and action_type_snapshot 1816 may represent action entities; and step_instance 1818 and step_definition 1820 may represent step entities. FIG. 18 also illustrates that data binding between inputs and outputs can be specified to run between different kinds of entities in the design-time flow plan. The routing combinations between inputs and outputs can account for the at least the following setups: (1) at the flow plan implementation level, trigger instance outputs can be routed to action instance inputs and action instance outputs are routed to action instance inputs; and (2) at the action implement level, action type inputs can be routed to step instance inputs and action type outputs and step instance outputs can be routed to step instance inputs or action type outputs.

When creating the design-time flow plan, a user may set the values of the input and output signatures to explicit hard-coded values, bindings from previous input signatures, or both. When setting an explicit, hard-coded, "real" value, the data model 1800 uses a normal sys_variable_value storage system. However, if the value is actually a binding from a previous input signature or a concatenation of a previous input signature with explicit text input, the value is saved to the off-row storage, such as GlideElementMapping platform technology. Using FIG. 18 as an example, the input and output signatures for the different entities are specified by records in tables extending to the var_dictionary table 1824. The var_dictionary table 1824 stores the variables for the input and output signatures within different table entries. In this way, the data model 1800 enjoys the benefit of the data validation and special GlideObject handling relevant to the variable type and also having the values contain data binding expressions without running afoul data formation restrictions and/or database validation. Otherwise, binding expressions may cause the data model 1800 to exceed field size limits and violate the data format restrictions.

The data model 1800 in FIG. 18 is configured to support the creation of snapshots for design-time flow plans. In particular, the flow plan entities, such as the flow_base table 1802, flow table 1804, and flow_snapshot table 1806, are configured to support the creation of snapshots. In FIG. 18, the flow_base table 1802 contains flow plan fields, such as system identifier (sys_id), flow plan name, description information, and/or other status information that is relevant to either to the single master draft or snapshots of the design-time flow plan. The flow table 1804 and the flow_snapshot table 1806 extend the flow_base table 1802. Specifically, the flow_table 1804 represents the single master draft version of the design-time flow plan and has a reference to the most current published version of the design-time flow plan (e.g., the flow.latest_snapshot shown in FIG. 18). Any changes to the design-time flow plan a user implements using the automation user interface system is stored in the flow_table 1804. The flow_snapshot table 1806 represents an immutable version of a design-time flow plan at a specific moment in time. The flow_snapshot table 1806 contains published version of the design-time flow plan, which include the most current and/or other historical published versions of the design-time flow plan. The flow_snaphsot table 1806 assigns a sys_id to identify the current published version of the design-time flow plan and other sys_ids to identify other historical published versions of the design-time flow plan. Because one or more run-time flow plans may reference one or more of the different snapshot versions of the design-time flow plan, the snapshot versions of the design-time flow plan does not change and is kept for historical purposes. In one or more embodiments, the flow_snapshot table 1806 may also include a reference to the master draft version of the design-time flow plan (e.g., flow_snapshot.parent_flow shown in FIG. 18).

The data model 1800 in FIG. 18 is also configured to support the creation of snapshots for action instance. The action_type_base table 1812, action_type_definition table 1814, and action_type_snapshot table 1816 may include similar table fields as the flow_base table 1802, flow table 1804, and flow_snapshot table 1806, respectively, except that the tables 1812, 1814, and 1816 pertain to action instances instead of the overall flow plan. Similar to the flow_base table 1802, flow table 1804, and flow_snapshot table 1806, the data model 1800 uses the action_type_base table 1812, action_type_definition table 1814, and action_type_snapshot table 1816 to store snapshots. Rather store snapshots of a flow plan, the action_type_base table 1812, action_type_definition table 1814, and action_type_snapshot table 1816 support creating snapshots of action instances. The action_type_definition table 1814 and action_type_snapshot table 1816 extends the action_type_base table 1812, and any changes to the action instance a user implements using the automation user interface system is stored in the action_type_definition table 1814. Each time a user provides an action instance publish instruction, the snapshots are stored in the action_type_snapshot table 1816. The snapshots stored in the action_type_snapshot table 1816 may also be referenced by the design-time flow plan and compiled once the action instance publishes.

The flow table 1804 and the flow_snapshot table 1806 extend the flow_base table 1802. Specifically, the flow_table 1804 represents the single master draft version of the design-time flow plan and has a reference to the most current published version of the design-time flow plan (e.g., the flow.latest_snapshot shown in FIG. 18). Any changes to the design-time flow plan a user implements using the automation user interface system is stored in the flow_table 1804. The flow_snapshot table 1806 represents an immutable version of a design-time flow plan at a specific moment in time. The flow_snapshot table 1806 contains published version of the design-time flow plan, which include the most current and/or other historical published versions of the design-time flow plan. The flow_snaphsot table 1806 assigns a sys_id to identify the current published version of the design-time flow plan and other sys_ids to identify other historical published versions of the design-time flow plan. Because one or more run-time flow plans may reference one or more of the different snapshot versions of the design-time flow plan, the snapshot versions of the design-time flow plan does not change and is kept for historical purposes. In one or more embodiments, the flow_snapshot table 1806 may also include a reference to the master draft version of the design-time flow plan (e.g., flow_snapshot.parent_flow shown in FIG. 18).

To request the creation of snapshots, a user may select the option to publish the design-time flow plan and action instances, or both with the automation user interface system. The act of publishing a design-time flow plan and/or action instance creates a "snapshot" of that entity. By doing so, the data model 1800 preserves the historical versions of a design-time flow plan and/or action instance without creating multiple draft versions for a particular design-time flow plan. The concept of publishing and creating snapshot differs from Workflow publishing in that Workflow publishing generally involves "checking-out" individualized draft versions, specific to a user, and allowing for multiple draft versions for a single Workflow. In contrast, rather than creating multiple draft versions of a particular design-time flow plan or utilizing a "checking-out" process for drafts associated with the particular design-time flow plan, the data model 1800 has a single master draft version of the design-time flow plan, where the single master draft version acts as a single resource truth. The data model 1800 includes the historically snapshots because of the possibility of the flow engine executing previous versions of the design-time flow plan. For example, the historic snapshots allow display of an operational view currently running flow plans, even while the single master draft version is being edited and iterated upon. Because of this, the data model 1800 preserves and package the historical snapshots of the design-time flow plan and/or action instance into an application scope.

The data model 1800 may also be able to manage copying and reusing of action instances within the automation user interface 502. As shown in FIG. 18, the data model 1800 includes a single link between the action_instance table 1810 with the action_type_base table 1812. The action_type_base table 1812 also does not link or connect back to the flow_base table 1802. By doing so, the data model 1800 may be able to reuse and copy the action_type_base table 1812 to other action_instance tables 1810 that correspond to other action instances within the design-time flow plan. As a result, the one to one mapping architecture between the flow_base table 1802 and action_type_base table 1812 enable to reuse and copy functions when designing action instances using the action designer user interface. FIG. 18, also illustrates that the action_type_base table 1812 connects to a step_instance table 1818. Recall that when a user designs an action instance with the automation user interface, a user creates an action type by arrange one or more step instances into a sequence. To represent the relationship between action type and the step instances, FIG. 18 shows that action_type_base table 1812 connects to a step_instance table 1818.

Figure 19:
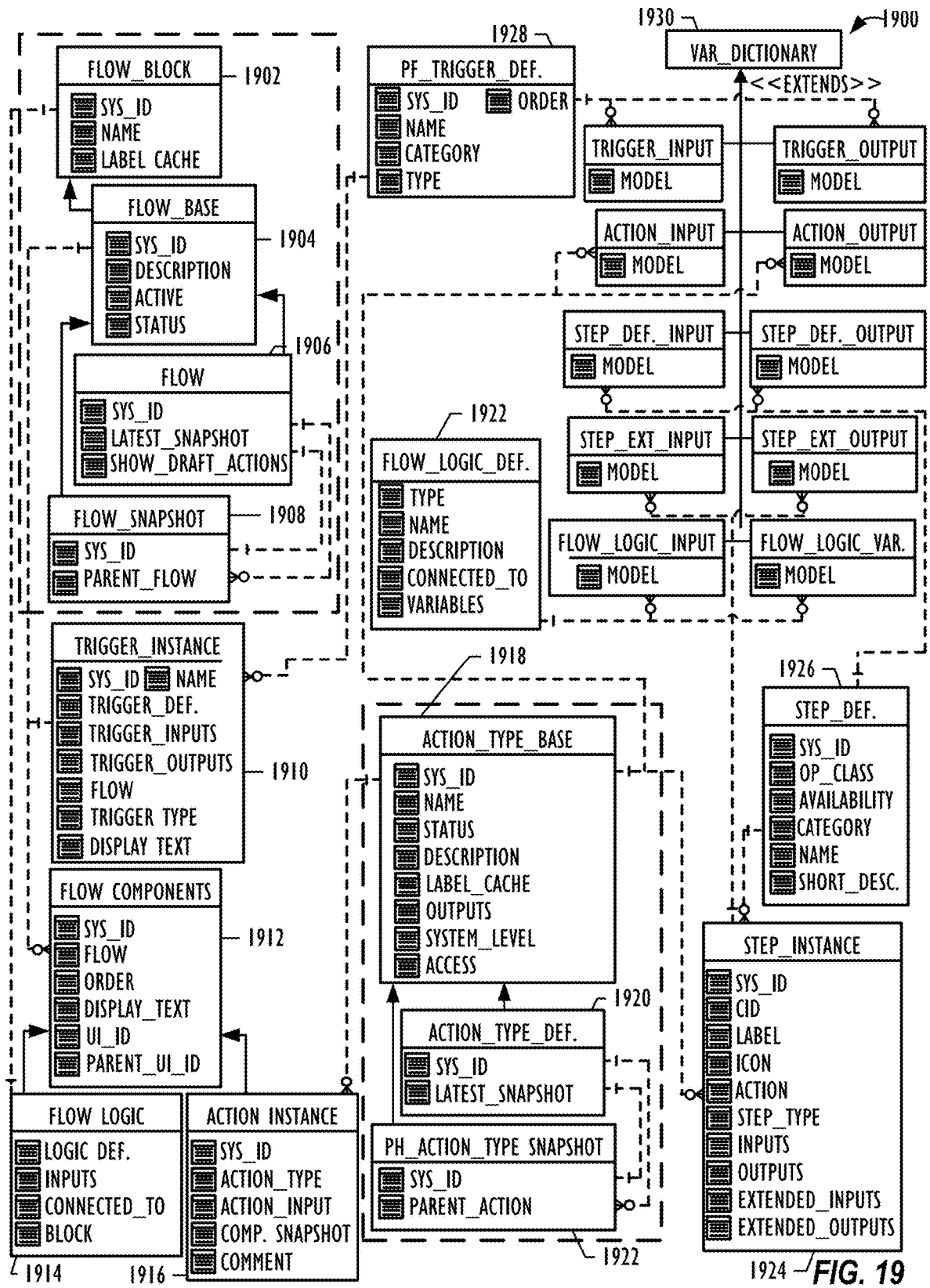
FIG. 19 is a block diagram of another embodiment of a data model for a design-time flow plan.

FIG. 19 is a block diagram of an embodiment of a data model 1900 for a design-time flow plan. The data model 1900 is similar to data model 1800 except that data model 1900 is configured to manage and implement dynamic mutation operations that are tied to a specific message and/or instruction to support the execution of flow-based branching, looping, iterations, conditional logic, and execution on a secondary execution environment. For instance, the flow_base table 1904, flow_table 1906, flow_snapshot table 1908, trigger_instance table 1910, trigger_definition table 1928, action_type_base table 1918, action_type_definition table 1920, action_type_snapshot Table 1922, step_instance table 1924, and step_definition table 1926 are similar to the flow_base table 1802, flow table 1804, flow_snapshot table 1806, trigger_instance table 1806, trigger_instance table 1822, action_type_base 1812, action_type_definition 1814, action_type_snapshot 1816, step_instance 1818 and step_definition 1820, respectively. To perform dynamic mutation operations, the data model 1900 in FIG. 19 includes an additional flow_block table 1902 that connects to a flow_logic table 1914. Rather than the action instance table 1916 directly connecting to the flow_base table 1906 as shown in FIG. 18, a flow_component table 1912 connects to the flow_block table 1902. Both the flow_logic table 1914 and the action instance table 1916 then connect to the flow component table 1912. The data model 1900 also includes the flow_logic_definition table 1922 that define the flow logic input signatures and logic variables for the flow_logic table 1914.

The flow_block table 1902 includes fields relevant to support certain dynamic mutation operations present in the design-time flow plan. In particular, the flow_block table 1902 may indicate what portions of the flow plan would wait and be blocked from executing until the flow plan receives a specific message and/or instruction. For example, the design-time flow plan may be waiting for a message and/or instruction that satisfies an approval state prior to executing the flow plan. The flow_block table 1902 connects to the flow_logic table 1914, which contains the logic definitions and inputs to determine what message, instruction, or condition the design-time flow plan needs to satisfy before resuming execution. The flow_component table 1912 represents the additional action instances and/or sub-plans that may need to be inserted and/or added into the design-time flow plan once the flow plan receives a specific message and/or instruction that unblocks and transitions the flow plan from a wait state to an active run state.

Flow Engine

Figure 20:
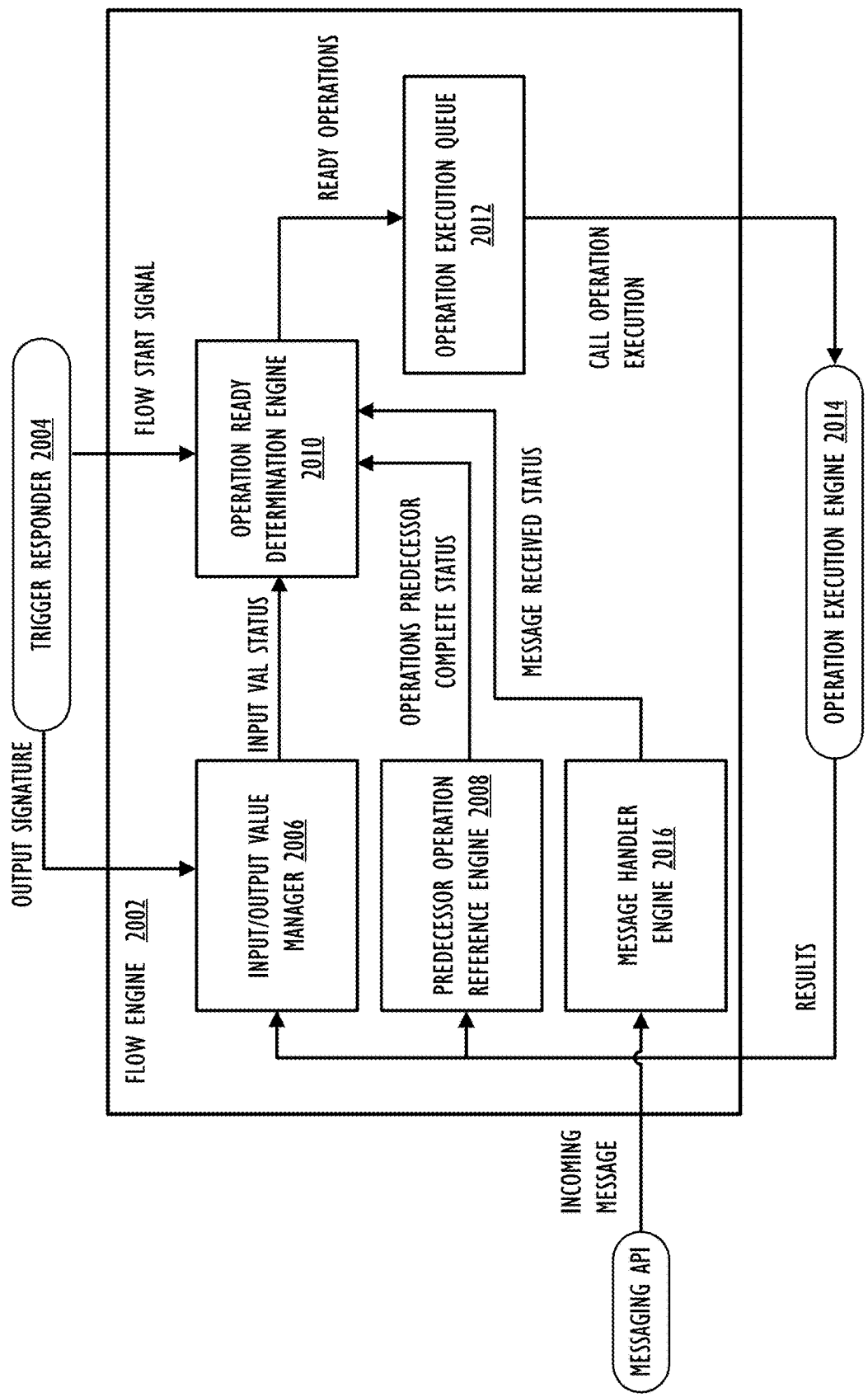
FIG. 20 is a schematic diagram of an embodiment of a flow engine for executing run-time flow plans.

FIG. 20 is a schematic diagram of an embodiment of a flow engine 2002 for executing run-time flow plans. As shown in FIG. 20, a trigger responder 2004, which is similar to the trigger responder 606 shown in FIG. 6, detects that one or more conditions or events satisfy a trigger for a run-time flow plan. The trigger responder 2004 can send its output signature and a flow start signal to the flow engine 2002. Specifically, the flow engine's 2002 input/output value manager 2006 receives the output signature from the trigger responder 2004 and the operation ready determination engine 2010 receives the flow start signal. The input/output value manager 2006 maps and manages the observer/observable relationship for the different operations within the run-time flow plan. For example, the input/output value manager 2006 may be aware of the input and output data signatures for each step operation and what values to pass to other step operation within the run-time flow plan. Based on the observer/observable relationship information, the input/output value manager 2006 uses the output signature from the trigger responder 2004 and/or other executed operations to generate an input value status that indicates which operations' input values are ready. As shown in FIG. 20, the input/output value manager 2006 provides the input value status to the operation ready determination engine 2010 for further evaluation.

Once the operation ready determination engine 2010 receives the flow start signal from the trigger responder 2004, the operation ready determination engine 2010 begins to evaluate which operations are ready to run. FIG. 20 depicts that the operation ready determination engine 2010 receives the input value status that indicates which operation's input values are ready and receives an operations predecessor complete status that indicates which predecessor operations have been completed. The operation ready determination engine 2010 then uses the input value status and operations predecessor complete status to evaluate which operations are ready for execution. Rather than using a shared global state to determine the exact order of operation, the operation ready determination engine 2010 is able to determine whether an operation is ready to run when its input values are ready and the flow engine has completed any predecessor operations. In other words, the flow engine 2002 does not drive, coordinate, or manage when each operations should execute, but instead simplifies the evaluation process by detecting whether each operation's execution state have been met.

After the operation ready determination engine 2010 determines which operations are ready for execution, the operation ready determination engine 2010 sends the ready operation into an operation execution queue 2012. At this point, the operation execution queue 2012 may determine whether to execute one or more of the ready operations in a parallel or sequential fashion. To execute the read operations, the operation execution queue 2012 may call the operation execution engine 2014 that executes the ready operation using one or more worker threads. The results of the operation execution engine 2014 are then sent back to the input/output value manager 2006 and predecessor operation reference engine 2008 to update and annotate the run-time state information for the run-time flow plan.

In one or more embodiments, to support execution on the MID server and/or other dynamic mutation operations, the flow engine 2002 may include a message handler engine 2016 that employ message handlers to manage dynamic mutation operations tied to a specific message. The flow engine 2002 may utilize a messaging API that allows messages to be sent to one or more dynamic mutation operations that the flow engine 2002 is handling. If the dynamic mutation operations include an operation that listens to the received message, the dynamic mutation operation is marked as ready to execute. Each dynamic mutation operation is configured to execute specific action instances and/or step instances, which can also generally referred within this disclosure as a sub-plan, when the message handler engine 2016 receives the dynamic mutation operation's corresponding message.

The message handler engine 2016 can act as an event callback type of function. For example, in the construction API, the automation system can set a handler when creating a message. The pseudo code is given below:

```
ActionStep handleSomeMessage = new LogActionStep( );
Message someMessage = new Message("/someMessage",
handleSomeMessage);
Action myAction = new Action( );
myAction.starts( )
.waitsFor(someMessage, handleSomeMessage)
.ends( )
```

In the flow engine 2002, the message handler engine 2016 can implement similar callback functions as described above to manage forEach loops. Each time the message handler engine 2016 receives a message for a dynamic mutation operation, the flow engine 2002 can create a new CallBlock operation and add the CallBlock operation to the parent run-time flow plan. Because each generated CallBlock contains an independent copy of the message handler's sub-plan, the flow engine 2002 can support running a message handler each time the flow receives the message.

By combining two message handlers, the flow engine 2002 is able to provide "wait for condition" functionality. Implementing "wait for condition" functionality may be beneficial for processing approval type steps created from the action designer user interface. As an example, an approval type steps use case can include multiple approval records that the flow engine 2002 utilizes to determine an overall approval state. A run-time flow plan progresses once the flow engine 2002 receives instructions that approve or provide a request that satisfies overall approval state. Below is the pseudo code for implementing the approval rule builder, which was shown and discussed in FIGS. 14-17.

```
ActionFlow approvalFlow = new ActionFlow( );
Action evaluateApprovals = new Action( );
Message approvalUpdated = new Message("/approval/updated",
evaluateApprovals);
Message approvalComplete = new Message("/approval/complete");
//build the approval evaluation handler
evaluateApprovals.starts( )
.doApprovalLogic( )
.if(doApprovalLogic.output("resolved"))
.thenDo(approvalComplete)
.endIf( )
```

```
.ends( );
//build the overall flow
approvalFlow.starts( )
.waitsFor(approvalUpdated) //do this every time an approval we
care about is updated
.waitsFor(approvalComplete)
//until we're told to stop
.ends( )
```

The flow engine 2002 may implement conditional branching in a run-time flow plan with the message handler engine 2016. Below is the pseudo code syntax that allows flow plan users to compose complex if statements:

```
ifThis(condition)
.thenDo(someAction)
.elseIf(someOtherCondition)
.thenDo(someOtherAction)
.elseDo(someDefaultAction)
.endIf( )
```

In the above pseudo code, "condition" and/or "someOtherCondition" represent a Boolean-valued output of any previous operation in the flow plan. The flow builder API compiles the conditional statement into a run-time flow plan that uses the flow engine's message handler engine 2016 to jump to the appropriate set of dynamism operation and/or other operations for execution. The automation system identifies the first true condition, and then the message handler engine 2016 receives a message for executing that particular branching condition. The pseudo code is presented below relating to the execution of a particular branching condition:

```
trueCondition = evalConditions(ordered list of conditional vals)
sendMessage(trueCondition)
waitFor(message = /condition/true)
someAction.op1
someAction.op2
sendMessage(/endIf)
waitFor(message = /someOtherCondition/true)
someOtherAction.op1
someActionAction.op2
sendMessage(/endIf)
waitFor(message = /condition/false)
someDefaultAction.op1
someDefaultAction.op2
sendMessage(/endIf)
waitFor(/endIf)
```

As show above, the flow engine 2002 executes the conditional branches when the flow engine 2002 receives message they are waiting for via the messaging API. Because the flow engine 2002 executes one of the conditional branches, a run-time flow plan may contain unexecuted (not ready) operations associated with the unexecuted branches.

An automation system may also include support for iterating over a collection of items (e.g., table fields) for the design-time construction API and the run-time flow engine 2002. Users may be able to compose forEach loops based on the following pseudo code syntax:

forEach("item").in(myCollection).doThis(thing);

In the for Each pseudo code syntax, the parameter "item" is the name of the variable that the current item will be put in myCollection in any Iterable, or a GlideRecord, GlideList, SerializedRecord, or RemoteGlideRecord for one or more action instances (if composing flow plan), and/or one or more step instances (if composing an action instance). The flow builder API compiles the forEach syntax into a run-time flow plan that contains a single forEach operation and takes the collection to be iterated. The sub-plan associated with the forEach operation may be executed as inputs.

At run-time, the forEach operation implementation iterates over the collection, creating a CallBlock operation for every item in it. This means the collection is completely enumerated when the forEach loop starts. By doing so, the run-time flow plan is able to pause and serialize into the database for long periods of time without having an iterator change out from under while at rest. Below is the pseudo code regarding the different sub-plans.

```
ForEachOp("item", myCollection, subPlan)
CallBlock(item=myCollection[1], subPlan)
CallBlock(item=myCollection[2], subPlan)
...
```

The flow engine 2002 can determine when to execute the CallBlock operation at the appropriate time based on the inputs it requires and its specified predecessors. The sub-plan's state is serialized into the parent flow plan as part of the CallBlock operation's inputs. This enables each CallBlock operation to waitFor and receive messages independently of each other. The end result is that forEach construct that allows a run-time flow plan to pause at any point during its execution, and also can support parallel execution of iteration loops, for example, starting a second loop while a first loop is waiting for its inputs. Example pseudo code is given below for implement parallel execution of iteration loops.

```
forEach(userInSomeGroup) {
    createTask
    waitFor(/task/complete)
    sendEmailToManager
}
```

For this pseudo code example, the run-time flow plan creates all the tasks and then send emails as they are completed. Implementing the above pseudo code example generally utilizes parallel execution for the loop body.

In one embodiment, the flow engine 2002 can mitigate the increase in size of the run-time plan by not having the CallBlock operations generate until the ForEach operation starts. When the CallBlock operations generate, the sub-plan is not copied into them until that specific CallBlock operation starts executing. Operations can be removed from the active part of the run-time flow plan, and archived in status tables, as the operations complete. During run-time, the flow engine 2002 uses the active part of the flow plan, so as each CallBlock operation completes, flow engine 2002 removes the CallBlock operation and it's sub-plan from the parent flow plan.

Saving, Publishing, Testing, and Executing Flow Plans

Figure 21:
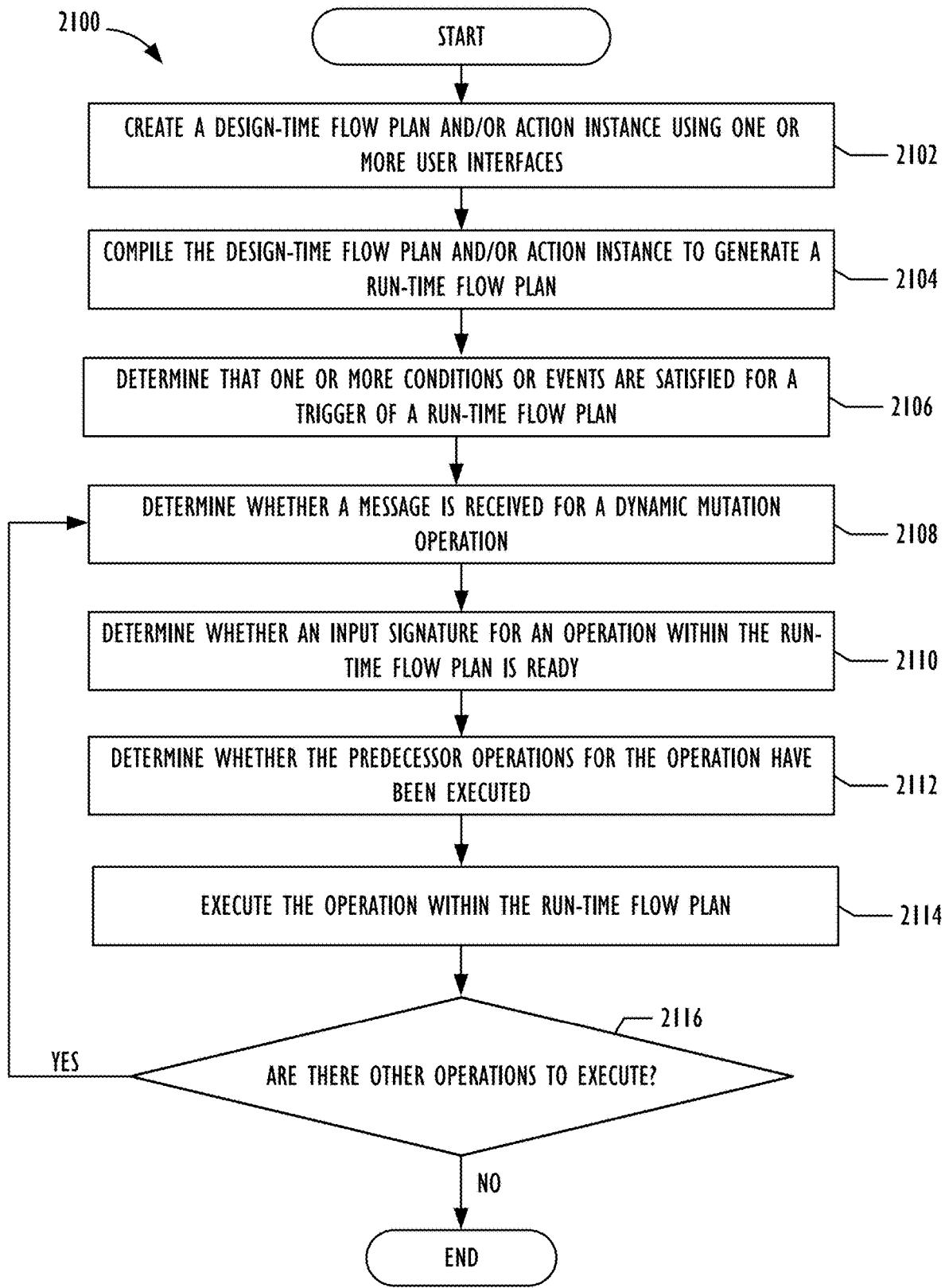
FIG. 21 is a flowchart of an embodiment of method that creates, executes, and manages a flow plan.

FIG. 21 is a flowchart of an embodiment of method 2100 that creates, executes, and manages a flow plan. Method 2100 may create, execute and manage flow plans using hardware, software, or both. Using FIG. 5 as an example, method 2100 may be implemented using the automation system 500, where the automation user interface system 502 creates the design-time flow plan, a construction API is used to save and/or publish the design-time flow plan, the flow plan builder API 512 converts the design-time flow plan to a run-time flow plan, and the flow engines 514 and/or 5121 execute the run-time flow plan. In one embodiment, method 2100 may be implemented on a flow engine located in a customer instance. In another embodiment, method 2100 may be implemented on a two separate flow engines, one located on a customer instance and another located on another execution environment, such as a MID server. Although FIG. 21 illustrates that the blocks of method 2100 are implemented in a sequential operation, other embodiments of method 2100 may have one or more blocks implemented in parallel operations.

Method 2100 may start at block 2102 to create a design-time flow plan and/or action instance using one or more user interfaces, such as the flow designer user interface and the action designer user interface. As discussed in FIGS. 5-17, the automation user interface system allows a user to create a design-time flow plan and drive a data model that represents the design-time flow plan. The automation user interface system also allows a user to save a design-time flow plan without executing run-time operations (e.g., call the flow engine). Saving operations for action instances and design-time flow plans are discussed in more detail in FIGS. 22 and 23. Method 2100 may then move to block 2104 to compile the design-time flow plan and/or action instance to generate a run-time flow plan. Method 2100 may not convert the design-time flow plan to the run-time flow plan until a user decides to publish the design-time flow plan using one of the user interfaces within the automation user interface system. Once a user provides instructions via the user interfaces to publish the design-time flow plan, method 2100 may use a flow plan builder API for the conversion. Publishing operations for action instances and flow plans are also discussed in more detail in FIGS. 22 and 23. From block 2104, method 2100 may continue to block 2106 to determine whether one or more conditions or events are satisfied for a trigger of the run-time flow plan.

Once a run-time flow plan is triggered for execution, method 2100 may then move to block 2108 to determine whether a message is received for a dynamic mutation operation. Managing dynamic mutation operations were previously discussed in more detail when describing, for example, FIG. 20. Afterwards, method 2100 moves to block 2110 to determine whether an input signature for an operation within the run-time flow plan is ready. Method 2100 may also proceed to block 2110 and determine whether the predecessor operations for the operation have been executed. As discussed above, operations within a run-time flow plan do not execute until the input values for the input signature are ready and/or any predecessor operations have finished executing. After determining that the input signatures are ready and predecessors operations have finished executing, method 2100 may then move to block 2112 to execute the operation within the run-time flow plan. Method 2100 can then proceed to block 2114 determine whether other operations need to be executed within the run-time flow plan. If no other operations need to be executed, method 2100 ends; otherwise, method 2100 returns back to block 2108.

Figure 22:
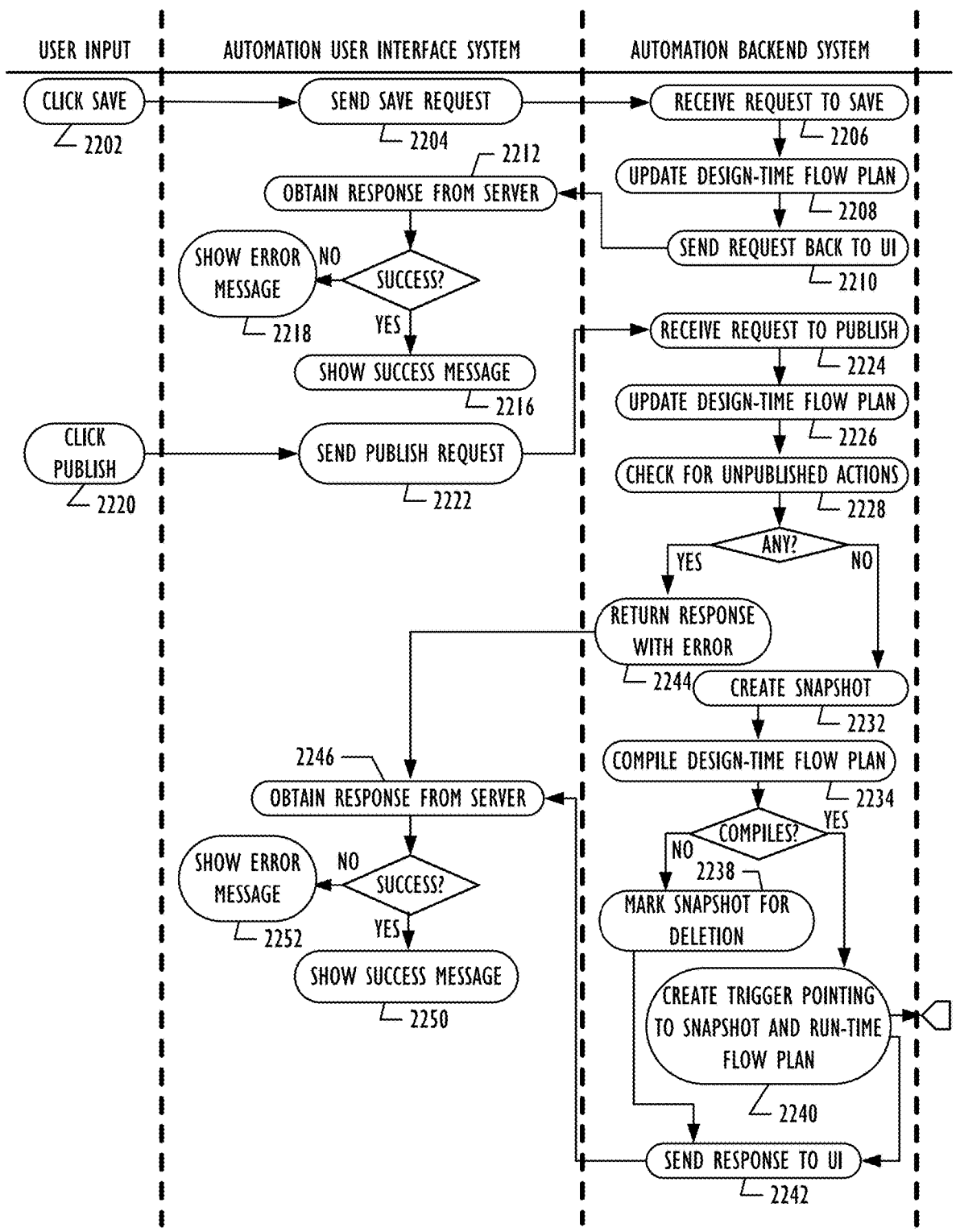
FIG. 22 is an illustration of flow charts directed to saving and publishing flow plans.

FIG. 22 is an illustration with flow charts directed to saving and publishing design-time flow plans, which can correspond to blocks 2102 and 2104 in method 2100. In particular, the flow charts describe the communication between the automation user interface system and automation backend system for saving and updating the data model and calling the flow engine. The automation backend system refers to a portion of the automation system that performs saving, updating, publishing and compiling operations relating to the design-time flow plan. For example, the automation backend system may include the construction API, the database to store the data model, and/or the flow builder API. Recall that automation system is able to save and update design-time flow plans independently of the flow engine operations. As a result, the automation backend system shown in FIG. 22 does not include the flow engine or perform execution operations for a run-time flow plan.

As shown in FIG. 22, when user provides an input (e.g., click save 2202) via the automation user interface system to save a design-time flow plan, the automation user interface system generates and sends the save request 2204 to the automation backend system for processing. When the automation blackened receives the request to save 2206, the automation backend system updates the design-time flow plan within the corresponding data model 2208. Afterwards, the automation backend system sends a request back to the automation user interface system 2210 for processing. In response to receiving the request the automation user interface system may then obtain a response from a server 2212 or other computing devices to determine whether the save function was a success or not. If the save function was successful, the automation user interface system shows a success message 2216; however, if the save function was unsuccessful, the automation user interface system shows an error message 2218.

When publishing a design-time flow plan, FIG. 22 depicts that a user first provides an input (e.g., click publish 222) to has the automation user interface system generate and send a publish request 2222 to the automation blackened. When the automation backend system receives the request to publish 2224 and subsequently updates the design-flow plan in the data model 2226. The automation backend system may check whether the design-flow plan has any unpublished actions 2228. Prior to being able to publish a design-time flow plan, action instances within the design-time flow plan may need to be published ahead of time. If the design-flow plan has an unpublished actions, the automation backend system may return an error response 2244 back to the automation user interface system. Afterwards, the automation user interface system obtains a response from the 2246 based on receiving the error response 2244. If the server response indicates the publish function was unsuccessful, then the automation user interface system shows an error message 2252; otherwise, the automation user interface system shows a success message 2250.

If there are no unpublished actions, the automation system's backend may create a snapshot 2232 and subsequently compile the design-time flow plan 2234 using the flow builder API. If the compiling process is a success, the automation backend system may create a trigger point to the snapshot and run-time flow plan 2240. In FIG. 22, the automation backend system may share the trigger point to the snapshot and run-time flow plan 2240 with the flow engine. If the compiling process fails, the automation system marks the snapshot for deletion 2238. Once the automation backend system either marks the snapshot fore deletion 2238 or creates a trigger point to the snapshot and run-time flow plan 2240, the automation backend system sends a response to the automation user interface system 2242. Similar to the save operation, the automation user interface system may then obtain a response from a server 2246 or other computing device to determine and show whether the publish function was a successful 2250 or encountered an error 2252.

Figure 23:
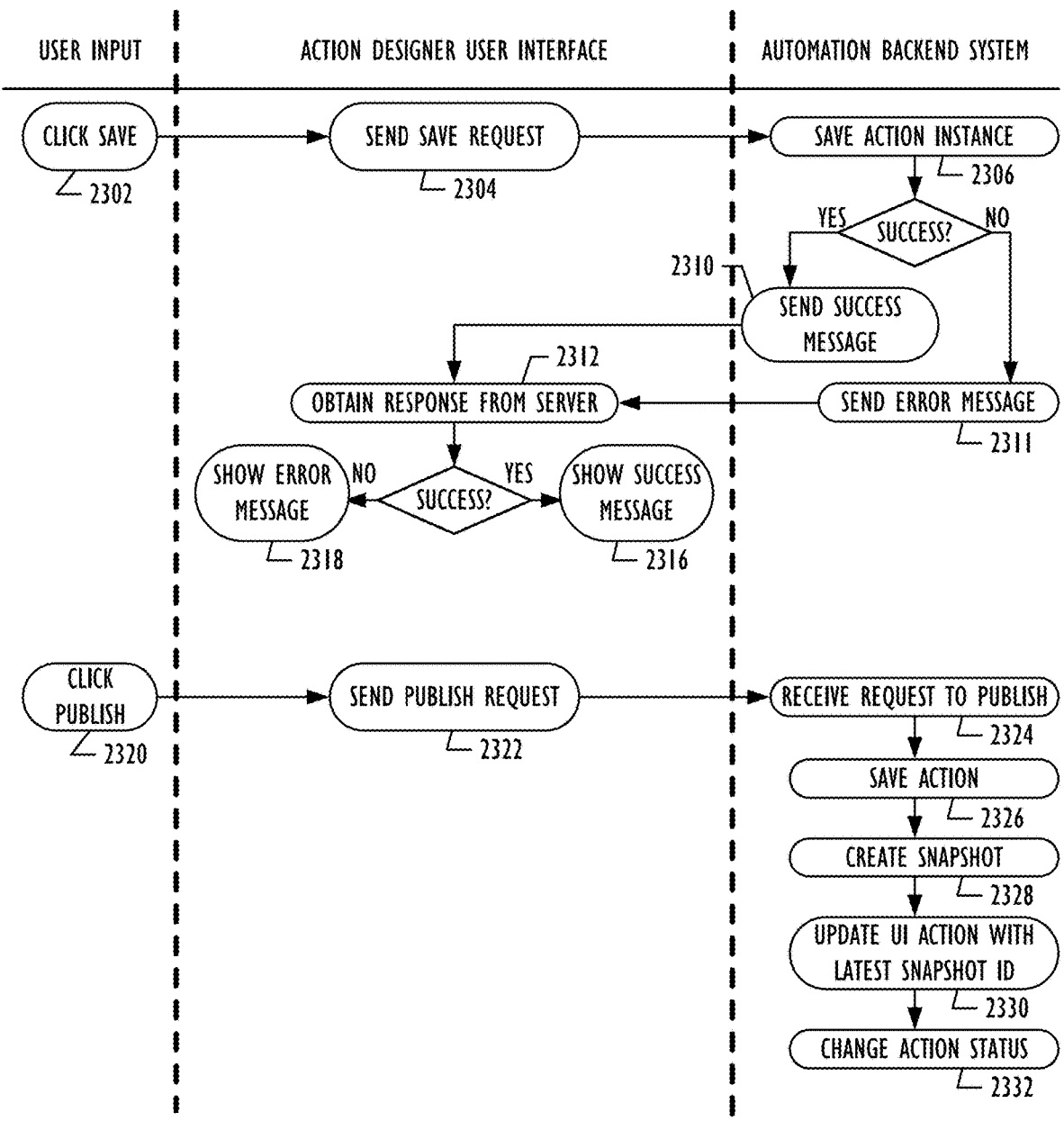
FIG. 23 is an illustration of flow charts directed to saving and publishing action instances.

FIG. 23 is an illustration with flow charts directed to saving and publishing action instances. In FIG. 23, the flow charts are implemented using the action designer user interface and the automation backend system. When a user provides an input (e.g., click save 2302) to save an action instance, the action designer user interface sends a request 2304 to save the action instance to the automation backend system. The automation backend system receives the save action request and then saves the action instance 2306 within the corresponding data model. The automation backend system may then determine whether the save action was successful or not and sends a response to the action designer user interface according to the determination. In particular, the automation backend may send the success message 2310 when saving the action instance is successful or send the error message 2311 when saving the action instance is not successful. The action designer user interface receives the response and obtains a response from the server 2312 and displays an error message 2318 when the save was not successful and display a success message 2316 when the save was successful.

When publishing an action instance, FIG. 23 illustrates that the automation backend system receives the request to publish 2324 after a user provides a publish instruction (e.g., clicks publish) and the action designer user interface sends the publish request 2322. The automation backend system subsequent saves the action instance in the data model 2326. The automation backend system then creates a snapshot 2328 of the latest version of the action instance and updates the action instance presented in the action designer user interface with the latest snapshot identifier 2330. Recall that the snapshot identifier may be used to identify the different snapshots taken of a design-time flow plan and/or action instance over a period of time. Afterwards, the automation backend system changes the action status to a published state 2332. By changing the action status, when a user provides instruction to publish the design-time flow plan, the automation backend system can quickly check whether the design-time flow plan has any unpublished actions 2228 by utilizing the action status information.

Figure 24:
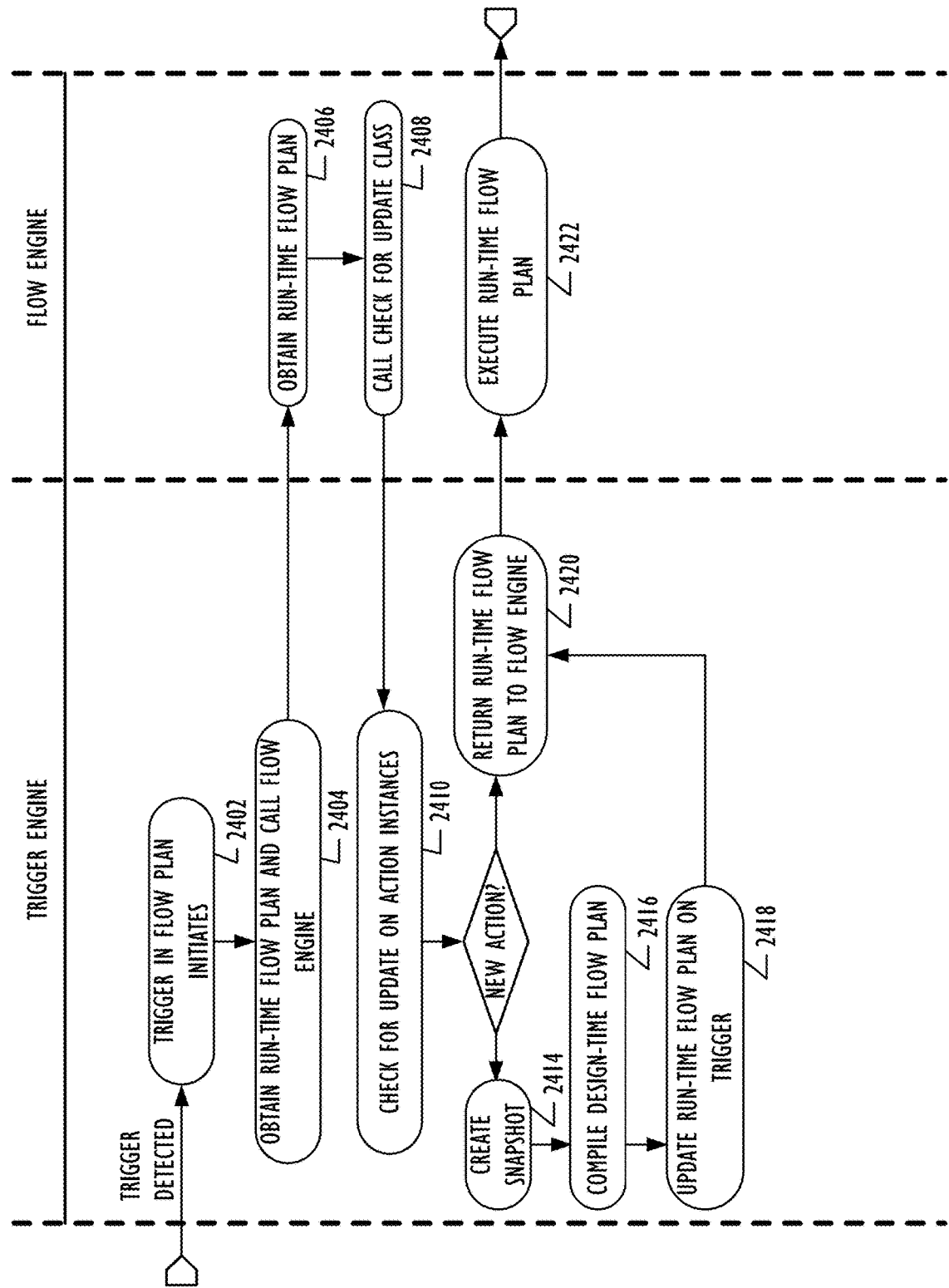
FIG. 24 is an illustration of a flow chart for implementing a just-in-time compilation and execution of a flow plan once satisfying a trigger instance.

FIG. 24 is an illustration of a flow chart for implementing a just-in-time compilation and execution of a design-time flow plan once satisfying a trigger instance. The flow chart illustrates a communication exchange between the trigger engine, which is part of the automation backend system and a flow engine. In FIG. 24, the rigger engine may detect and/or receive an indication of a detected trigger event or condition. Based on the detection, the trigger engine initiates the trigger in the flow plan 2402 and subsequently obtains the run-time flow plan and calls the flow engine. The trigger engine also sends the run-time flow plan so that the flow engine is able to obtain a copy of the run-time flow plan 2406.

Prior to executing the run-time flow plan, the flow engine checks for updates to the run-time flow plan by calling a check for update class 2408. The trigger engine receives the call and checks for the updates relating to the action instances. If there are any updates and/or new actions, the trigger engine creates a snapshot 2414 of the current design-time flow plan and compiles the design-time flow plan 2416. The trigger engine then updates the run-time flow plan currently on trigger 2418 and returns the run-time flow plan to the flow engine 2420. If there are no updates and/or new actions, the trigger engine returns the run-time flow plan to the flow engine 2420. Once the trigger engine returns the run-time flow plan to the flow engine 2420, the flow engine executes the run-time flow plan. As shown in FIG. 24, to execution the run-time flow plans may involve accessing other portions of the automation system to perform certain execution operations.

Figure 25:
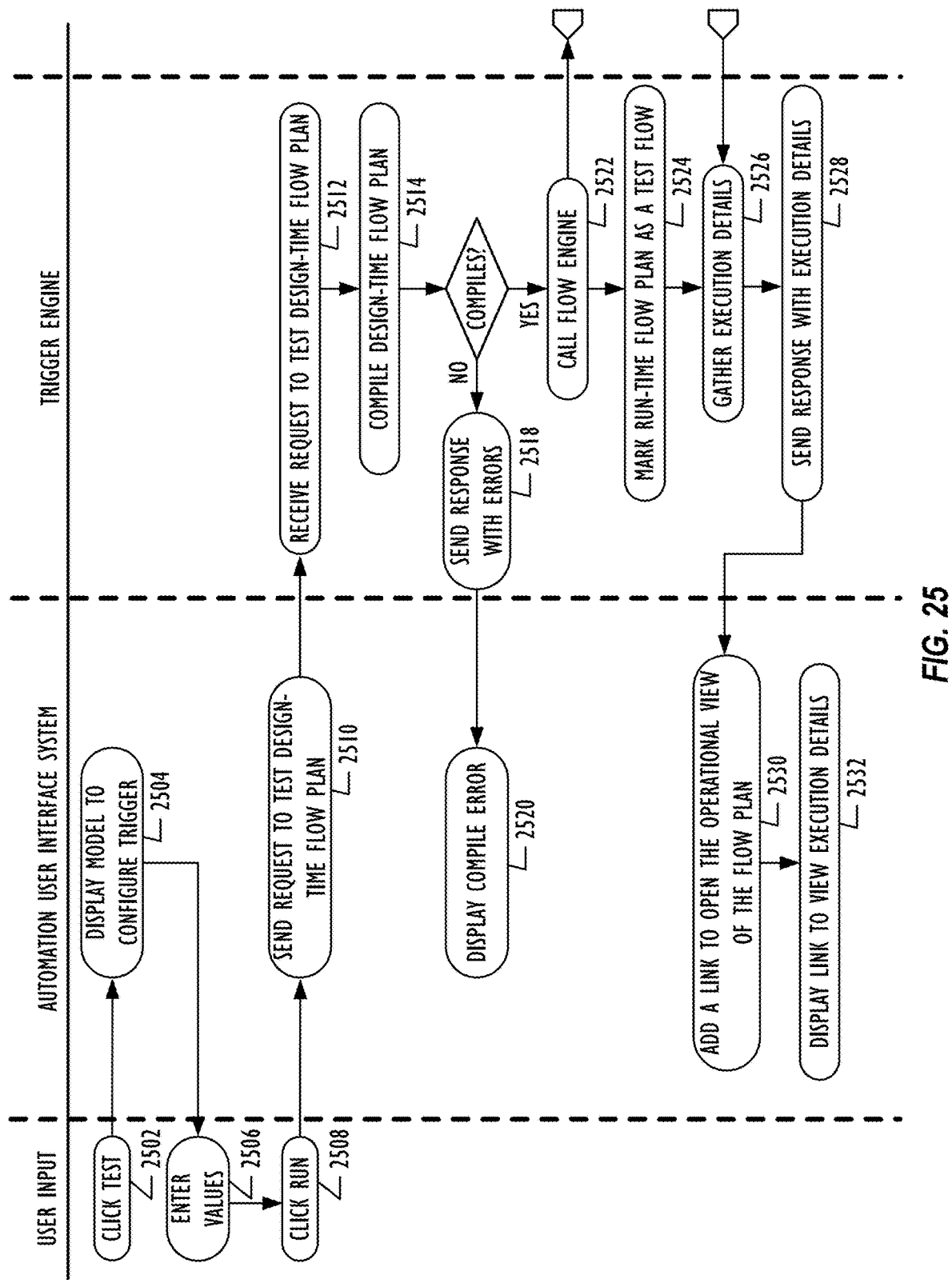
FIG. 25 is an illustration of a flow chart to implement in-line test of flow plans.

FIG. 25 is an illustration of a flow chart to implement in-line test of flow plans. In the flow designer user interface, a user may provide an input to perform an in-line test by clicking on a test menu option 2502. In response to the user providing the test input, the automation user interface system displays a model to configure the trigger for the flow plan. A user may provide input test values 2506 to and click on run 2508 to perform the in-line test for the flow plan. The automation user interface system may then send a request to test the design-time flow plan 2510. When the trigger engine receives a request to test the design-time flow plan 2510, the trigger engine compiles the design-time flow plan 2514 to generate a run-time flow plan. If the trigger engine is unable to compile, the trigger engine send a response with errors 2518 to the automation use interface system indicating compilation errors. The automation user interface system may then display the compile error 2520.

If the design-time flow plan is able to compile, the trigger engine 2522 calls a flow engine to execute the run-time flow plan. In FIG. 25, calling the flow engine may also include providing the run-time flow plan to the flow plan. After a successful compilation of the design-time flow plan, the trigger engine may mark the flow plan as a test flow plan 2524 and gather execution details 2526 relating to the executing run-time flow plan. The trigger engine may then send a response with the execution details 2528 to the automation user interface system. After receiving the execution details 2528, the automation user interface system may add a link to open the operational view of the flow plan 2530 and display a link to view the execution details. In other embodiments, the automation system may directly open and display the execution details in the operational view user interface rather than providing a link in the flow designer user interface.

Operational View User Interface

FIGS. 26-31 illustrate embodiments of an operational view user interface. As previously discussed, an automation user interface system may also include an operational view user interface that provides configuration and run-time information for an executing and/or completed flow plan. In one or more embodiments, the operational view user interface is able to provide configuration and run-time information while a user simultaneously modifies the corresponding flow plans within the one or more other user interfaces. To allow the operational view user interface to display information relating to currently executed and/or completed flow plans, the flow builder API may assign the flow plan and components of the flow plan a name and identifier. The identifier the flow builder API assigns points to the definition of each of the components to allow tracking what definitions are being run and/or have completed executing. Also, recall that once a user publishes a design-time flow plan, the automation system creates a snapshot of the design-time flow plan to prevent a user from making changes to the published design-time flow plan. Stated another way, once a user publishes, the automation system creates a snapshot version of the design-time flow plan. Any updates or changes to the design-time flow plan using the automation user interface system does not change the snapshot version of the design-time flow plan. The flow engine will then execute the snapshot version of the design-time flow plan when the trigger conditions are met, and the operational view user interface will provide information regarding the execution of the snapshot version of the design-time flow plan.

Figure 26:
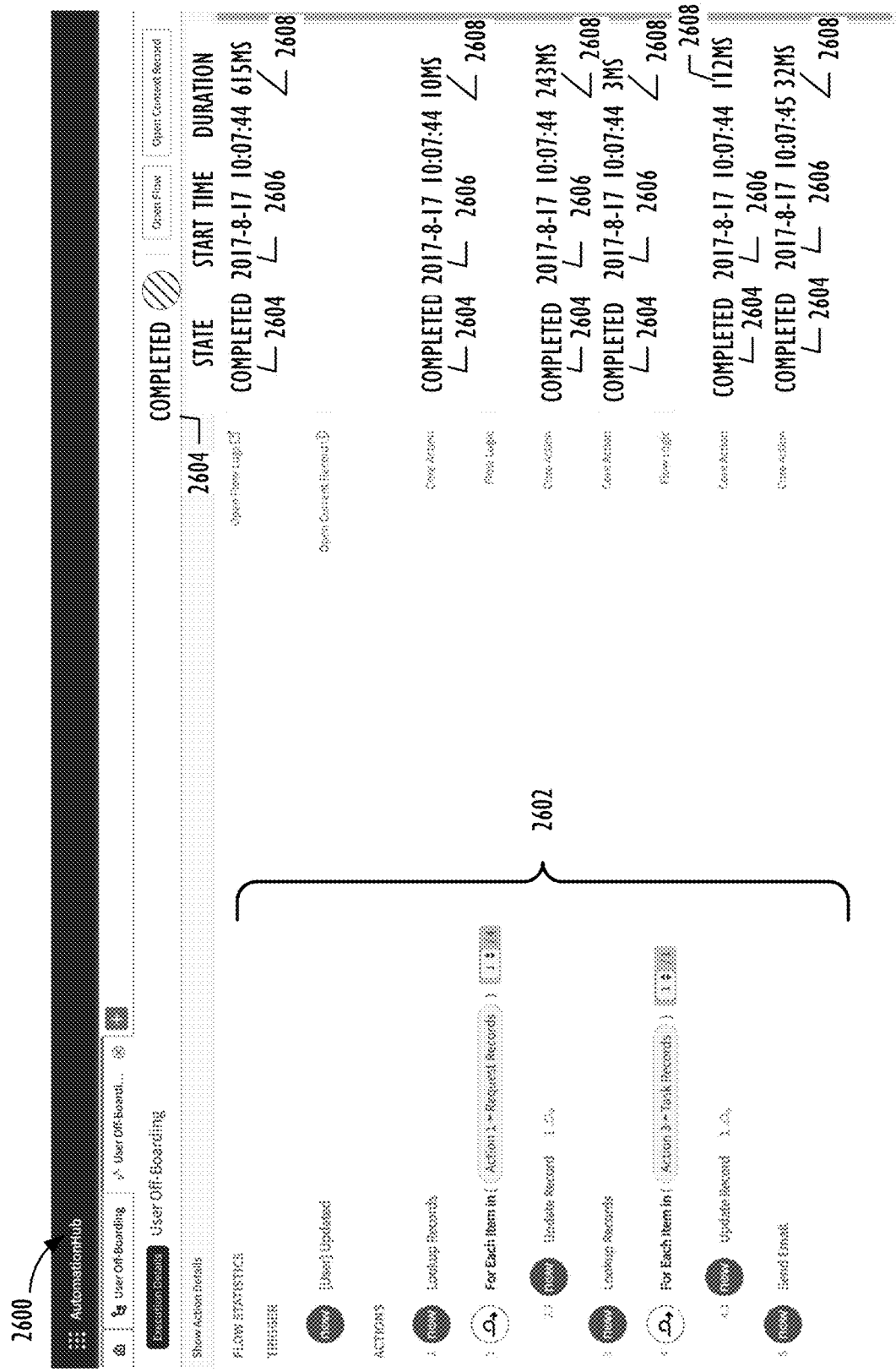
FIG. 26 illustrates an embodiment of an operational view user interface.
Figure 27:
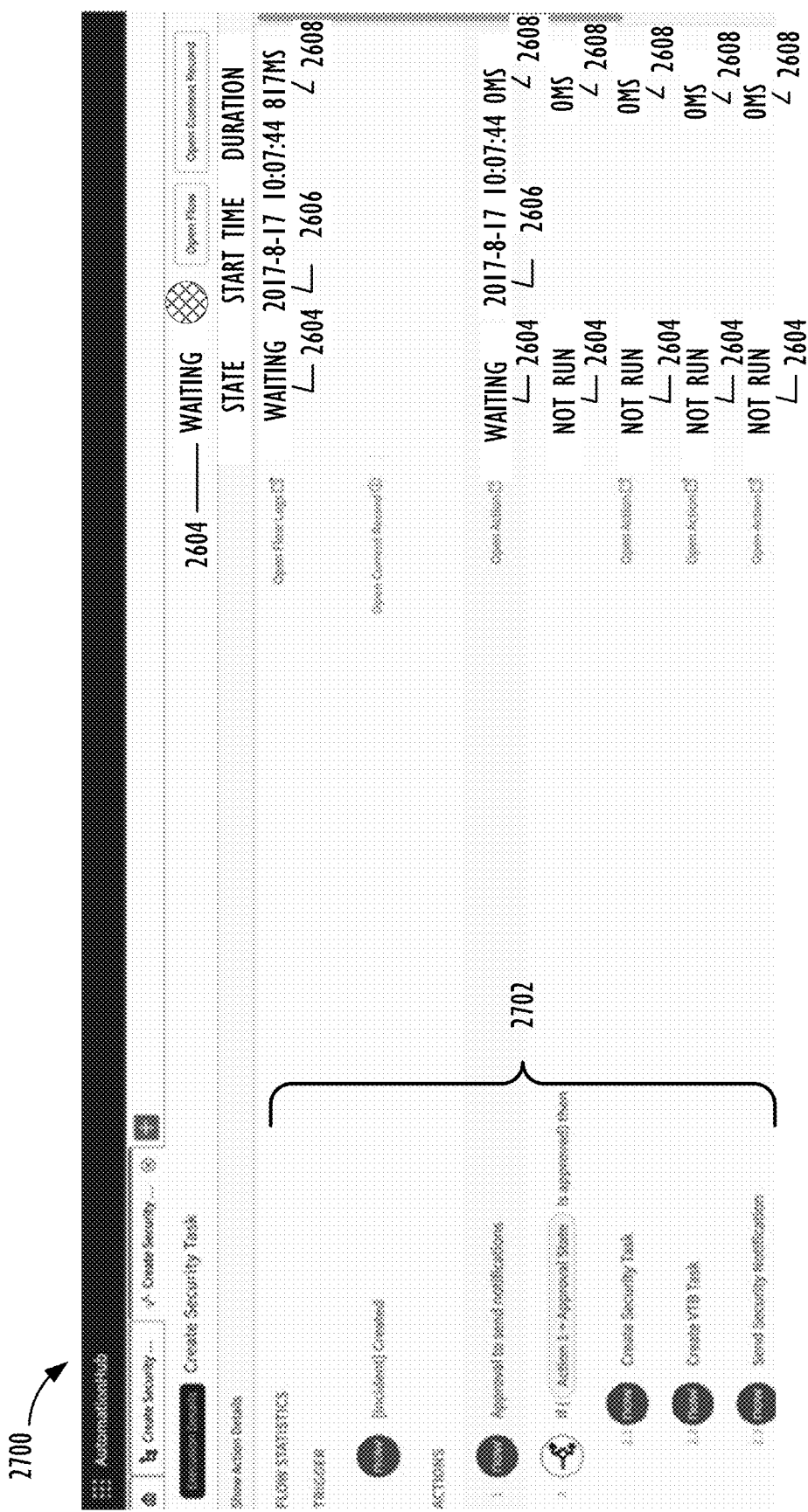
FIG. 27 illustrates another embodiments of an operational view user interface.
Figure 28:
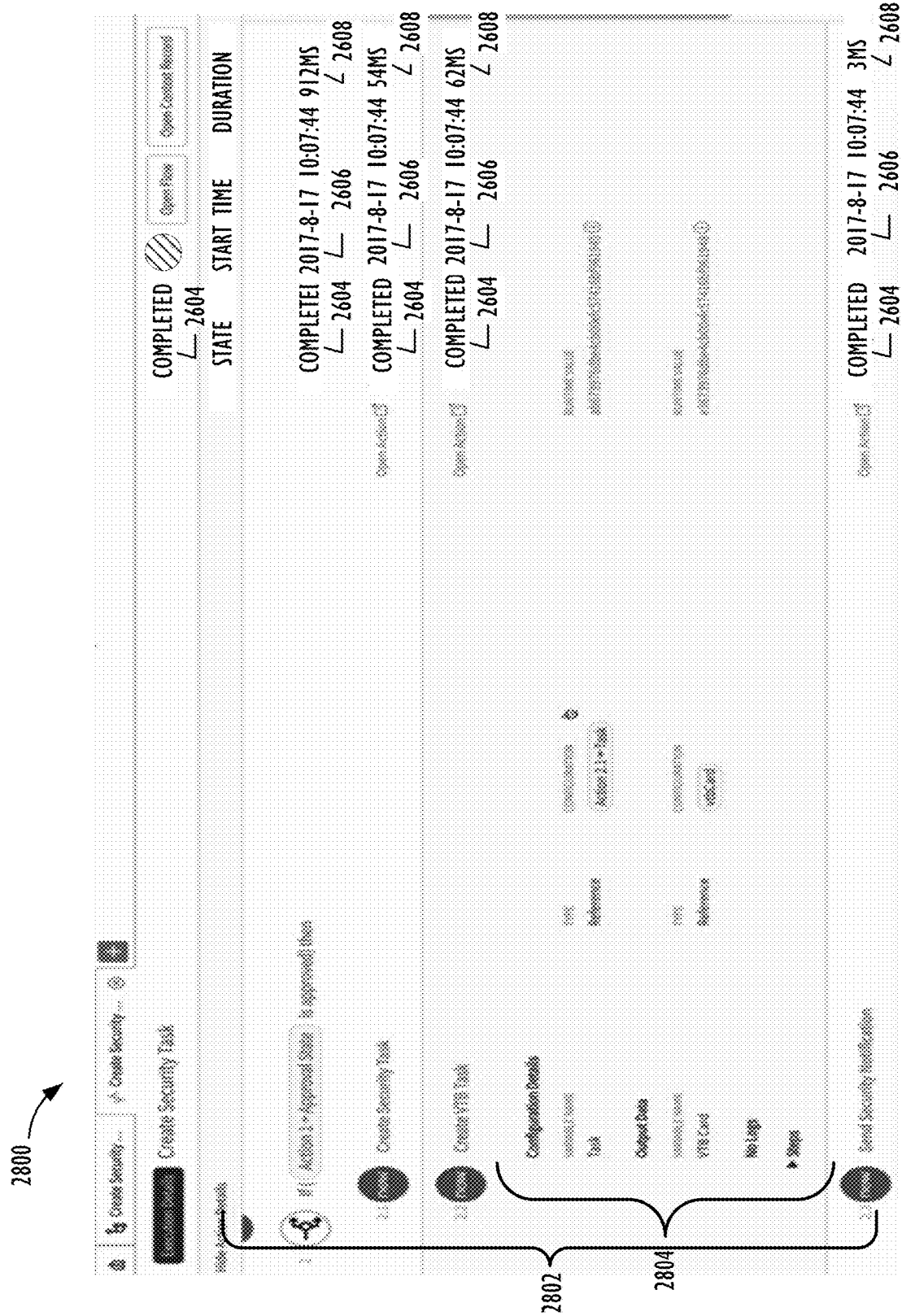
FIG. 28 illustrates another embodiments of an operational view user interface.

As shown in FIGS. 26-28, the operational view user interfaces 2600, 2700, and 2800 include flow plan graphical outlines 2602, 2702, and 2802, respectively and one or more state indicators 2604 that provide the overall state of a flow plan and the state of a trigger instance and/or one or more action instances. As shown in FIGS. 26-28, the flow plan graphical outlines 2602, 2702, and 2802 are located on the left side and the state indicators are located next to and on the right side of the of the operational view user interface 2600, 2700, and 2800. The flow plan graphical outlines 2602, 2702, and 2802 include trigger instances, action instances, and step instances in a layout similar to the design-time flow plan shown in the flow designer user interfaces in FIGS. 7-10. Examples of state indicators 2604 shown in FIGS. 26-28 include a "wait" state, "not run" state, and a "completed" state. Using FIG. 27 as an example, the state indicators 2604 may reveal that a flow plan is overall currently in a "wait" state, where one or more action and/or step instances could have finished execution, have yet to run, or currently in a "wait" state. Other embodiments of operational view user interfaces 2600, 2700, and 2800 may include other states no shown in FIGS. 26-28, such as a "failed" state, associated with state indicators 2604.

Figure 29:
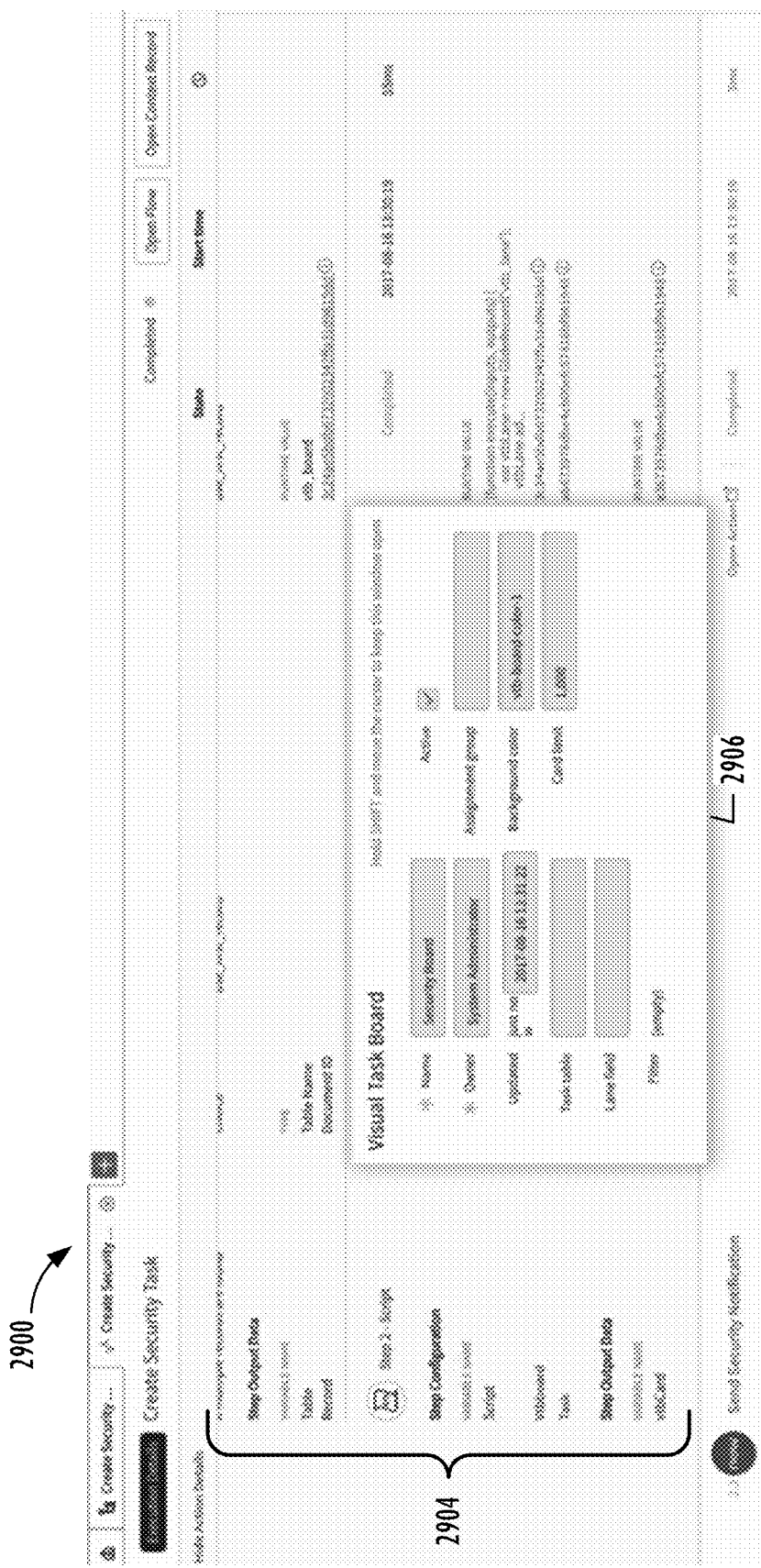
FIG. 29 illustrates another embodiments of an operational view user interface.
Figure 30:
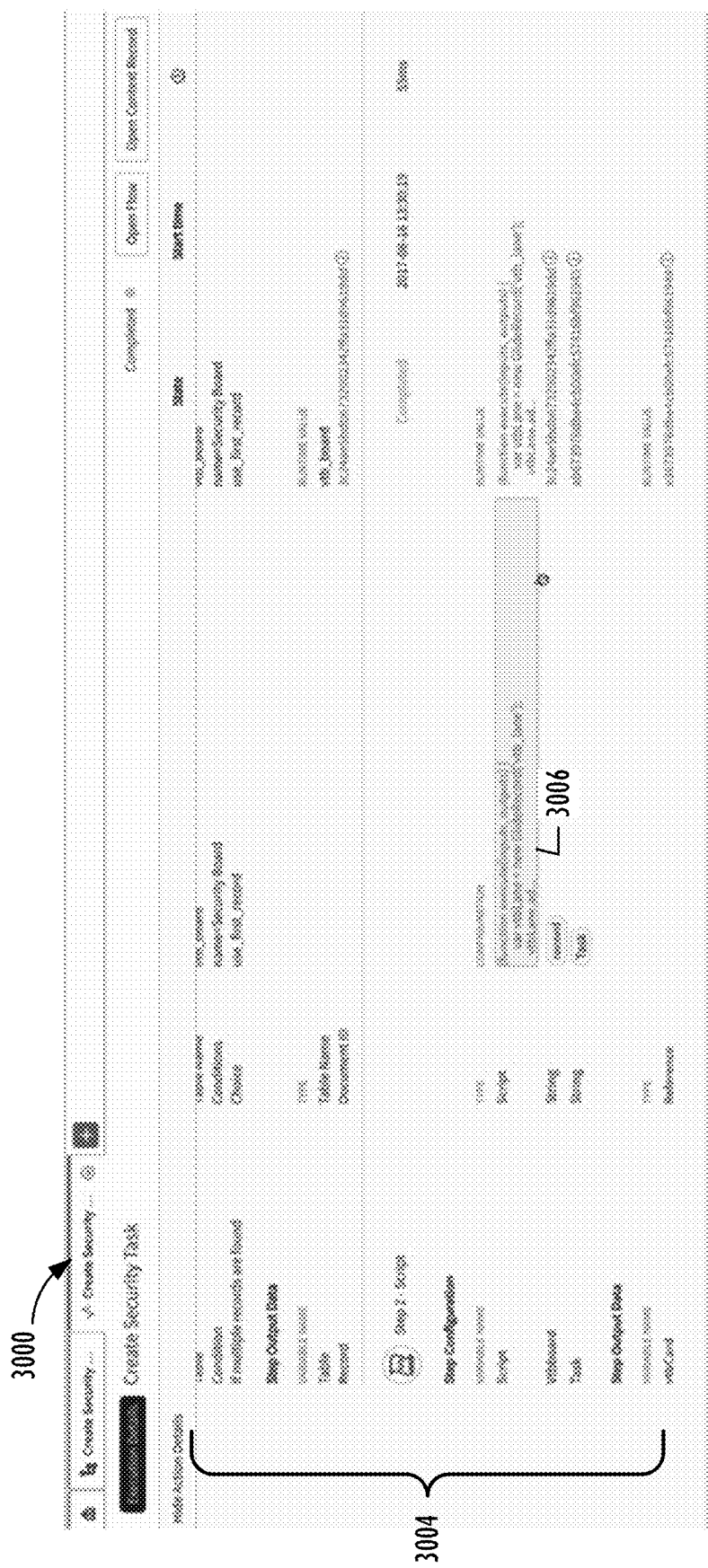
FIG. 30 illustrates another embodiments of an operational view user interface.
Figure 31:
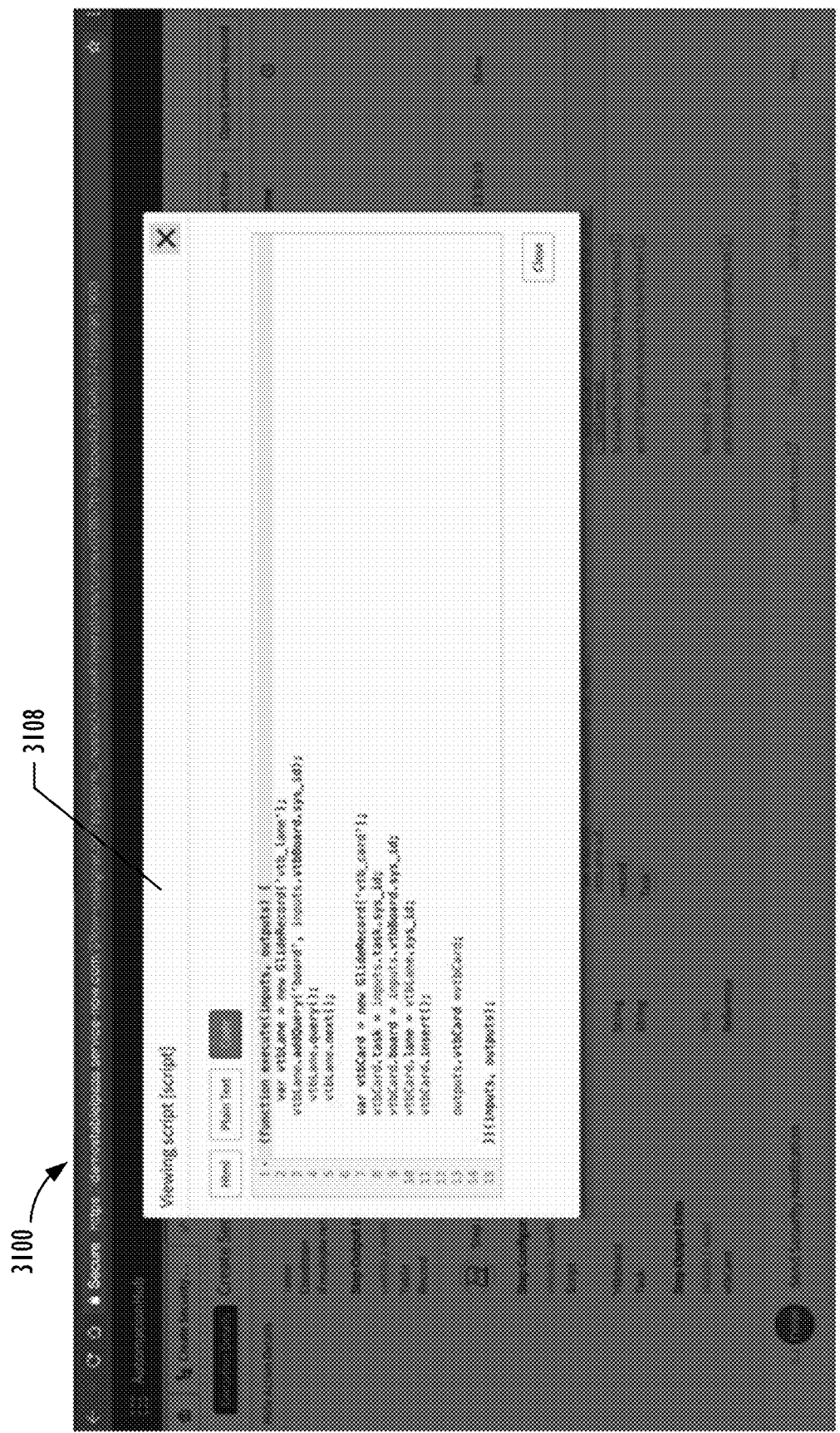
FIG. 31 illustrates another embodiments of an operational view user interface.

The operational view user interfaces 2600, 2700, and 2800 may also provide other metrics relating to the execution of the trigger instances, action instances, and/or step instances. In FIGS. 26-28, the operation view user interfaces 2600, 2700, and 2800 provides the start time metric 2606 for each of the trigger, action, and step instances and a duration time metric 2608 to complete the execution of the different instances. Additionally, in FIGS. 28-30, the operational view user interfaces 2800, 2900, 3000, include detail expansions 2804, 2904, 3004 that provides additional information relating to selected action and/or step instances. The operational view user interfaces 2600, 2700, and 2800 are able to expand selected action and/or step instances to provide more detail without switching to another user interface or window outside the operational view user interface. The operational view user interface can also display each input and/or output values and runtime values for an action instance. Using FIG. 28 as an example, a user is able to view details relating to a step instance for a VTB. A user is able to expand the step instance to view run-time values and select options to link back to the VTB record. FIG. 29 depicts that operational view user interface may provide a preview window 2906 to view the VTB record when selection one of the options to link back to the VTB record. FIG. 30 corresponds to a user being able to view script type step instances and viewing runtime values when a user selects a link 3006 within the detail expansion 3004 of the step instance. FIG. 31 displays a window 3108 generated and displayed after accessing one of the links within the expanded view selecting a link, such as link 3006 shown in FIG. 30.

Figure 32:
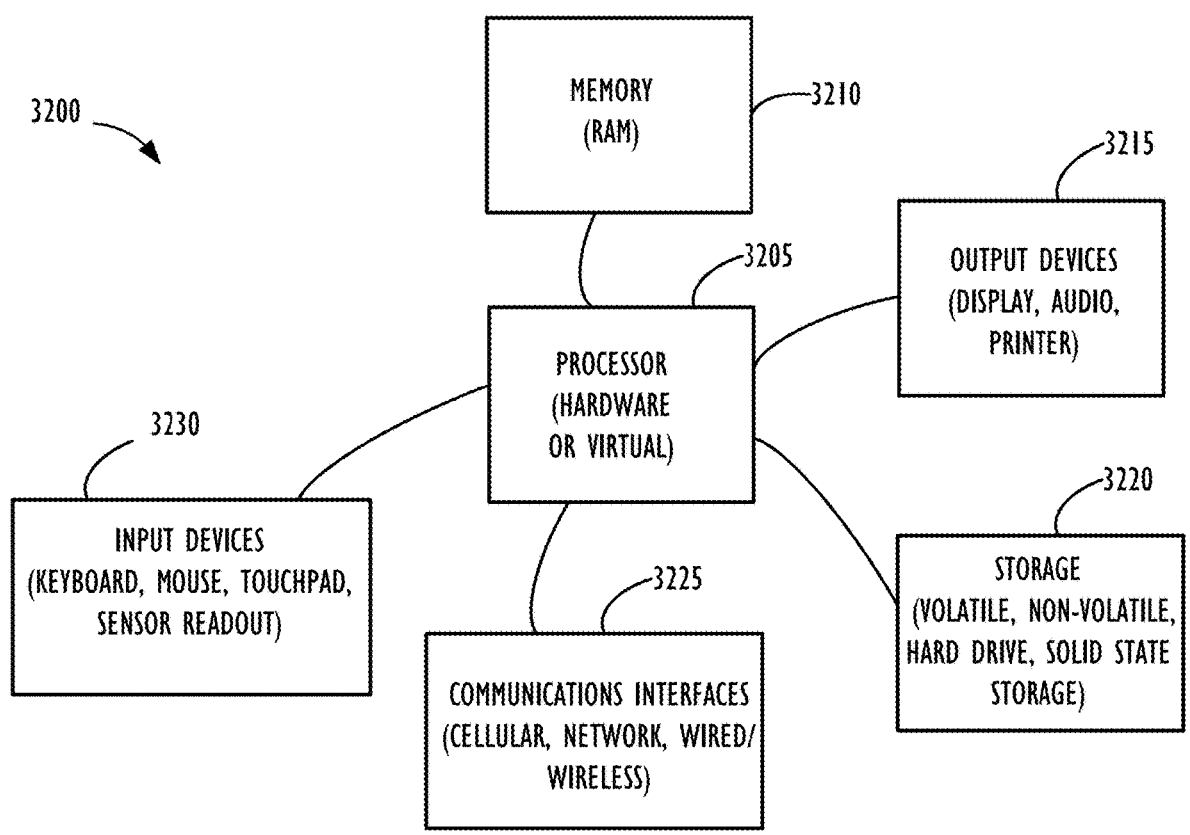
FIG. 32 illustrates a block diagram of a computing device that may be used to implement one or more disclosed embodiments.

FIG. 32 illustrates a block diagram of a computing device 3200 that may be used to implement one or more disclosed embodiments (e.g., cloud computing system 100, client devices 104A-104E, data centers 206A-B, etc.). For example, computing device 3200 illustrated in FIG. 32 could represent a client device or a physical server device and include either hardware or virtual processor(s) depending on the level of abstraction of the computing device. In some instances (without abstraction) computing device 3200 and its elements as shown in FIG. 32 each relate to physical hardware and in some instances one, more, or all of the elements could be implemented using emulators or virtual machines as levels of abstraction. In any case, no matter how many levels of abstraction away from the physical hardware, computing device 3200 at its lowest level may be implemented on physical hardware. As also shown in FIG. 32, computing device 3200 may include one or more input devices 3230, such as a keyboard, mouse, touchpad, or sensor readout (e.g., biometric scanner) and one or more output devices 3217, such as displays, speakers for audio, or printers. Some devices may be configured as input/output devices also (e.g., a network interface or touchscreen display). Computing device 3200 may also include communications interfaces 3225, such as a network communication unit that could include a wired communication component and/or a wireless communications component, which may be communicatively coupled to processor 3205. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 32, computing device 3200 includes a processing element such as processor 3205 that contains one or more hardware processors, where each hardware processor may have a single or multiple processor cores. In one embodiment, the processor 3205 may include at least one shared cache that stores data (e.g., computing instructions) that are utilized by one or more other components of processor 3205. For example, the shared cache may be a locally cached data stored in a memory for faster access by components of the processing elements that make up processor 3205. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 32, the processing elements that make up processor 3205 may also include one or more other types of hardware processing components, such as graphics processing units (GPU), application specific integrated circuits (ASICs), field-programmable gate arrays (FPGAs), and/or digital signal processors (DSPs).

FIG. 32 illustrates that memory 3210 may be operatively and communicatively coupled to processor 3205. Memory 3210 may be a non-transitory medium configured to store various types of data. For example, memory 3210 may include one or more storage devices 3220 that comprise a non-volatile storage device and/or volatile memory. Volatile memory, such as random access memory (RAM), can be any suitable non-permanent storage device. The non-volatile storage devices 3220 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 3220 may be used to store overflow data if allocated RAM is not large enough to hold all working data. The non-volatile storage devices 3220 may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processor 3205. In one embodiment, the compiling process of the software program may transform program code written in a programming language to another computer language such that the processor 3205 is able to execute the programming code. For example, the compiling process of the software program may generate an executable program that provides encoded instructions (e.g., machine code instructions) for processor 3205 to accomplish specific, non-generic, particular computing functions.

After the compiling process, the encoded instructions may then be loaded as computer executable instructions or process steps to processor 3205 from storage device 3220, from memory 3210, and/or embedded within processor 3205 (e.g., via a cache or on-board ROM). Processor 3205 may be configured to execute the stored instructions or process steps in order to perform instructions or process steps to transform the computing device into a non-generic, particular, specially programmed machine or apparatus. Stored data, e.g., data stored by a storage device 3220, may be accessed by processor 3205 during the execution of computer executable instructions or process steps to instruct one or more components within the computing device 3200.

A user interface (e.g., output devices 3215 and input devices 3230) can include a display, positional input device (such as a mouse, touchpad, touchscreen, or the like), keyboard, or other forms of user input and output devices. The user interface components may be communicatively coupled to processor 3205. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 3200 may comprise other components well known in the art, such as sensors, powers sources, and/or analog-to-digital converters, not explicitly shown in FIG. 32.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A system comprising:
a non-transitory memory; and
one or more hardware processors configured to read instructions from the non-transitory memory to cause the one or more hardware processors to:
present, on a display, an action designer user interface associated with a flow plan, wherein the action designer user interface is configured to define an action instance of the flow plan within a cloud-computing environment based on one or more user inputs, and wherein the action designer user interface comprises:
an action outline component that includes an input graphical element, one or more step instance graphical elements, and an action graphical element, wherein one of the graphical elements is highlighted within the action outline component; and
an action window adjacent to the action outline component, wherein the action window comprises one or more input fields that dynamically change based on a user selection of one of the graphical elements within the action outline component;
receive, from the action designer user interface, one or more user inputs configured to link one or more output values of a first operation of the action instance to one or more input values of a second operation of the action instance, define execution of the first operation by a first computing device, and define execution of the second operation to be offloaded from the first computing device to a second computing device in response to a determination that one or more operational conditions of the first computing device are insufficient to execute the second operation;
receive one or more additional user inputs configured to add one or more step instances to the second operation of the action instance; and
present, on the display, a window to select from a list of pre-existing step instance types to add corresponding step instances to the second operation in response to receiving the one or more additional user inputs.

2. The system of claim 1, wherein the one or more step instance graphical elements include a graphical element for an approval step instance indicative of one or more approval conditions that the flow plan satisfies prior to executing.

3. The system of claim 2, wherein the action window comprises an approval rule builder graphical element configured to build one or more rules for creating the one or more approval conditions, and wherein the approval rule builder graphical element includes one or more fields to define the one or more rules for the one or more approval conditions.

4. The system of claim 3, wherein the one or more rules are combined with a logical operation to form a rule set.

5. The system of claim 4, wherein the instructions cause the one or more hardware processors to present a remove rule set option that deletes one or more rule sets for the approval rule builder graphical element.

6. The system of claim 1, wherein the corresponding step instances are added to the second operation within the action instance without creating a custom script.

7. The system of claim 1, wherein the second computing device is a management, instrumentation, and discovery (MID) server.

8. The system of claim 1, wherein the instructions cause the one or more hardware processors to present an action property window within the action designer user interface, wherein the action property window is configured to setup properties or policies for the action instance.

9. The system of claim 1, wherein the instructions cause the one or more hardware processors to present a menu component that includes a publish option indicative of creating a snapshot version of the action instance.

10. A method comprising:
presenting, on a display, an action designer user interface associated with a flow plan, wherein the action designer user interface is configured to define an action instance of the flow plan within a cloud-computing environment based on one or more user inputs, and wherein the action designer user interface comprises:
an action outline component that includes an input graphical element, one or more step instance graphical elements, and an action graphical element, wherein one of the graphical elements is highlighted within the action outline component; and
an action window adjacent to the action outline component, wherein the action window comprises one or more input fields that dynamically change based on a user selection of one of the graphical elements within the action outline component; and
receiving, from the action designer user interface, one or more user inputs configured to link one or more output values of a first operation of the action instance to one or more input values of a second operation of the action instance, define execution of the first operation by a first computing device, and define execution of the second operation to be offloaded from the first computing device to a second computing device in response to a determination that one or more operational conditions of the first computing device are insufficient to execute the second operation;
receiving one or more additional user inputs configured to add one or more step instances to the second operation of the action instance; and
presenting, on the display, a window to select from a list of pre-existing step instance types to add corresponding step instances to the second operation in response to receiving the one or more additional user inputs.

11. The method of claim 10, wherein the one or more step instance graphical elements include a graphical element for an approval step instance indicative of one or more approval conditions that the flow plan satisfies prior to executing.

12. The method of claim 11, wherein the action window comprises an approval rule builder graphical element configured to build one or more rules for creating the one or more approval conditions, and wherein the approval rule builder graphical element includes one or more fields to define the one or more rules for the one or more approval conditions.

13. The method of claim 12, wherein the one or more rules are combined with a logical operation to form a rule set.

14. The method of claim 13, comprising presenting a remove rule set option that deletes one or more rule sets for the approval rule builder graphical element.

15. The method of claim 10, wherein the corresponding step instances are added to the second operation within the action instance without creating a custom script.

16. The method of claim 10, comprising presenting a menu component that includes a publish option indicative of creating a snapshot version of the action instance.

17. A system comprising:
a non-transitory memory; and
one or more hardware processors configured to read instructions from the non-transitory memory to cause the one or more hardware processors to:
receive, from an action designer user interface configured to define an action instance of a flow plan within a cloud-computing environment, one or more first user inputs configured to link one or more output values of a first operation of the action instance to one or more input values of a second operation of the action instance, define execution of the first operation by a first computing device, and define execution of the second operation to be offloaded from the first computing device to a second computing device in response to a determination that one or more operational conditions of the first computing device are insufficient to execute the second operation;
receive, from the action designer user interface, one or more second user inputs configured to add an approval condition to the action instance;
present, on a display, an approval step instance graphical element within the action designer user interface after receiving the one or more second user inputs, wherein the approval step instance graphical element is located within an action outline component within the action designer user interface and is associated with the action instance of the flow plan;
receive one or more third user inputs that select the approval step instance graphical element; and
update, on the display, an action window adjacent to the action outline component, wherein the action window comprises an approval rule builder graphical element configured to set one or more rules for creating the approval condition, and wherein the approval rule builder graphical element includes one or more fields that define when the flow plan satisfies the approval condition.

18. The system of claim 17, wherein the one or more rules are combined with a logical operation to form a rule set.

19. The system of claim 18, wherein the instructions cause the one or more hardware processors to present a remove rule set option that deletes one or more rule sets for the approval rule builder graphical element.

20. The system of claim 17, wherein the one or more rules are added within the approval step instance graphical element without creating a custom script.

* * * * *